(12) United States Patent
Dewey

(10) Patent No.: US 12,533,241 B2
(45) Date of Patent: Jan. 27, 2026

(54) DISTRACTING AND ANGLING EXPANDABLE INTERBODY DEVICE

(71) Applicant: Warsaw Orthopedic, Inc., Warsaw, IN (US)

(72) Inventor: Jonathan M. Dewey, Memphis, TN (US)

(73) Assignee: WARSAW ORTHOPEDIC, INC., Warsaw, IN (US)

( * ) Notice: Subject to any disclaimer, the term of this patent is extended or adjusted under 35 U.S.C. 154(b) by 93 days.

(21) Appl. No.: 18/651,109

(22) Filed: Apr. 30, 2024

(65) Prior Publication Data

US 2024/0382318 A1 Nov. 21, 2024

Related U.S. Application Data

(60) Provisional application No. 63/502,471, filed on May 16, 2023.

(51) Int. Cl.
*A61F 2/44* (2006.01)
*A61F 2/30* (2006.01)

(52) U.S. Cl.
CPC ............ *A61F 2/4425* (2013.01); *A61F 2/447* (2013.01); *A61F 2002/30266* (2013.01); *A61F 2002/30387* (2013.01); *A61F 2002/30398* (2013.01); *A61F 2002/30433* (2013.01); *A61F 2002/3054* (2013.01); *A61F 2002/30579* (2013.01); *A61F 2002/443* (2013.01)

(58) Field of Classification Search
CPC ...... A61F 2/4455; A61F 2/446; A61F 2/4465; A61F 2/447; A61F 2002/30579
See application file for complete search history.

(56) References Cited

U.S. PATENT DOCUMENTS

| 1,677,337 A | 7/1928 | Grove |
| 3,847,154 A | 11/1974 | Nordin |
| 4,553,273 A | 11/1985 | Wu |

(Continued)

FOREIGN PATENT DOCUMENTS

| CN | 107 137 166 A | 9/2017 | |
| CN | 116056669 A * | 5/2023 | ........... A61F 2/4455 |

(Continued)

OTHER PUBLICATIONS

European Search Report in Application No. 22828961.7 dated Mar. 14, 2025.

(Continued)

*Primary Examiner* — Jacqueline T Johanas
(74) *Attorney, Agent, or Firm* — FOX ROTHSCHILD LLP

(57) ABSTRACT

An expandable implant pivotally movable between a collapsed position, an expanded position, and an angled position, is disclosed. The implant may include at least one first pivoting axis extending in a longitudinal direction and at least one second pivoting axis extending in a transverse direction of the implant. A frame may be pivotally coupled to at least one arm, a superior endplate, and an inferior endplate. The at least one arm may be pivotally coupled to one of the superior endplate or the inferior endplate. The implant may include at least one distraction wedge engaged with the at least one arm and at least one angulation wedge engaged with the at least one distraction wedge.

20 Claims, 31 Drawing Sheets

(56) References Cited

U.S. PATENT DOCUMENTS

| | | |
|---|---|---|
| 4,636,217 A | 1/1987 | Ogilvie et al. |
| 4,716,894 A | 1/1988 | Lazzeri et al. |
| 4,759,769 A | 7/1988 | Hedman et al. |
| 5,059,193 A | 10/1991 | Kuslich |
| 5,171,278 A | 12/1992 | Pisharodi |
| 5,228,811 A | 7/1993 | Potter |
| 5,284,483 A | 2/1994 | Johnson et al. |
| 5,336,223 A | 8/1994 | Rogers |
| 5,390,683 A | 2/1995 | Pisharodi |
| 5,522,899 A | 6/1996 | Michelson |
| 5,554,191 A | 9/1996 | Lahille et al. |
| 5,575,790 A | 11/1996 | Chen et al. |
| 5,609,635 A | 3/1997 | Michelson |
| 5,653,762 A | 8/1997 | Pisharodi |
| 5,653,763 A | 8/1997 | Errico et al. |
| 5,658,336 A | 8/1997 | Pisharodi |
| 5,665,122 A | 9/1997 | Kambin |
| 5,693,100 A | 12/1997 | Pisharodi |
| 5,697,977 A | 12/1997 | Pisharodi |
| 5,702,391 A | 12/1997 | Lin |
| 5,702,453 A | 12/1997 | Rabbe et al. |
| 5,702,455 A | 12/1997 | Saggar |
| 5,797,918 A | 8/1998 | McGuire et al. |
| 5,800,550 A | 9/1998 | Sertich |
| 5,865,848 A | 2/1999 | Baker |
| 5,893,890 A | 4/1999 | Pisharodi |
| 5,931,777 A | 8/1999 | Sava |
| 5,941,885 A | 8/1999 | Jackson |
| 5,971,987 A | 10/1999 | Huxel et al. |
| 5,980,522 A | 11/1999 | Koros et al. |
| 6,045,579 A | 4/2000 | Hochshuler et al. |
| 6,074,343 A | 6/2000 | Nathanson et al. |
| 6,080,193 A | 6/2000 | Hochshuler et al. |
| 6,099,531 A | 8/2000 | Bonutti |
| 6,102,949 A | 8/2000 | Biedermann et al. |
| 6,102,950 A | 8/2000 | Vaccaro |
| 6,106,557 A | 8/2000 | Robioneck et al. |
| 6,113,638 A | 9/2000 | Williams et al. |
| 6,117,174 A | 9/2000 | Nolan |
| 6,132,465 A | 10/2000 | Ray et al. |
| 6,159,211 A | 12/2000 | Boriani et al. |
| 6,159,244 A | 12/2000 | Suddaby |
| 6,176,882 B1 | 1/2001 | Biedermann et al. |
| 6,179,873 B1 | 1/2001 | Zientek |
| 6,190,414 B1 | 2/2001 | Young et al. |
| 6,193,757 B1 | 2/2001 | Foley et al. |
| 6,217,579 B1 | 4/2001 | Koros |
| 6,245,108 B1 | 6/2001 | Biscup |
| 6,309,421 B1 | 10/2001 | Pisharodi |
| 6,342,074 B1 | 1/2002 | Simpson |
| 6,371,989 B1 | 4/2002 | Chauvin et al. |
| 6,395,031 B1 | 5/2002 | Foley et al. |
| 6,423,063 B1 | 7/2002 | Bonutti |
| 6,432,106 B1 | 8/2002 | Fraser |
| 6,436,140 B1 | 8/2002 | Liu et al. |
| 6,443,989 B1 | 9/2002 | Jackson |
| 6,443,990 B1 | 9/2002 | Aebi et al. |
| 6,454,806 B1 | 9/2002 | Cohen et al. |
| 6,454,807 B1 | 9/2002 | Jackson |
| 6,461,359 B1 | 10/2002 | Tribus et al. |
| 6,475,218 B2 | 11/2002 | Gournay et al. |
| 6,491,724 B1 | 12/2002 | Ferree |
| 6,520,991 B2 | 2/2003 | Huene |
| 6,520,993 B2 | 2/2003 | James et al. |
| 6,524,238 B2 | 2/2003 | Velikaris et al. |
| 6,527,803 B1 | 3/2003 | Crozet et al. |
| 6,562,074 B2 | 5/2003 | Gerbec et al. |
| 6,576,016 B1 | 6/2003 | Hochshuler et al. |
| 6,623,525 B2 | 9/2003 | Ralph et al. |
| 6,629,998 B1 | 10/2003 | Lin |
| 6,635,086 B2 | 10/2003 | Lin |
| 6,648,917 B2 | 11/2003 | Gerbec et al. |
| 6,676,703 B2 | 1/2004 | Biscup |
| 6,685,742 B1 | 2/2004 | Jackson |
| 6,723,126 B1 | 4/2004 | Berry |
| 6,770,096 B2 | 8/2004 | Bolger et al. |
| 6,773,460 B2 | 8/2004 | Jackson |
| 6,821,298 B1 | 11/2004 | Jackson |
| 6,835,206 B2 | 12/2004 | Jackson |
| 6,849,093 B2 | 2/2005 | Michelson |
| 6,852,129 B2 | 2/2005 | Gerbec et al. |
| 6,863,673 B2 | 3/2005 | Gerbec et al. |
| 6,923,814 B1 | 8/2005 | Hildebrand et al. |
| 6,926,737 B2 | 8/2005 | Jackson |
| 6,953,477 B2 | 10/2005 | Berry |
| 6,964,687 B1 | 11/2005 | Bernard et al. |
| 6,974,480 B2 | 12/2005 | Messerli et al. |
| 6,984,234 B2 | 1/2006 | Bray |
| 7,112,222 B2 | 9/2006 | Fraser et al. |
| 7,135,043 B2 | 11/2006 | Nakahara et al. |
| 7,137,997 B2 | 11/2006 | Paul |
| 7,172,627 B2 | 2/2007 | Fiere et al. |
| 7,188,626 B2 | 3/2007 | Foley et al. |
| 7,204,853 B2 | 4/2007 | Gordon et al. |
| 7,232,464 B2 | 6/2007 | Mathieu et al. |
| 7,238,203 B2 | 7/2007 | Bagga et al. |
| 7,255,700 B2 | 8/2007 | Kaiser et al. |
| 7,316,532 B2 | 1/2008 | Matthys-Mark |
| 7,316,714 B2 | 1/2008 | Gordon et al. |
| 7,407,483 B2 | 8/2008 | Perez-Cruet et al. |
| 7,481,766 B2 | 1/2009 | Lee et al. |
| 7,491,168 B2 | 2/2009 | Raymond et al. |
| 7,537,565 B2 | 5/2009 | Bass |
| 7,618,456 B2 | 11/2009 | Mathieu et al. |
| 7,625,394 B2 | 12/2009 | Molz, IV et al. |
| 7,635,366 B2 | 12/2009 | Abdou |
| 7,637,909 B2 | 12/2009 | Lechot et al. |
| 7,655,046 B2 | 2/2010 | Dryer et al. |
| 7,678,148 B2 | 3/2010 | Peterman |
| 7,703,727 B2 | 4/2010 | Selness |
| 7,708,778 B2 | 5/2010 | Gordon et al. |
| 7,708,779 B2 | 5/2010 | Edie et al. |
| 7,727,280 B2 | 6/2010 | McLuen |
| 7,753,958 B2 | 7/2010 | Gordon et al. |
| 7,780,594 B2 | 8/2010 | Hutton |
| 7,806,932 B2 | 10/2010 | Webb et al. |
| 7,815,682 B1 | 10/2010 | Peterson et al. |
| 7,819,801 B2 | 10/2010 | Miles et al. |
| 7,824,428 B2 | 11/2010 | Mikkonen et al. |
| 7,828,849 B2 | 11/2010 | Lim |
| 7,846,167 B2 | 12/2010 | Garcia et al. |
| 7,846,207 B2 | 12/2010 | Lechmann et al. |
| 7,850,731 B2 | 12/2010 | Brittan et al. |
| 7,850,733 B2 | 12/2010 | Baynham et al. |
| 7,862,616 B2 | 1/2011 | Lechmann et al. |
| 7,875,076 B2 | 1/2011 | Mathieu et al. |
| 7,883,542 B2 | 2/2011 | Zipnick |
| 7,892,173 B2 | 2/2011 | Miles et al. |
| 7,909,869 B2 | 3/2011 | Gordon et al. |
| 7,914,559 B2 | 3/2011 | Carls et al. |
| 7,967,821 B2 | 6/2011 | Sicvol et al. |
| 7,981,031 B2 | 7/2011 | Frasier et al. |
| 8,016,836 B2 | 9/2011 | Corrao et al. |
| 8,062,375 B2 | 11/2011 | Glerum et al. |
| 8,105,382 B2 | 1/2012 | Olmos et al. |
| 8,118,870 B2 | 2/2012 | Gordon et al. |
| 8,118,871 B2 | 2/2012 | Gordon et al. |
| 8,123,810 B2 | 2/2012 | Gordon et al. |
| 8,147,550 B2 | 4/2012 | Gordon et al. |
| 8,172,903 B2 | 5/2012 | Gordon et al. |
| 8,182,539 B2 | 5/2012 | Tyber et al. |
| 8,257,442 B2 | 9/2012 | Edie et al. |
| 8,262,570 B2 | 9/2012 | White et al. |
| 8,262,662 B2 | 9/2012 | Beardsley et al. |
| 8,262,710 B2 | 9/2012 | Freedman et al. |
| 8,287,597 B1 | 10/2012 | Pimenta et al. |
| 8,303,498 B2 | 11/2012 | Miles et al. |
| 8,303,658 B2 | 11/2012 | Peterman |
| 8,303,663 B2 | 11/2012 | Jimenez et al. |
| 8,317,866 B2 | 11/2012 | Palmatier et al. |
| 8,323,185 B2 | 12/2012 | Perez-Cruet et al. |
| 8,328,872 B2 | 12/2012 | Duffield et al. |
| 8,343,048 B2 | 1/2013 | Warren, Jr. |
| 8,353,826 B2 | 1/2013 | Weiman |

(56) References Cited

U.S. PATENT DOCUMENTS

| | | |
|---|---|---|
| 8,355,780 B2 | 1/2013 | Miles et al. |
| 8,382,842 B2 | 2/2013 | Greenhalgh et al. |
| 8,388,527 B2 | 3/2013 | Miles et al. |
| 8,398,713 B2 | 3/2013 | Weiman |
| 8,403,990 B2 | 3/2013 | Dryer et al. |
| 8,419,797 B2 | 4/2013 | Biedermann et al. |
| 8,425,528 B2 | 4/2013 | Berry et al. |
| 8,435,298 B2 | 5/2013 | Weiman |
| 8,480,576 B2 | 7/2013 | Sandhu |
| 8,496,706 B2 | 7/2013 | Ragab et al. |
| 8,500,634 B2 | 8/2013 | Miles et al. |
| 8,500,749 B2 | 8/2013 | Lee et al. |
| 8,506,635 B2 | 8/2013 | Palmatier et al. |
| 8,517,935 B2 | 8/2013 | Marchek et al. |
| 8,518,120 B2 | 8/2013 | Glerum et al. |
| 8,535,380 B2 | 9/2013 | Greenhalgh et al. |
| 8,545,566 B2 | 10/2013 | Niemiec et al. |
| 8,550,994 B2 | 10/2013 | Miles et al. |
| 8,556,808 B2 | 10/2013 | Miles et al. |
| 8,556,979 B2 | 10/2013 | Glerum et al. |
| 8,579,809 B2 | 11/2013 | Parker |
| 8,579,898 B2 | 11/2013 | Prandi et al. |
| 8,579,979 B2 | 11/2013 | Edie et al. |
| 8,579,981 B2 | 11/2013 | Lim et al. |
| 8,602,984 B2 | 12/2013 | Raymond et al. |
| 8,608,785 B2 | 12/2013 | Reed et al. |
| 8,628,576 B2 | 1/2014 | Triplett et al. |
| 8,628,578 B2 | 1/2014 | Miller et al. |
| 8,632,595 B2 | 1/2014 | Weiman |
| 8,641,768 B2 | 2/2014 | Duffield et al. |
| 8,647,386 B2 | 2/2014 | Gordon et al. |
| 8,663,329 B2 | 3/2014 | Ernst |
| 8,668,419 B2 | 3/2014 | Hardt et al. |
| 8,668,715 B2 | 3/2014 | Sandhu |
| 8,679,183 B2 | 3/2014 | Glerum et al. |
| 8,685,095 B2 | 4/2014 | Miller et al. |
| 8,685,098 B2 | 4/2014 | Glerum et al. |
| 8,696,559 B2 | 4/2014 | Miles et al. |
| 8,709,083 B2 | 4/2014 | Duffield et al. |
| 8,709,085 B2 | 4/2014 | Lechmann et al. |
| 8,709,086 B2 | 4/2014 | Glerum |
| 8,715,285 B2 | 5/2014 | Lewis et al. |
| 8,715,353 B2 | 5/2014 | Bagga et al. |
| 8,740,983 B1 | 6/2014 | Arnold et al. |
| 8,753,271 B1 | 6/2014 | Miles et al. |
| 8,753,396 B1 | 6/2014 | Hockett et al. |
| 8,764,649 B2 | 7/2014 | Miles et al. |
| 8,771,360 B2 | 7/2014 | Jimenez et al. |
| 8,778,025 B2 | 7/2014 | Ragab et al. |
| 8,778,027 B2 | 7/2014 | Medina |
| 8,795,366 B2 | 8/2014 | Varela |
| 8,808,304 B2 | 8/2014 | Weiman et al. |
| 8,808,305 B2 | 8/2014 | Kleiner |
| 8,827,902 B2 | 9/2014 | Dietze, Jr. et al. |
| 8,828,085 B1 | 9/2014 | Jensen |
| 8,840,668 B1 | 9/2014 | Donahoe et al. |
| 8,845,731 B2 | 9/2014 | Weiman |
| 8,845,732 B2 | 9/2014 | Weiman |
| 8,845,734 B2 | 9/2014 | Weiman |
| 8,852,252 B2 | 10/2014 | Venturini et al. |
| 8,852,282 B2 | 10/2014 | Farley et al. |
| 8,864,833 B2 | 10/2014 | Glerum et al. |
| 8,882,813 B2 | 11/2014 | Jones et al. |
| 8,888,853 B2 | 11/2014 | Glerum et al. |
| 8,894,708 B2 | 11/2014 | Thalgott et al. |
| 8,894,711 B2 | 11/2014 | Varela |
| 8,894,712 B2 | 11/2014 | Varela |
| 8,906,095 B2 | 12/2014 | Christensen et al. |
| 8,920,500 B1 | 12/2014 | Pimenta et al. |
| 8,926,704 B2 | 1/2015 | Glerum et al. |
| 8,936,641 B2 | 1/2015 | Cain |
| 8,940,049 B1 | 1/2015 | Jimenez et al. |
| 8,968,363 B2 | 3/2015 | Weiman et al. |
| 8,986,344 B2 | 3/2015 | Sandhu |
| 8,992,425 B2 | 3/2015 | Karpowicz et al. |
| 8,992,544 B2 | 3/2015 | Sasing |
| 8,998,906 B2 | 4/2015 | Kirschman |
| 9,005,292 B2 | 4/2015 | Melamed |
| 9,005,293 B2 | 4/2015 | Moskowitz et al. |
| 9,005,295 B2 | 4/2015 | Kueenzi et al. |
| 9,017,412 B2 | 4/2015 | Wolters et al. |
| 9,034,045 B2 | 5/2015 | Davenport et al. |
| 9,050,146 B2 | 6/2015 | Woolley et al. |
| 9,050,194 B2 | 6/2015 | Thibodeau |
| 9,060,877 B2 | 6/2015 | Kleiner |
| 9,072,548 B2 | 7/2015 | Matityahu |
| 9,072,563 B2 | 7/2015 | Garcia et al. |
| 9,084,591 B2 | 7/2015 | Reglos et al. |
| 9,113,854 B2 | 8/2015 | Ellman |
| 9,119,730 B2 | 9/2015 | Glerum et al. |
| 9,125,757 B2 | 9/2015 | Weiman |
| 9,132,021 B2 | 9/2015 | Mermuys et al. |
| 9,138,217 B2 | 9/2015 | Smith et al. |
| 9,138,330 B2 | 9/2015 | Hansell et al. |
| 9,138,331 B2 | 9/2015 | Aferzon |
| 9,149,367 B2 | 10/2015 | Davenport et al. |
| 9,155,628 B2 | 10/2015 | Glerum et al. |
| 9,155,631 B2 | 10/2015 | Seifert et al. |
| 9,161,841 B2 | 10/2015 | Kana et al. |
| 9,179,903 B2 | 11/2015 | Cianfrani et al. |
| 9,179,952 B2 | 11/2015 | Biedermann et al. |
| 9,186,193 B2 | 11/2015 | Kleiner et al. |
| 9,186,258 B2 | 11/2015 | Davenport et al. |
| 9,192,482 B1 | 11/2015 | Pimenta et al. |
| 9,192,483 B1 | 11/2015 | Radcliffe et al. |
| 9,198,772 B2 | 12/2015 | Weiman |
| 9,204,972 B2 | 12/2015 | Weiman et al. |
| 9,204,974 B2 | 12/2015 | Glerum et al. |
| 9,211,194 B2 | 12/2015 | Bagga et al. |
| 9,211,196 B2 | 12/2015 | Glerum et al. |
| 9,216,095 B2 | 12/2015 | Glerum et al. |
| 9,226,836 B2 | 1/2016 | Glerum |
| 9,233,007 B2 | 1/2016 | Sungarian et al. |
| 9,233,009 B2 | 1/2016 | Gray et al. |
| 9,233,010 B2 | 1/2016 | Thalgott et al. |
| 9,259,327 B2 | 2/2016 | Niemiec et al. |
| 9,271,846 B2 | 3/2016 | Lim et al. |
| 9,308,099 B2 | 4/2016 | Triplett et al. |
| 9,320,610 B2 | 4/2016 | Alheidt et al. |
| 9,351,845 B1 | 5/2016 | Pimenta et al. |
| 9,351,848 B2 | 5/2016 | Glerum et al. |
| 9,357,909 B2 | 6/2016 | Perez-Cruet et al. |
| 9,358,126 B2 | 6/2016 | Glerum et al. |
| 9,358,127 B2 | 6/2016 | Duffield et al. |
| 9,358,128 B2 | 6/2016 | Glerum et al. |
| 9,358,129 B2 | 6/2016 | Weiman |
| 9,364,341 B2 | 6/2016 | Gowan |
| 9,364,343 B2 | 6/2016 | Duffield et al. |
| 9,370,434 B2 | 6/2016 | Weiman |
| 9,370,435 B2 | 6/2016 | Walkenhorst et al. |
| 9,381,008 B2 | 7/2016 | Thornburg |
| 9,386,916 B2 | 7/2016 | Predick et al. |
| 9,387,092 B2 | 7/2016 | Mermuys et al. |
| 9,402,673 B2 | 8/2016 | Cormier et al. |
| 9,402,739 B2 | 8/2016 | Weiman et al. |
| 9,408,596 B2 | 8/2016 | Blain |
| 9,408,708 B2 | 8/2016 | Greenhalgh |
| 9,414,828 B2 | 8/2016 | Abidin et al. |
| 9,414,934 B2 | 8/2016 | Cain |
| 9,414,937 B2 | 8/2016 | Carlson et al. |
| 9,421,110 B2 | 8/2016 | Masson et al. |
| 9,427,331 B2 | 8/2016 | Arnin |
| 9,445,919 B2 | 9/2016 | Palmatier et al. |
| 9,452,063 B2 | 9/2016 | Glerum et al. |
| 9,456,903 B2 | 10/2016 | Glerum et al. |
| 9,456,906 B2 | 10/2016 | Gray et al. |
| 9,468,405 B2 | 10/2016 | Miles et al. |
| 9,474,622 B2 | 10/2016 | McLaughlin et al. |
| 9,474,625 B2 | 10/2016 | Weiman |
| 9,480,573 B2 | 11/2016 | Perloff et al. |
| 9,480,576 B2 | 11/2016 | Pepper et al. |
| 9,480,579 B2 | 11/2016 | Davenport et al. |
| 9,486,133 B2 | 11/2016 | Lee et al. |
| 9,486,325 B2 | 11/2016 | Davenport et al. |

(56) References Cited

U.S. PATENT DOCUMENTS

| | | |
|---|---|---|
| 9,486,327 B2 | 11/2016 | Martynova et al. |
| 9,486,328 B2 | 11/2016 | Jimenez et al. |
| 9,492,287 B2 | 11/2016 | Glerum et al. |
| 9,492,288 B2 | 11/2016 | Wagner et al. |
| 9,492,289 B2 | 11/2016 | Davenport et al. |
| 9,498,349 B2 | 11/2016 | Patterson et al. |
| 9,510,954 B2 | 12/2016 | Glerum et al. |
| 9,517,098 B2 | 12/2016 | Anderson |
| 9,522,070 B2 | 12/2016 | Flower et al. |
| 9,526,620 B2 | 12/2016 | Slivka et al. |
| 9,526,625 B2 | 12/2016 | Cain |
| 9,532,821 B2 | 1/2017 | Moskowitz et al. |
| 9,539,103 B2 | 1/2017 | McLaughlin et al. |
| 9,539,108 B2 | 1/2017 | Glerum et al. |
| 9,545,320 B2 | 1/2017 | Padovani et al. |
| 9,549,723 B2 | 1/2017 | Hynes et al. |
| 9,549,824 B2 | 1/2017 | McAfee |
| 9,561,116 B2 | 2/2017 | Weiman et al. |
| 9,566,163 B2 | 2/2017 | Suddaby et al. |
| 9,566,166 B2 | 2/2017 | Parry et al. |
| 9,566,168 B2 | 2/2017 | Glerum et al. |
| 9,572,560 B2 | 2/2017 | Mast et al. |
| 9,572,677 B2 | 2/2017 | Davenport et al. |
| 9,572,681 B2 | 2/2017 | Mathieu et al. |
| 9,579,124 B2 | 2/2017 | Gordon et al. |
| 9,579,139 B2 | 2/2017 | Cormier et al. |
| 9,579,213 B2 | 2/2017 | Bal et al. |
| 9,585,649 B2 | 3/2017 | Blain et al. |
| 9,585,762 B2 | 3/2017 | Suddaby et al. |
| 9,585,766 B2 | 3/2017 | Robinson |
| 9,585,767 B2 | 3/2017 | Robinson |
| 9,592,129 B2 | 3/2017 | Slivka et al. |
| 9,597,195 B2 | 3/2017 | Cain |
| 9,603,643 B2 | 3/2017 | Reed et al. |
| 9,603,713 B2 | 3/2017 | Moskowitz et al. |
| 9,603,717 B2 | 3/2017 | Ibarra et al. |
| 9,615,818 B2 | 4/2017 | Baudouin et al. |
| 9,615,936 B2 | 4/2017 | Duffield et al. |
| 9,622,732 B2 | 4/2017 | Martinelli et al. |
| 9,622,875 B2 | 4/2017 | Moskowitz et al. |
| 9,622,876 B1 | 4/2017 | Greenhalgh et al. |
| 9,629,729 B2 | 4/2017 | Grimberg, Jr. et al. |
| 9,636,097 B2 | 5/2017 | Bass |
| 9,642,720 B2 | 5/2017 | Radcliffe et al. |
| 9,649,198 B2 | 5/2017 | Wolters et al. |
| 9,655,746 B2 | 5/2017 | Seifert |
| 9,655,747 B2 | 5/2017 | Glerum et al. |
| 9,662,224 B2 | 5/2017 | Weiman et al. |
| 9,668,784 B2 | 6/2017 | Brumfield et al. |
| 9,668,876 B2 | 6/2017 | Blain et al. |
| 9,668,879 B2 | 6/2017 | Jimenez et al. |
| 9,675,465 B2 | 6/2017 | Padovani et al. |
| 9,675,467 B2 | 6/2017 | Duffield et al. |
| 9,675,468 B1 | 6/2017 | Jensen |
| 9,693,871 B2 | 7/2017 | Richerme et al. |
| 9,700,428 B2 | 7/2017 | Niemiec et al. |
| 9,707,092 B2 | 7/2017 | Davenport et al. |
| 9,713,536 B2 | 7/2017 | Foley et al. |
| 9,717,601 B2 | 8/2017 | Miller |
| 9,730,684 B2 | 8/2017 | Beale et al. |
| 9,730,806 B2 | 8/2017 | Capote |
| 9,737,288 B2 | 8/2017 | Karpowicz et al. |
| 9,750,617 B2 | 9/2017 | Lim et al. |
| 9,750,618 B1 | 9/2017 | Daffinson et al. |
| 9,757,249 B2 | 9/2017 | Radcliffe et al. |
| 9,763,722 B2 | 9/2017 | Roybal |
| 9,770,343 B2 | 9/2017 | Weiman |
| 9,782,265 B2 | 10/2017 | Weiman et al. |
| 9,788,971 B1 | 10/2017 | Stein |
| 9,795,370 B2 | 10/2017 | O'Connell et al. |
| 9,795,371 B2 | 10/2017 | Miles et al. |
| 9,801,733 B2 | 10/2017 | Wolters et al. |
| 9,801,734 B1 | 10/2017 | Stein et al. |
| 9,808,352 B2 | 11/2017 | Suddaby et al. |
| 9,826,966 B2 | 11/2017 | Mast et al. |
| 9,827,024 B2 | 11/2017 | Cormier et al. |
| 9,827,107 B1 | 11/2017 | Arnin |
| 9,833,333 B2 | 12/2017 | Duffield et al. |
| 9,833,336 B2 | 12/2017 | Davenport et al. |
| 9,839,527 B2 | 12/2017 | Robinson |
| 9,839,528 B2 | 12/2017 | Weiman et al. |
| 9,848,993 B2 | 12/2017 | Moskowitz et al. |
| 9,848,996 B2 | 12/2017 | Faulhaber |
| 9,855,151 B2 | 1/2018 | Weiman |
| 9,867,715 B2 | 1/2018 | McLaughlin et al. |
| 9,872,779 B2 | 1/2018 | Miller et al. |
| 9,889,019 B2 | 2/2018 | Rogers et al. |
| 9,907,671 B2 | 3/2018 | Fessler |
| 9,907,673 B2 | 3/2018 | Weiman et al. |
| 9,918,709 B2 | 3/2018 | Sandhu |
| 9,924,859 B2 | 3/2018 | Lee et al. |
| 9,924,940 B2 | 3/2018 | Moskowitz et al. |
| 9,925,062 B2 | 3/2018 | Glerum et al. |
| 9,925,064 B2 | 3/2018 | Duffield et al. |
| 9,931,223 B2 | 4/2018 | Cain |
| 9,937,053 B2 | 4/2018 | Melkent et al. |
| 9,937,060 B2 | 4/2018 | Fuhrer et al. |
| 9,943,342 B2 | 4/2018 | Tanaka et al. |
| 9,943,418 B2 | 4/2018 | Davenport et al. |
| 9,949,775 B2 | 4/2018 | Reed et al. |
| 9,949,841 B2 | 4/2018 | Glerum et al. |
| 9,956,087 B2 | 5/2018 | Seifert et al. |
| 9,962,202 B2 | 5/2018 | Anderson |
| 9,962,270 B2 | 5/2018 | Alheidt et al. |
| 9,962,271 B2 | 5/2018 | Glerum |
| 9,962,272 B1 | 5/2018 | Daffinson et al. |
| 9,968,461 B2 | 5/2018 | Zappacosta et al. |
| 9,968,462 B2 | 5/2018 | Weiman |
| 9,974,531 B2 | 5/2018 | Miles et al. |
| 9,974,662 B2 | 5/2018 | Hessler et al. |
| 9,974,664 B2 | 5/2018 | Emerick et al. |
| 9,980,825 B2 | 5/2018 | Nichols et al. |
| 9,980,826 B2 | 5/2018 | Martynova et al. |
| 9,987,141 B2 | 6/2018 | Duffield et al. |
| 9,987,143 B2 | 6/2018 | Robinson et al. |
| 9,987,144 B2 | 6/2018 | Seifert et al. |
| 9,987,146 B1 | 6/2018 | Lentner et al. |
| 9,993,239 B2 | 6/2018 | Karpowicz et al. |
| 9,993,350 B2 | 6/2018 | Cain |
| 10,004,607 B2 | 6/2018 | Weiman et al. |
| 10,004,608 B2 | 6/2018 | Carnes et al. |
| 10,016,282 B2 | 7/2018 | Seifert et al. |
| 10,016,284 B2 | 7/2018 | Moskowitz et al. |
| 10,022,239 B1 | 7/2018 | Lentner et al. |
| 10,028,842 B2 | 7/2018 | Gray et al. |
| 10,034,765 B2 | 7/2018 | Blain et al. |
| 10,034,769 B2 | 7/2018 | Baynham |
| 10,034,771 B2 | 7/2018 | Capote et al. |
| 10,034,772 B2 | 7/2018 | Glerum et al. |
| 10,034,773 B2 | 7/2018 | McLaughlin et al. |
| 10,039,539 B2 | 8/2018 | Friedrich et al. |
| 10,039,650 B2 | 8/2018 | Lamborne et al. |
| 10,052,214 B2 | 8/2018 | Jimenez et al. |
| 10,058,431 B2 | 8/2018 | Tyber et al. |
| 10,060,469 B2 | 8/2018 | Jimenez et al. |
| 10,070,852 B2 | 9/2018 | Mast et al. |
| 10,076,320 B2 | 9/2018 | Mast et al. |
| 10,076,423 B2 | 9/2018 | Miller et al. |
| 10,080,666 B2 | 9/2018 | Suddaby et al. |
| 10,080,669 B2 | 9/2018 | Davenport et al. |
| 10,085,846 B2 | 10/2018 | Grotz |
| 10,085,849 B2 | 10/2018 | Weiman et al. |
| 10,092,417 B2 | 10/2018 | Weiman et al. |
| 10,098,758 B2 | 10/2018 | Matthews et al. |
| 10,098,759 B2 | 10/2018 | Weiman |
| 10,111,755 B2 | 10/2018 | Foley et al. |
| 10,111,758 B2 | 10/2018 | Robinson |
| 10,117,754 B2 | 11/2018 | Davenport et al. |
| 10,117,755 B2 | 11/2018 | Emerick et al. |
| 10,137,002 B2 | 11/2018 | Padovani et al. |
| 10,137,006 B2 | 11/2018 | Dewey et al. |
| 10,137,007 B2 | 11/2018 | Dewey et al. |
| 10,137,009 B2 | 11/2018 | Weiman et al. |
| 10,149,671 B2 | 12/2018 | Predick et al. |

(56) References Cited

U.S. PATENT DOCUMENTS

| | | |
|---|---|---|
| 10,149,710 B2 | 12/2018 | Tanaka et al. |
| 10,154,781 B2 | 12/2018 | Weiman |
| 10,154,912 B2 | 12/2018 | Glerum |
| 10,154,914 B2 | 12/2018 | Robinson |
| 10,159,584 B2 | 12/2018 | Carnes et al. |
| 10,166,117 B1 | 1/2019 | Daffinson et al. |
| 10,172,515 B2 | 1/2019 | Lee et al. |
| 10,172,652 B2 | 1/2019 | Woolley et al. |
| 10,178,987 B2 | 1/2019 | Predick et al. |
| 10,179,053 B2 | 1/2019 | Zappacosta et al. |
| 10,182,922 B2 | 1/2019 | Nichols et al. |
| 10,188,527 B2 | 1/2019 | Rogers et al. |
| 10,195,050 B2 | 2/2019 | Palmatier et al. |
| 10,201,431 B2 | 2/2019 | Slater et al. |
| 10,213,192 B2 | 2/2019 | Capote |
| 10,213,193 B2 | 2/2019 | Karpowicz et al. |
| 10,219,798 B2 | 3/2019 | Capote |
| 10,219,913 B2 | 3/2019 | Matthews et al. |
| 10,219,914 B2 | 3/2019 | Faulhaber |
| 10,219,915 B1 | 3/2019 | Stein |
| 10,226,356 B2 | 3/2019 | Grotz |
| 10,226,359 B2 | 3/2019 | Glerum et al. |
| 10,238,375 B2 | 3/2019 | O'Connell et al. |
| 10,238,383 B2 | 3/2019 | Moskowitz et al. |
| 10,238,503 B2 | 3/2019 | Branch et al. |
| 10,245,015 B2 | 4/2019 | Predick et al. |
| 10,251,643 B2 | 4/2019 | Moskowitz et al. |
| 10,265,191 B2 | 4/2019 | Lim et al. |
| 10,278,686 B2 | 5/2019 | Baudouin et al. |
| 10,278,786 B2 | 5/2019 | Friedrich et al. |
| 10,278,830 B1 | 5/2019 | Walker et al. |
| 10,278,831 B2 | 5/2019 | Sandul |
| 10,278,832 B2 | 5/2019 | Nichols et al. |
| 10,285,680 B2 | 5/2019 | Friedrich et al. |
| 10,285,819 B2 | 5/2019 | Greenhalgh |
| 10,285,824 B2 | 5/2019 | Robinson |
| 10,292,828 B2 | 5/2019 | Greenhalgh |
| 10,299,777 B2 | 5/2019 | Mast et al. |
| 10,299,934 B2 | 5/2019 | Seifert et al. |
| 10,299,937 B2 | 5/2019 | McAfee |
| 10,307,268 B2 | 6/2019 | Moskowitz et al. |
| 10,314,622 B2 | 6/2019 | Brumfield et al. |
| 10,314,719 B2 | 6/2019 | Hessler et al. |
| 10,322,007 B2 | 6/2019 | Masson et al. |
| 10,322,009 B2 | 6/2019 | Aghayev et al. |
| 10,327,909 B2 | 6/2019 | Baynham |
| 10,327,912 B1 | 6/2019 | Suddaby |
| 10,327,917 B2 | 6/2019 | Glerum et al. |
| 10,342,675 B2 | 7/2019 | Alheidt |
| 10,350,085 B2 | 7/2019 | Glerum et al. |
| 10,357,233 B2 | 7/2019 | Miles et al. |
| 10,363,142 B2 | 7/2019 | McClintock et al. |
| 10,363,144 B2 | 7/2019 | Overes et al. |
| 10,369,004 B2 | 8/2019 | Faulhaber |
| 10,369,008 B2 | 8/2019 | Jimenez et al. |
| 10,369,010 B2 | 8/2019 | Robinson et al. |
| 10,369,012 B2 | 8/2019 | Fessler |
| 10,376,377 B2 | 8/2019 | Seifert et al. |
| 10,390,962 B2 | 8/2019 | Weiman |
| 10,390,964 B2 | 8/2019 | Faulhaber |
| 10,398,563 B2 | 9/2019 | Engstrom |
| 10,398,566 B2 | 9/2019 | Olmos et al. |
| 10,413,419 B2 | 9/2019 | Thibodeau |
| 10,413,422 B2 | 9/2019 | Flower et al. |
| 10,413,423 B2 | 9/2019 | Overes et al. |
| 10,426,450 B2 | 10/2019 | Vogel et al. |
| 10,426,633 B2 | 10/2019 | Moskowitz et al. |
| 10,426,634 B1 | 10/2019 | Al-Jazaeri et al. |
| 10,441,430 B2 | 10/2019 | Ludwig et al. |
| 10,449,056 B2 | 10/2019 | Cain |
| 10,456,122 B2 | 10/2019 | Koltz et al. |
| 10,470,894 B2 | 11/2019 | Foley et al. |
| 10,478,319 B2 | 11/2019 | Moskowitz et al. |
| 10,492,912 B2 | 12/2019 | Gregersen et al. |
| 10,492,922 B2 | 12/2019 | Mathieu et al. |
| 10,492,924 B2 | 12/2019 | Stein et al. |
| 10,500,064 B2 | 12/2019 | Robinson |
| 10,512,550 B2 | 12/2019 | Bechtel et al. |
| 10,517,645 B2 | 12/2019 | Van Der Pol |
| 10,524,924 B2 | 1/2020 | Davenport et al. |
| 10,531,903 B2 | 1/2020 | Daly et al. |
| 10,537,436 B2 | 1/2020 | Maguire et al. |
| 10,537,438 B2 | 1/2020 | Martynova et al. |
| 10,555,729 B1 | 2/2020 | Cole et al. |
| 10,561,411 B1 | 2/2020 | Cole et al. |
| 10,575,889 B2 | 3/2020 | Roybal |
| 10,575,960 B2 | 3/2020 | Duffield et al. |
| 10,582,959 B2 | 3/2020 | Langer et al. |
| 10,583,015 B2 | 3/2020 | Olmos et al. |
| 10,603,078 B2 | 3/2020 | Simpson et al. |
| 10,610,376 B2 | 4/2020 | Kuyler et al. |
| 10,624,757 B2 | 4/2020 | Bost et al. |
| 10,624,758 B2 | 4/2020 | Slivka et al. |
| 10,624,761 B2 | 4/2020 | Davenport et al. |
| 10,639,163 B2 | 5/2020 | Tyber et al. |
| 10,639,166 B2 | 5/2020 | Weiman et al. |
| 10,653,458 B2 | 5/2020 | Tanaka et al. |
| 10,667,925 B2 | 6/2020 | Emerick et al. |
| 10,667,927 B2 | 6/2020 | Lamborne et al. |
| 10,675,157 B2 | 6/2020 | Zakelj et al. |
| 10,682,241 B2 | 6/2020 | Glerum et al. |
| 10,687,963 B2 | 6/2020 | Jimenez et al. |
| 10,702,393 B2 | 7/2020 | Davenport et al. |
| 10,709,569 B2 | 7/2020 | McLaughlin et al. |
| 10,709,571 B2 | 7/2020 | Iott et al. |
| 10,709,572 B2 | 7/2020 | Daffinson et al. |
| 10,709,575 B2 | 7/2020 | Robinson |
| 10,722,377 B2 | 7/2020 | Glerum et al. |
| 10,722,379 B2 | 7/2020 | McLaughlin et al. |
| 10,729,561 B2 | 8/2020 | Glerum |
| 10,743,858 B1 | 8/2020 | Cole et al. |
| 10,744,002 B2 | 8/2020 | Glerum et al. |
| 10,758,366 B2 | 9/2020 | Daffinson et al. |
| 10,758,367 B2 | 9/2020 | Weiman et al. |
| 10,758,369 B2 | 9/2020 | Rogers et al. |
| 10,765,528 B2 | 9/2020 | Weiman et al. |
| 10,772,737 B2 | 9/2020 | Gray et al. |
| 10,779,955 B2 | 9/2020 | Kuyler et al. |
| 10,779,957 B2 | 9/2020 | Weiman et al. |
| 10,786,364 B2 | 9/2020 | Davenport et al. |
| 10,786,369 B2 | 9/2020 | Carnes et al. |
| 10,799,368 B2 | 10/2020 | Glerum et al. |
| 10,835,387 B2 | 11/2020 | Weiman et al. |
| 10,842,640 B2 | 11/2020 | Weiman et al. |
| 10,842,644 B2 | 11/2020 | Weiman et al. |
| 10,856,997 B2 | 12/2020 | Cowan et al. |
| 10,869,769 B2 | 12/2020 | Eisen et al. |
| 10,874,447 B2 | 12/2020 | Tanaka et al. |
| 10,874,522 B2 | 12/2020 | Weiman |
| 10,874,523 B2 | 12/2020 | Weiman et al. |
| 10,874,524 B2 | 12/2020 | Bjork |
| 10,881,524 B2 | 1/2021 | Eisen et al. |
| 10,881,531 B2 | 1/2021 | Berry |
| 10,888,431 B1 | 1/2021 | Robinson |
| 10,898,344 B2 | 1/2021 | Alheidt et al. |
| 10,898,346 B1 | 1/2021 | Suddaby |
| 10,925,656 B2 | 2/2021 | Cole et al. |
| 10,925,750 B2 | 2/2021 | Zappacosta et al. |
| 10,925,752 B2 | 2/2021 | Weiman |
| 10,932,920 B2 | 3/2021 | Dewey et al. |
| 10,940,014 B2 | 3/2021 | Greenhalgh |
| 10,945,858 B2 | 3/2021 | Bechtel et al. |
| 10,952,866 B2 | 3/2021 | Warren et al. |
| 10,959,855 B2 | 3/2021 | Miller et al. |
| 10,959,856 B2 | 3/2021 | Seifert et al. |
| 10,973,649 B2 | 4/2021 | Weiman et al. |
| 10,973,650 B2 | 4/2021 | Stein |
| 10,980,642 B2 | 4/2021 | Glerum et al. |
| 10,980,644 B2 | 4/2021 | Purcell et al. |
| 10,993,814 B2 | 5/2021 | Wolters |
| 11,007,067 B2 | 5/2021 | Masson et al. |
| 11,013,617 B2 | 5/2021 | Weiman et al. |
| 11,020,238 B2 | 6/2021 | Nichols et al. |
| 11,020,239 B2 | 6/2021 | Miller et al. |

(56) References Cited

U.S. PATENT DOCUMENTS

| | | |
|---|---|---|
| 11,026,804 B2 | 6/2021 | Jimenez et al. |
| 11,026,812 B2 | 6/2021 | Daffinson et al. |
| 11,033,401 B2 | 6/2021 | Shoshtaev |
| 11,033,402 B2 | 6/2021 | Melkent et al. |
| 11,033,404 B2 | 6/2021 | Faulhaber |
| 11,039,935 B2 | 6/2021 | McAfee |
| 11,045,326 B2 | 6/2021 | Seifert et al. |
| 11,045,327 B2 | 6/2021 | Nichols et al. |
| 11,051,949 B2 | 7/2021 | Walker et al. |
| 11,051,951 B2 | 7/2021 | Robinson et al. |
| 11,058,469 B2 | 7/2021 | Mahajan et al. |
| 11,065,127 B1 | 7/2021 | Lentner et al. |
| 11,065,129 B2 | 7/2021 | Sandul |
| 11,065,130 B2 | 7/2021 | Branch et al. |
| 11,076,966 B2 | 8/2021 | Faulhaber |
| 11,083,584 B2 | 8/2021 | Lauf et al. |
| 11,083,595 B2 | 8/2021 | Robinson |
| 11,090,167 B2 | 8/2021 | Emerick et al. |
| 11,096,795 B2 | 8/2021 | Padovani et al. |
| 11,096,797 B2 | 8/2021 | Moskowitz et al. |
| 11,103,366 B2 | 8/2021 | Glerum et al. |
| RE48,719 E | 9/2021 | Suddaby et al. |
| 11,109,980 B2 | 9/2021 | Seifert et al. |
| 11,116,644 B2 | 9/2021 | Marrocco et al. |
| 11,123,198 B2 | 9/2021 | Black et al. |
| 11,123,200 B2 | 9/2021 | Faulhaber |
| 11,129,731 B2 | 9/2021 | Miller et al. |
| 11,135,071 B2 | 10/2021 | Dewey et al. |
| 11,147,680 B2 | 10/2021 | Tyber et al. |
| 11,154,404 B2 | 10/2021 | Freedman et al. |
| 11,160,666 B2 | 11/2021 | Burkhardt et al. |
| 11,160,669 B2 | 11/2021 | Rogers et al. |
| 11,166,826 B2 | 11/2021 | Huang |
| 11,173,044 B1 | 11/2021 | Jones et al. |
| 11,179,234 B2 | 11/2021 | Dacosta et al. |
| 11,285,014 B1 | 3/2022 | Josse et al. |
| 11,376,134 B1 | 7/2022 | Dewey et al. |
| 11,395,743 B1 * | 7/2022 | Hynes ............... A61F 2/30749 |
| 11,617,658 B2 | 4/2023 | Josse et al. |
| 11,723,780 B2 | 8/2023 | Seifert et al. |
| 11,737,892 B1 | 8/2023 | Kadaba et al. |
| 12,064,354 B2 | 8/2024 | Robinson et al. |
| 2002/0045943 A1 | 4/2002 | Uk |
| 2002/0045945 A1 | 4/2002 | Liu et al. |
| 2002/0055741 A1 | 5/2002 | Schlapfer et al. |
| 2002/0116066 A1 | 8/2002 | Chauvin et al. |
| 2002/0128713 A1 | 9/2002 | Ferree |
| 2002/0151976 A1 | 10/2002 | Foley et al. |
| 2002/0183762 A1 | 12/2002 | Anderson et al. |
| 2003/0050701 A1 | 3/2003 | Michelson |
| 2003/0130739 A1 | 7/2003 | Gerbec et al. |
| 2003/0163132 A1 | 8/2003 | Chin |
| 2004/0102778 A1 | 5/2004 | Huebner et al. |
| 2004/0172134 A1 | 9/2004 | Berry |
| 2004/0186570 A1 | 9/2004 | Rapp |
| 2004/0193158 A1 | 9/2004 | Lim et al. |
| 2004/0204713 A1 | 10/2004 | Abdou |
| 2004/0249461 A1 | 12/2004 | Ferree |
| 2004/0254643 A1 | 12/2004 | Jackson |
| 2004/0254644 A1 | 12/2004 | Taylor |
| 2005/0015094 A1 | 1/2005 | Keller |
| 2005/0015149 A1 | 1/2005 | Michelson |
| 2005/0033429 A1 | 2/2005 | Kuo |
| 2005/0033439 A1 | 2/2005 | Gordon et al. |
| 2005/0147478 A1 | 7/2005 | Greenberg |
| 2005/0154459 A1 | 7/2005 | Wolek et al. |
| 2005/0209698 A1 | 9/2005 | Gordon et al. |
| 2005/0228398 A1 | 10/2005 | Rathbun et al. |
| 2006/0122701 A1 | 6/2006 | Kiester |
| 2006/0129244 A1 | 6/2006 | Ensign |
| 2006/0260446 A1 | 11/2006 | Chang |
| 2006/0276901 A1 | 12/2006 | Zipnick et al. |
| 2007/0173840 A1 | 7/2007 | Huebner |
| 2007/0218750 A1 | 9/2007 | Corrao et al. |
| 2007/0233150 A1 | 10/2007 | Blain et al. |
| 2007/0270859 A1 | 11/2007 | Companioni et al. |
| 2008/0058804 A1 | 3/2008 | Lechot et al. |
| 2008/0132959 A1 | 6/2008 | Mikkonen et al. |
| 2008/0140207 A1 | 6/2008 | Olmos et al. |
| 2008/0287957 A1 | 11/2008 | Hester et al. |
| 2009/0024158 A1 | 1/2009 | Viker |
| 2009/0036746 A1 | 2/2009 | Blackwell et al. |
| 2009/0093830 A1 | 4/2009 | Miller |
| 2009/0105834 A1 | 4/2009 | Hovda et al. |
| 2009/0292361 A1 | 11/2009 | Lopez |
| 2010/0049324 A1 * | 2/2010 | Valdevit ............... A61F 2/447 623/17.16 |
| 2010/0070035 A1 | 3/2010 | Mayer |
| 2010/0076440 A1 | 3/2010 | Pamichev et al. |
| 2010/0082109 A1 | 4/2010 | Greenhalgh et al. |
| 2010/0114183 A1 | 5/2010 | Wassinger et al. |
| 2010/0152853 A1 | 6/2010 | Kirschman |
| 2010/0191336 A1 | 7/2010 | Greenhalgh |
| 2010/0211176 A1 | 8/2010 | Greenhalgh |
| 2010/0280617 A1 | 11/2010 | Coppes et al. |
| 2010/0286777 A1 | 11/2010 | Errico et al. |
| 2011/0118843 A1 | 5/2011 | Mathieu et al. |
| 2011/0130838 A1 | 6/2011 | Morgenstern Lopez |
| 2011/0144755 A1 | 6/2011 | Baynham et al. |
| 2011/0153020 A1 | 6/2011 | Abdelgany et al. |
| 2011/0218572 A1 | 9/2011 | Lechmann et al. |
| 2011/0218631 A1 | 9/2011 | Woodburn, Sr. et al. |
| 2011/0237898 A1 | 9/2011 | Stone et al. |
| 2011/0301577 A1 | 12/2011 | Simmen et al. |
| 2012/0004732 A1 | 1/2012 | Goel et al. |
| 2012/0010717 A1 | 1/2012 | Spann |
| 2012/0095515 A1 | 4/2012 | Hamilton |
| 2012/0101581 A1 | 4/2012 | Mathieu et al. |
| 2012/0109142 A1 | 5/2012 | Dayan |
| 2012/0109309 A1 | 5/2012 | Mathieu et al. |
| 2012/0109310 A1 | 5/2012 | Mathieu et al. |
| 2012/0109312 A1 | 5/2012 | Mathieu et al. |
| 2012/0109313 A1 | 5/2012 | Mathieu et al. |
| 2012/0123546 A1 | 5/2012 | Medina |
| 2012/0143195 A1 | 6/2012 | Sander |
| 2012/0150237 A1 | 6/2012 | Combrowski |
| 2012/0197401 A1 | 8/2012 | Duncan et al. |
| 2012/0209385 A1 | 8/2012 | Aferzon |
| 2012/0215313 A1 | 8/2012 | Saidha et al. |
| 2012/0215316 A1 | 8/2012 | Mohr et al. |
| 2012/0232349 A1 | 9/2012 | Perrow |
| 2013/0103095 A1 | 4/2013 | Brumfield et al. |
| 2013/0158664 A1 | 6/2013 | Palmatier et al. |
| 2013/0184823 A1 | 7/2013 | Malberg |
| 2013/0190876 A1 | 7/2013 | Drochner et al. |
| 2013/0211526 A1 | 8/2013 | Alheidt et al. |
| 2013/0226191 A1 | 8/2013 | Thoren et al. |
| 2013/0231747 A1 | 9/2013 | Olmos et al. |
| 2013/0274557 A1 | 10/2013 | Bowman et al. |
| 2013/0304136 A1 | 11/2013 | Gourlaouen-Preissler et al. |
| 2013/0317312 A1 | 11/2013 | Eastlack et al. |
| 2014/0018816 A1 | 1/2014 | Fenn et al. |
| 2014/0039622 A1 | 2/2014 | Glerum et al. |
| 2014/0107790 A1 | 4/2014 | Combrowski |
| 2014/0114321 A1 | 4/2014 | Davenport et al. |
| 2014/0114420 A1 | 4/2014 | Robinson |
| 2014/0148904 A1 | 5/2014 | Robinson |
| 2014/0163682 A1 | 6/2014 | Iott et al. |
| 2014/0180419 A1 | 6/2014 | Dmuschewsky |
| 2014/0194992 A1 | 7/2014 | Medina |
| 2014/0249629 A1 | 9/2014 | Moskowitz et al. |
| 2014/0249631 A1 | 9/2014 | Weiman |
| 2014/0277471 A1 | 9/2014 | Gray et al. |
| 2014/0277473 A1 | 9/2014 | Perrow |
| 2014/0277487 A1 | 9/2014 | Davenport et al. |
| 2014/0277500 A1 | 9/2014 | Logan et al. |
| 2014/0303674 A1 | 10/2014 | Sasing |
| 2014/0364855 A1 | 12/2014 | Stoll et al. |
| 2014/0379085 A1 | 12/2014 | Duffield et al. |
| 2015/0173915 A1 | 6/2015 | Laubert et al. |
| 2015/0223945 A1 | 8/2015 | Weiman et al. |
| 2015/0230931 A1 | 8/2015 | Greenhalgh |
| 2015/0238236 A1 | 8/2015 | Sasing |
| 2015/0354635 A1 | 12/2015 | McClymont et al. |

(56) References Cited

U.S. PATENT DOCUMENTS

| | | |
|---|---|---|
| 2015/0374507 A1 | 12/2015 | Wolters et al. |
| 2016/0008924 A1 | 1/2016 | Canourgues et al. |
| 2016/0022434 A1 | 1/2016 | Robinson |
| 2016/0051373 A1 | 2/2016 | Faulhaber |
| 2016/0058571 A1 | 3/2016 | McLaughlin et al. |
| 2016/0081681 A1 | 3/2016 | Waugh et al. |
| 2016/0089247 A1 | 3/2016 | Nichols et al. |
| 2016/0095710 A1 | 4/2016 | Juszczyk et al. |
| 2016/0095718 A1 | 4/2016 | Burkhardt et al. |
| 2016/0100951 A1 | 4/2016 | Suddaby et al. |
| 2016/0128847 A1 | 5/2016 | Kurtaliaj et al. |
| 2016/0199073 A1 | 7/2016 | Nino et al. |
| 2016/0242930 A1 | 8/2016 | Duffield et al. |
| 2016/0256291 A1 | 9/2016 | Miller |
| 2016/0278830 A1 | 9/2016 | Arrington |
| 2016/0296340 A1 | 10/2016 | Gordon et al. |
| 2016/0310291 A1 | 10/2016 | Greenhalgh |
| 2016/0345952 A1 | 12/2016 | Kucharzyk et al. |
| 2016/0367377 A1 | 12/2016 | Faulhaber |
| 2017/0010025 A1 | 1/2017 | Mayershofer |
| 2017/0029635 A1 | 2/2017 | Doll et al. |
| 2017/0035406 A1 | 2/2017 | Abidin et al. |
| 2017/0049651 A1 | 2/2017 | Lim et al. |
| 2017/0049653 A1 | 2/2017 | Lim et al. |
| 2017/0095345 A1 | 4/2017 | Davenport et al. |
| 2017/0100255 A1 | 4/2017 | Hleihil et al. |
| 2017/0100257 A1 | 4/2017 | Weiman et al. |
| 2017/0105844 A1 | 4/2017 | Kuyler et al. |
| 2017/0112630 A1 | 4/2017 | Kuyler et al. |
| 2017/0151065 A1 | 6/2017 | Warren et al. |
| 2017/0156882 A1 | 6/2017 | Rathbun et al. |
| 2017/0156884 A1 | 6/2017 | Rathbun et al. |
| 2017/0189200 A1 | 7/2017 | Miller et al. |
| 2017/0189204 A1 | 7/2017 | Riemhofer et al. |
| 2017/0202678 A1 | 7/2017 | Duffield et al. |
| 2017/0215856 A1 | 8/2017 | Martinelli et al. |
| 2017/0224502 A1 | 8/2017 | Wolters et al. |
| 2017/0224504 A1 | 8/2017 | Butler et al. |
| 2017/0231675 A1 | 8/2017 | Combrowski |
| 2017/0231780 A1 | 8/2017 | D'Urso |
| 2017/0246006 A1 | 8/2017 | Carnes et al. |
| 2017/0290677 A1 | 10/2017 | Olmos et al. |
| 2017/0296352 A1 | 10/2017 | Richerme et al. |
| 2017/0333200 A1 | 11/2017 | Arnin |
| 2017/0367842 A1 | 12/2017 | Predick et al. |
| 2017/0367843 A1 | 12/2017 | Eisen et al. |
| 2017/0367844 A1 | 12/2017 | Eisen et al. |
| 2017/0367845 A1 | 12/2017 | Eisen et al. |
| 2018/0000606 A1 | 1/2018 | Hessler et al. |
| 2018/0030362 A1 | 2/2018 | Kosler et al. |
| 2018/0031810 A1 | 2/2018 | Hsu et al. |
| 2018/0036136 A1 | 2/2018 | Duffield et al. |
| 2018/0036138 A1 | 2/2018 | Robinson |
| 2018/0104066 A1 | 4/2018 | Bae et al. |
| 2018/0116819 A1 | 5/2018 | Maguire et al. |
| 2018/0116891 A1 | 5/2018 | Beale et al. |
| 2018/0193160 A1 | 7/2018 | Hsu et al. |
| 2018/0193164 A1 | 7/2018 | Shoshtaev |
| 2018/0206999 A1 | 7/2018 | Suddaby |
| 2018/0256356 A1 | 9/2018 | Robinson et al. |
| 2018/0256359 A1 | 9/2018 | Greenhalgh |
| 2018/0256360 A1 | 9/2018 | Cain |
| 2018/0256362 A1 | 9/2018 | Slivka et al. |
| 2018/0263784 A1 | 9/2018 | Bechtel et al. |
| 2018/0271513 A1 | 9/2018 | Perrow et al. |
| 2018/0280142 A1 | 10/2018 | Schultz et al. |
| 2018/0303473 A1 | 10/2018 | Spann et al. |
| 2018/0303621 A1 | 10/2018 | Brotman et al. |
| 2018/0303625 A1 | 10/2018 | Alheidt et al. |
| 2018/0311048 A1 | 11/2018 | Glerum et al. |
| 2018/0318101 A1 | 11/2018 | Engstrom |
| 2018/0318102 A1 | 11/2018 | Seifert et al. |
| 2018/0325574 A1 | 11/2018 | Bjork et al. |
| 2018/0338838 A1 | 11/2018 | Cryder et al. |
| 2018/0338841 A1 | 11/2018 | Miller et al. |
| 2018/0344307 A1 | 12/2018 | Hynes et al. |
| 2018/0360616 A1 | 12/2018 | Luu |
| 2019/0000640 A1 | 1/2019 | Weiman |
| 2019/0000702 A1 | 1/2019 | Lim et al. |
| 2019/0000707 A1 | 1/2019 | Lim et al. |
| 2019/0020121 A1 | 1/2019 | Paulotto et al. |
| 2019/0021716 A1 | 1/2019 | Waugh et al. |
| 2019/0021873 A1 | 1/2019 | Dmuschewsky |
| 2019/0046329 A1 | 2/2019 | Padovani et al. |
| 2019/0046381 A1 | 2/2019 | Lim et al. |
| 2019/0046383 A1 | 2/2019 | Lim et al. |
| 2019/0060083 A1 | 2/2019 | Weiman et al. |
| 2019/0082949 A1 | 3/2019 | Weiman |
| 2019/0083081 A1 | 3/2019 | Ortiz et al. |
| 2019/0091033 A1 | 3/2019 | Dewey et al. |
| 2019/0105175 A1 | 4/2019 | Zappacosta et al. |
| 2019/0125328 A1 | 5/2019 | Blain |
| 2019/0133434 A1 | 5/2019 | Lee et al. |
| 2019/0133645 A1 | 5/2019 | Gordon et al. |
| 2019/0133779 A1 | 5/2019 | McLaughlin et al. |
| 2019/0133780 A1 | 5/2019 | Matthews et al. |
| 2019/0133784 A1 | 5/2019 | Gunn et al. |
| 2019/0133788 A1 | 5/2019 | Weiman et al. |
| 2019/0142480 A1 | 5/2019 | Woolley et al. |
| 2019/0151115 A1 | 5/2019 | Nichols et al. |
| 2019/0183656 A1 | 6/2019 | Stein |
| 2019/0201209 A1 | 7/2019 | Branch et al. |
| 2019/0201210 A1 | 7/2019 | Besaw et al. |
| 2019/0209155 A1 | 7/2019 | Mast et al. |
| 2019/0216453 A1 | 7/2019 | Predick et al. |
| 2019/0231552 A1 | 8/2019 | Sandul |
| 2019/0240039 A1 | 8/2019 | Walker et al. |
| 2019/0240043 A1 | 8/2019 | Greenhalgh |
| 2019/0247098 A1 | 8/2019 | Brumfield et al. |
| 2019/0254650 A1 | 8/2019 | Martinelli et al. |
| 2019/0254838 A1 | 8/2019 | Miller et al. |
| 2019/0254839 A1 | 8/2019 | Nichols et al. |
| 2019/0262009 A1 | 8/2019 | Cheng |
| 2019/0262139 A1 | 8/2019 | Wolters |
| 2019/0269521 A1 | 9/2019 | Shoshtaev |
| 2019/0274670 A1 | 9/2019 | O'Connell et al. |
| 2019/0274671 A1 | 9/2019 | Lauf et al. |
| 2019/0274836 A1 | 9/2019 | Eisen et al. |
| 2019/0282373 A1 | 9/2019 | Alheidt |
| 2019/0290446 A1 | 9/2019 | Masson et al. |
| 2019/0290447 A1 | 9/2019 | Stein |
| 2019/0298416 A1 | 10/2019 | Rezach |
| 2019/0298524 A1 | 10/2019 | Lauf et al. |
| 2019/0298540 A1 | 10/2019 | Aghayev et al. |
| 2019/0321022 A1 | 10/2019 | Karpowicz et al. |
| 2019/0321190 A1 | 10/2019 | Wagner et al. |
| 2019/0328539 A1 | 10/2019 | Suh et al. |
| 2019/0328540 A1 | 10/2019 | Seifert et al. |
| 2019/0329388 A1 | 10/2019 | Erickson et al. |
| 2019/0336301 A1 | 11/2019 | Engstrom |
| 2019/0336304 A1 | 11/2019 | Burkhardt et al. |
| 2019/0350573 A1 | 11/2019 | Vogel et al. |
| 2019/0358049 A1 | 11/2019 | Faulhaber |
| 2019/0358050 A1 | 11/2019 | Fessler |
| 2019/0358051 A1 | 11/2019 | Flower et al. |
| 2019/0380840 A1 | 12/2019 | Tyber et al. |
| 2019/0388232 A1 | 12/2019 | Purcell et al. |
| 2020/0008951 A1 | 1/2020 | McClintock et al. |
| 2020/0030114 A1 | 1/2020 | Cain |
| 2020/0030116 A1 | 1/2020 | Jimenez et al. |
| 2020/0038200 A1 | 2/2020 | Foley et al. |
| 2020/0054461 A1 | 2/2020 | Marrocco et al. |
| 2020/0060844 A1 | 2/2020 | Mathieu et al. |
| 2020/0069316 A1 | 3/2020 | DeSoutter et al. |
| 2020/0078190 A1 | 3/2020 | Rogers et al. |
| 2020/0093526 A1 | 3/2020 | Daly et al. |
| 2020/0093607 A1 | 3/2020 | Davenport et al. |
| 2020/0093609 A1 | 3/2020 | Shoshtaev |
| 2020/0100904 A1 | 4/2020 | Stein et al. |
| 2020/0107824 A1 | 4/2020 | Fleischer |
| 2020/0129306 A1 | 4/2020 | Miller et al. |
| 2020/0129307 A1 | 4/2020 | Hunziker et al. |
| 2020/0138591 A1 | 5/2020 | Moskowitz et al. |
| 2020/0138593 A1 | 5/2020 | Martynova et al. |

(56) References Cited

U.S. PATENT DOCUMENTS

| | | |
|---|---|---|
| 2020/0146840 A1 | 5/2020 | Black et al. |
| 2020/0179120 A1 | 6/2020 | Blelenstein et al. |
| 2020/0205993 A1 | 7/2020 | Davenport et al. |
| 2020/0214754 A1 | 7/2020 | Bowen et al. |
| 2020/0222202 A1 | 7/2020 | Kuyler et al. |
| 2020/0229944 A1 | 7/2020 | Suh et al. |
| 2020/0246159 A1 | 8/2020 | Suh et al. |
| 2020/0246162 A1 | 8/2020 | Schultz et al. |
| 2020/0261242 A1 | 8/2020 | Bost et al. |
| 2020/0268524 A1 | 8/2020 | Glerum et al. |
| 2020/0276028 A1 | 9/2020 | Blain et al. |
| 2020/0281741 A1 | 9/2020 | Grotz |
| 2020/0289287 A1 | 9/2020 | Emerick et al. |
| 2020/0297507 A1 | 9/2020 | Iott et al. |
| 2020/0330239 A1 | 10/2020 | Davenport et al. |
| 2020/0330245 A1 | 10/2020 | Glerum |
| 2020/0345511 A1 | 11/2020 | Daffinson et al. |
| 2020/0352731 A1 | 11/2020 | Berry |
| 2020/0352738 A1 | 11/2020 | Berry |
| 2020/0360153 A1 | 11/2020 | Weiman et al. |
| 2020/0375753 A1 | 12/2020 | McLaughlin et al. |
| 2020/0375755 A1 | 12/2020 | Cain |
| 2020/0383797 A1 | 12/2020 | Predick et al. |
| 2020/0383799 A1 | 12/2020 | Cain |
| 2020/0390433 A1 | 12/2020 | Yu et al. |
| 2020/0390565 A1 | 12/2020 | Jimenez et al. |
| 2020/0397593 A1 | 12/2020 | Davenport et al. |
| 2020/0405497 A1 | 12/2020 | Olmos et al. |
| 2020/0405498 A1 | 12/2020 | Gray et al. |
| 2020/0405499 A1 | 12/2020 | Gerbec et al. |
| 2020/0405500 A1 | 12/2020 | Cain |
| 2021/0007860 A1 | 1/2021 | Glerum et al. |
| 2021/0015626 A1 | 1/2021 | Suddaby |
| 2021/0030555 A1 | 2/2021 | Weiman et al. |
| 2021/0030561 A1 | 2/2021 | Gleason |
| 2021/0045479 A1 | 2/2021 | Rogers et al. |
| 2021/0045892 A1 | 2/2021 | Rogers et al. |
| 2021/0052395 A1 | 2/2021 | Iott et al. |
| 2021/0068959 A1 | 3/2021 | McLuen et al. |
| 2021/0068974 A1 | 3/2021 | Cowan et al. |
| 2021/0068982 A1 | 3/2021 | Carnes et al. |
| 2021/0077271 A1 | 3/2021 | Sharabani |
| 2021/0077272 A1 | 3/2021 | Eisen et al. |
| 2021/0085479 A1 | 3/2021 | Weiman et al. |
| 2021/0093462 A1 | 4/2021 | Lucasiewicz et al. |
| 2021/0106434 A1 | 4/2021 | Alheidt et al. |
| 2021/0113349 A1 | 4/2021 | Weiman et al. |
| 2021/0121299 A1 | 4/2021 | Hyder |
| 2021/0121300 A1 | 4/2021 | Weiman et al. |
| 2021/0137697 A1 | 5/2021 | Weiman |
| 2021/0137699 A1 | 5/2021 | Jang et al. |
| 2021/0137701 A1 | 5/2021 | Miller et al. |
| 2021/0154811 A1 | 5/2021 | Spreiter et al. |
| 2021/0161678 A1 | 6/2021 | Dewey et al. |
| 2021/0177618 A1 | 6/2021 | Branch et al. |
| 2021/0186706 A1 | 6/2021 | Spitler et al. |
| 2021/0186709 A1 | 6/2021 | Weiman et al. |
| 2021/0196470 A1 | 7/2021 | Shoshtaev |
| 2021/0205092 A1 | 7/2021 | Glerum et al. |
| 2021/0205094 A1 | 7/2021 | Weiman et al. |
| 2021/0220145 A1 | 7/2021 | Stein |
| 2021/0220147 A1 | 7/2021 | Berry |
| 2021/0236298 A1 | 8/2021 | Weiman et al. |
| 2021/0251770 A1 | 8/2021 | Purcell et al. |
| 2021/0251776 A1 | 8/2021 | Daffinson et al. |
| 2021/0259848 A1 | 8/2021 | Kang et al. |
| 2021/0259849 A1 | 8/2021 | Robinson et al. |
| 2021/0259850 A1 | 8/2021 | Eisen et al. |
| 2021/0267767 A1 | 9/2021 | Stein |
| 2021/0275317 A1 | 9/2021 | Spetzger |
| 2021/0275318 A1 | 9/2021 | Reimels |
| 2021/0275319 A1 | 9/2021 | Reimels |
| 2021/0275321 A1 | 9/2021 | Seifert et al. |
| 2021/0282938 A1 | 9/2021 | Nichols et al. |
| 2021/0298915 A1 | 9/2021 | Faulhaber |
| 2021/0298916 A1 | 9/2021 | Melkent et al. |
| 2021/0307920 A1 | 10/2021 | Walker et al. |
| 2021/0315705 A1 | 10/2021 | Altarac et al. |
| 2021/0322179 A1 | 10/2021 | Miller et al. |
| 2021/0322181 A1 | 10/2021 | Predick |
| 2021/0322182 A1 | 10/2021 | Faulhaber |
| 2021/0330472 A1 | 10/2021 | Shoshtaev |
| 2021/0346174 A1 | 11/2021 | Flint et al. |
| 2021/0353277 A1 | 11/2021 | Gregersen et al. |
| 2021/0401586 A1 | 12/2021 | Zakelj |
| 2022/0015924 A1 | 1/2022 | Freedman et al. |
| 2022/0047312 A1 | 2/2022 | Seykora et al. |
| 2022/0087819 A1 | 3/2022 | Robinson et al. |
| 2022/0133336 A1 | 5/2022 | Tsai et al. |
| 2022/0133497 A1 | 5/2022 | Dewey et al. |
| 2022/0133498 A1 | 5/2022 | Josse et al. |
| 2022/0133499 A1 | 5/2022 | Josse et al. |
| 2022/0218325 A1 | 7/2022 | Josse |
| 2022/0265256 A1 | 8/2022 | Villamil et al. |
| 2022/0313450 A1 | 10/2022 | Donohoe et al. |
| 2022/0387013 A1 | 12/2022 | Josse |
| 2022/0387184 A1 | 12/2022 | Josse et al. |
| 2022/0409397 A1 | 12/2022 | Hayes et al. |
| 2023/0015512 A1 | 1/2023 | Eisen et al. |
| 2023/0027836 A1 | 1/2023 | Predick et al. |
| 2023/0137358 A1 | 5/2023 | Hayes et al. |
| 2024/0382318 A1 * | 11/2024 | Dewey ................ A61F 2/4425 |

FOREIGN PATENT DOCUMENTS

| | | | |
|---|---|---|---|
| DE | 44 16 605 C1 | 6/1995 | |
| EP | 0 767 636 A1 | 4/1997 | |
| EP | 0 880 950 A1 | 12/1998 | |
| EP | 0 857 042 B1 | 11/2001 | |
| EP | 1 442 732 A1 | 8/2004 | |
| EP | 1 124 512 B1 | 9/2004 | |
| EP | 1 107 711 B1 | 10/2004 | |
| EP | 1 506 753 A1 | 2/2005 | |
| EP | 1 459 711 B1 | 7/2007 | |
| EP | 2954860 A2 | 12/2015 | |
| EP | 3031424 A1 | 6/2016 | |
| EP | 3 069 694 A1 | 9/2016 | |
| EP | 3213720 A1 | 9/2017 | |
| EP | 4000564 A1 * | 5/2022 | ............ A61F 2/447 |
| FR | 2781998 A1 | 2/2000 | |
| FR | 3082115 A1 | 12/2019 | |
| GB | 2 377 387 A | 1/2003 | |
| KR | 102117224 B1 | 6/2020 | |
| KR | 102192022 B1 | 12/2020 | |
| KR | 20210064236 A * | 6/2021 | ............ A61F 2/4611 |
| KR | 102850891 B1 * | 8/2025 | ............ A61F 2/4611 |
| WO | 92/14423 A1 | 9/1992 | |
| WO | 97/ 00054 A1 | 1/1997 | |
| WO | 99/ 26562 A1 | 6/1999 | |
| WO | 99/66867 A1 | 12/1999 | |
| WO | 00/12033 A1 | 3/2000 | |
| WO | 00/25706 A1 | 5/2000 | |
| WO | 00/ 49977 A1 | 8/2000 | |
| WO | 02/19952 A1 | 3/2002 | |
| WO | 03/105673 A2 | 12/2003 | |
| WO | 2006116850 A1 | 11/2006 | |
| WO | 2012139022 A2 | 10/2012 | |
| WO | 2014/133755 A1 | 9/2014 | |
| WO | 2015063721 A1 | 5/2015 | |
| WO | 2015198335 A1 | 12/2015 | |
| WO | 2016057940 A1 | 4/2016 | |
| WO | 2016/205607 A1 | 12/2016 | |
| WO | 2017/168208 A1 | 10/2017 | |
| WO | 2018049227 A1 | 3/2018 | |
| WO | 2021055323 A1 | 3/2021 | |
| WO | WO-2025179249 A1 * | 8/2025 | ............ A61F 2/4611 |

OTHER PUBLICATIONS

International Search Report, and Written Opinion in Application No. PCT/US2019/019067.

International Search Report, and Written Opinion in Application No. PCT/US2019/019060.

(56) References Cited

OTHER PUBLICATIONS

International Search Report, and Written Opinion in Application No. PCT/IB2020/000932.
International Search Report, and Written Opinion in Application No. PCT/IB2020/000942.
European Search Report in Application No. EP19756905 dated.
International Search Report and Written Opinion in Application No. PCT/US2022/016809 dated Jul. 27, 2022.
International Search Report and Written Opinion in Application No. PCT/US2022/027695 dated Jul. 27, 2022.
International Search Report and Written Opinion in Application No. PCT/US2022/027200 dated Aug. 19, 2022.
International Search Report and Written Opinion in Application No. PCT/US2022/030094 dated Sep. 16, 2022.
International Search Report and Written Opinion in Application No. PCT/US2022/016831 dated Sep. 29, 2022.
Chinese Office Action in Application No. 201980010758.4 dated Jun. 16, 2023.
Chinese Office Action in Application No. 201980010758.4 dated Sep. 16, 2023.
International Search Report and Written Opinion in Application No. PCT/IB2023/057720 dated Nov. 8, 2023.
International Search Report and Written Opinion in Application No. PCT/IB2023/058417 dated Dec. 7, 2023.
International Search Report and Written Opinion in Application No. PCT/IB2024/054985 dated Sep. 10, 2024.

* cited by examiner

100

100

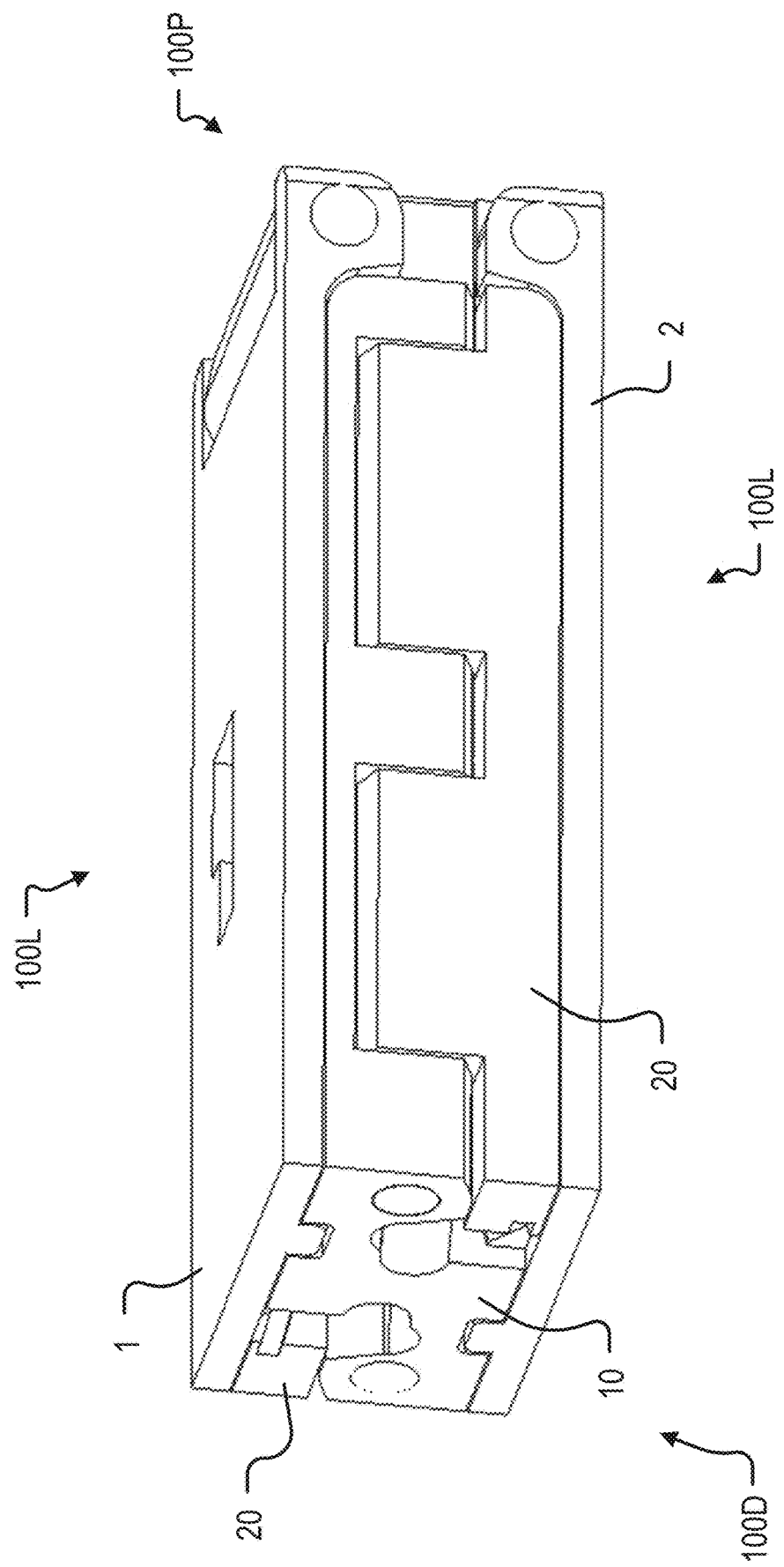

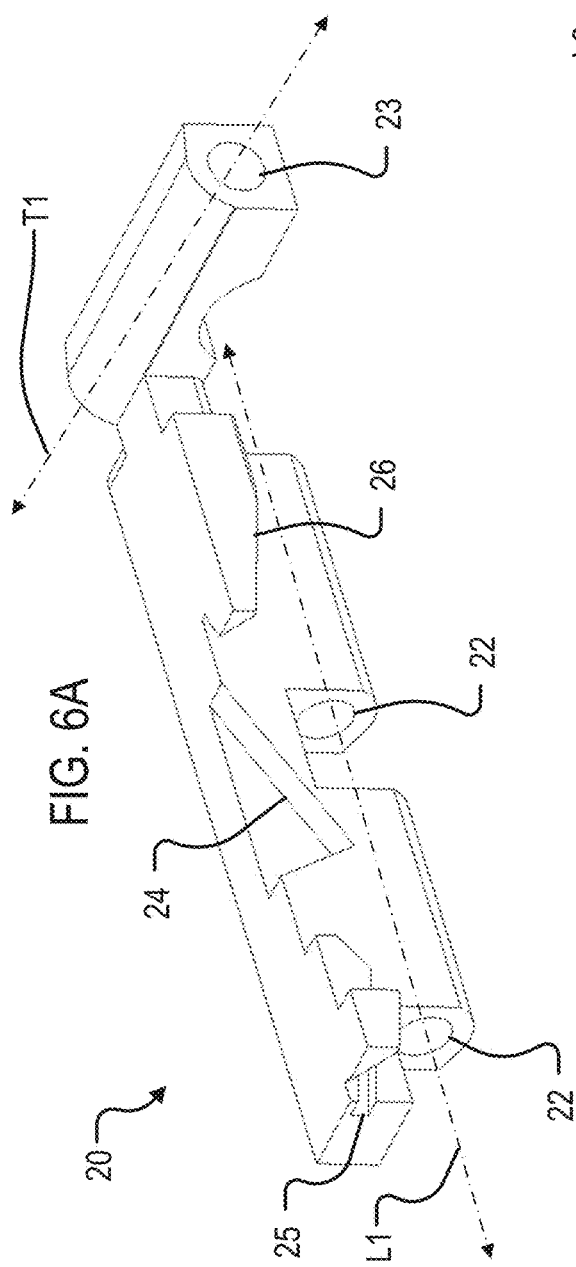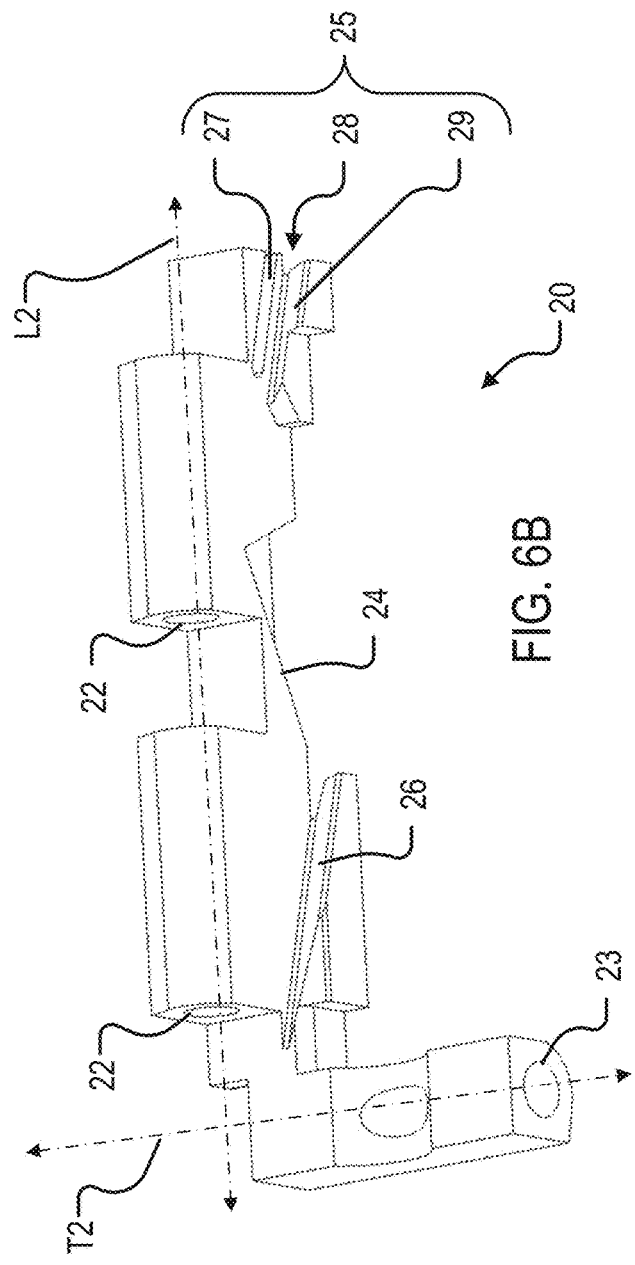

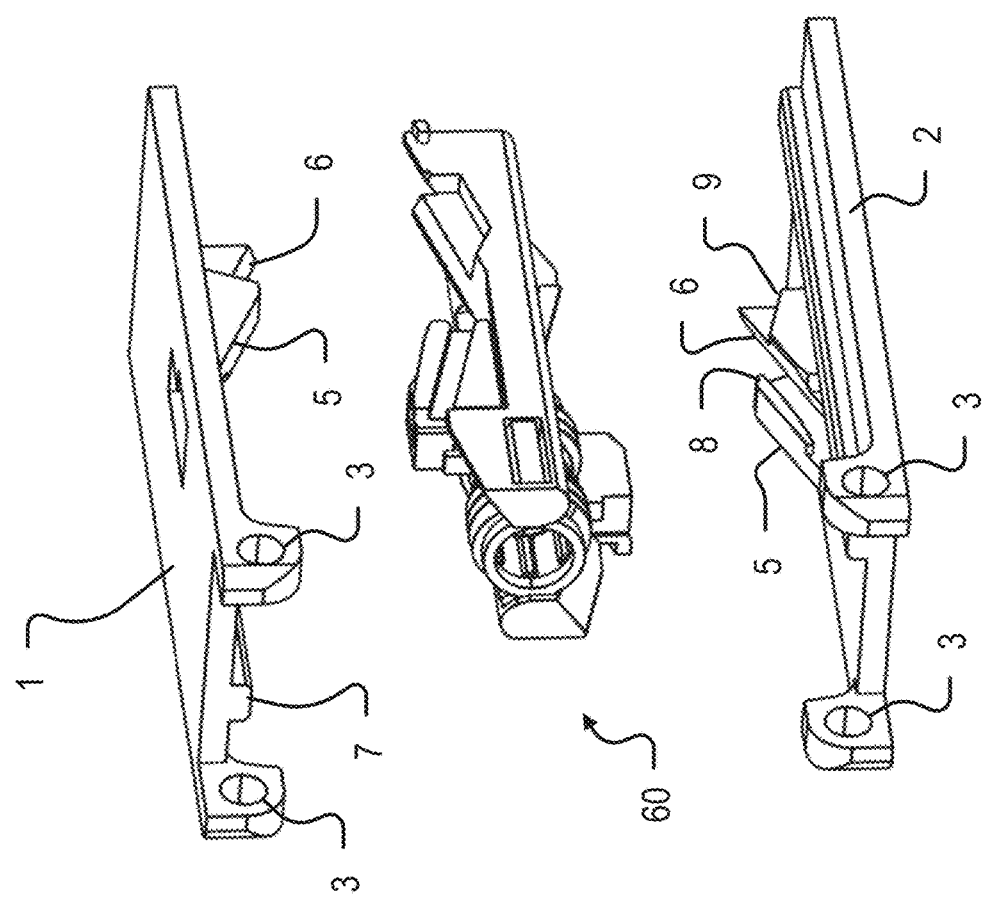
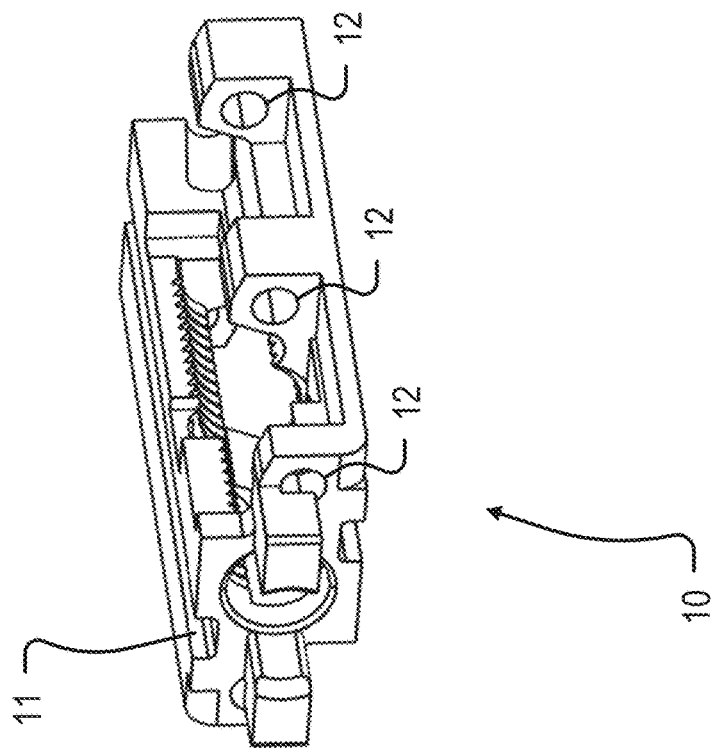
FIG. 9

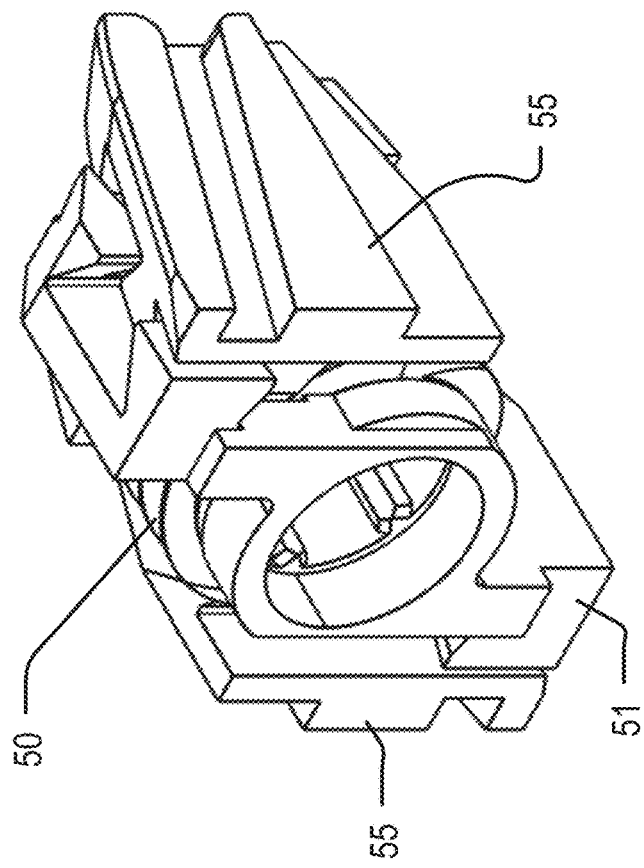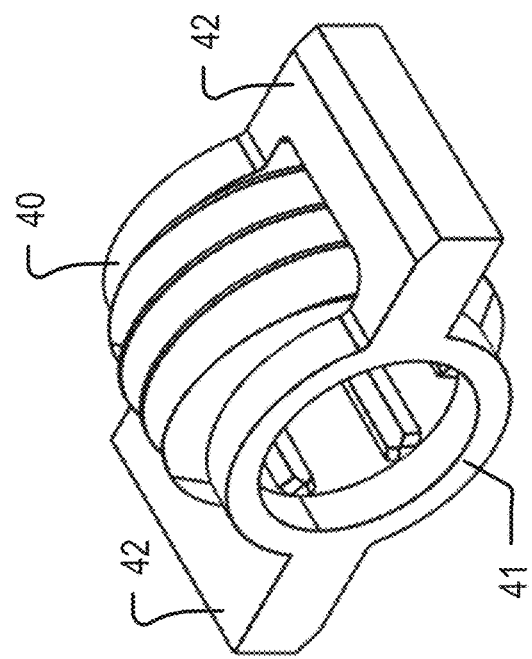
FIG. 13A

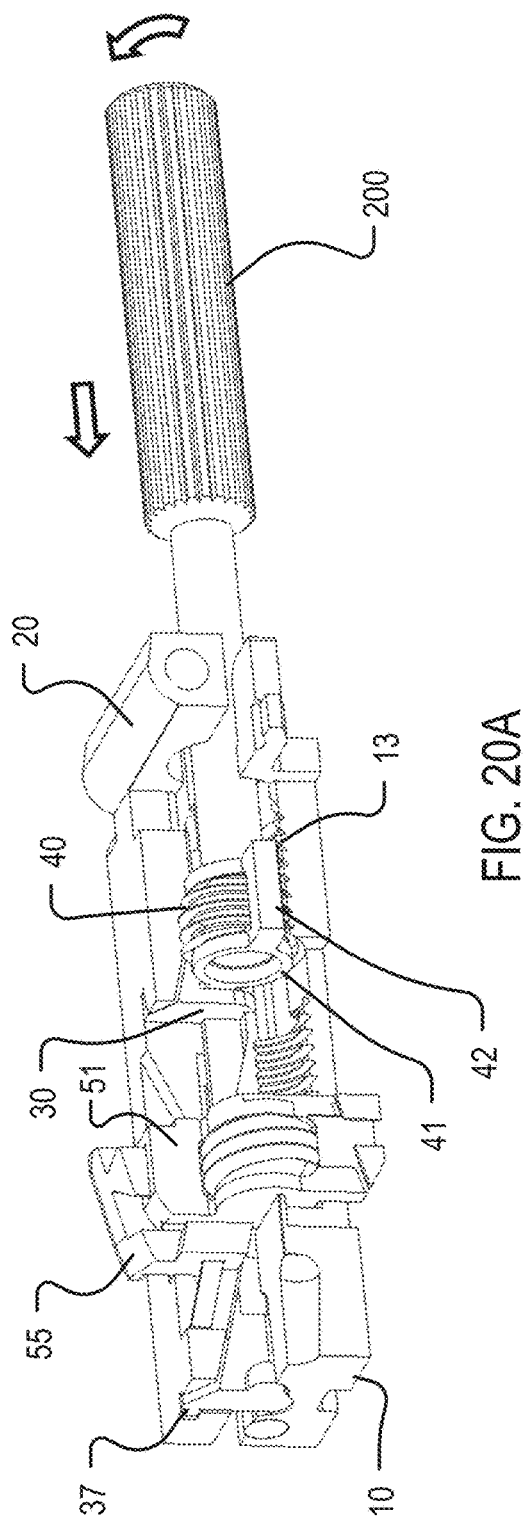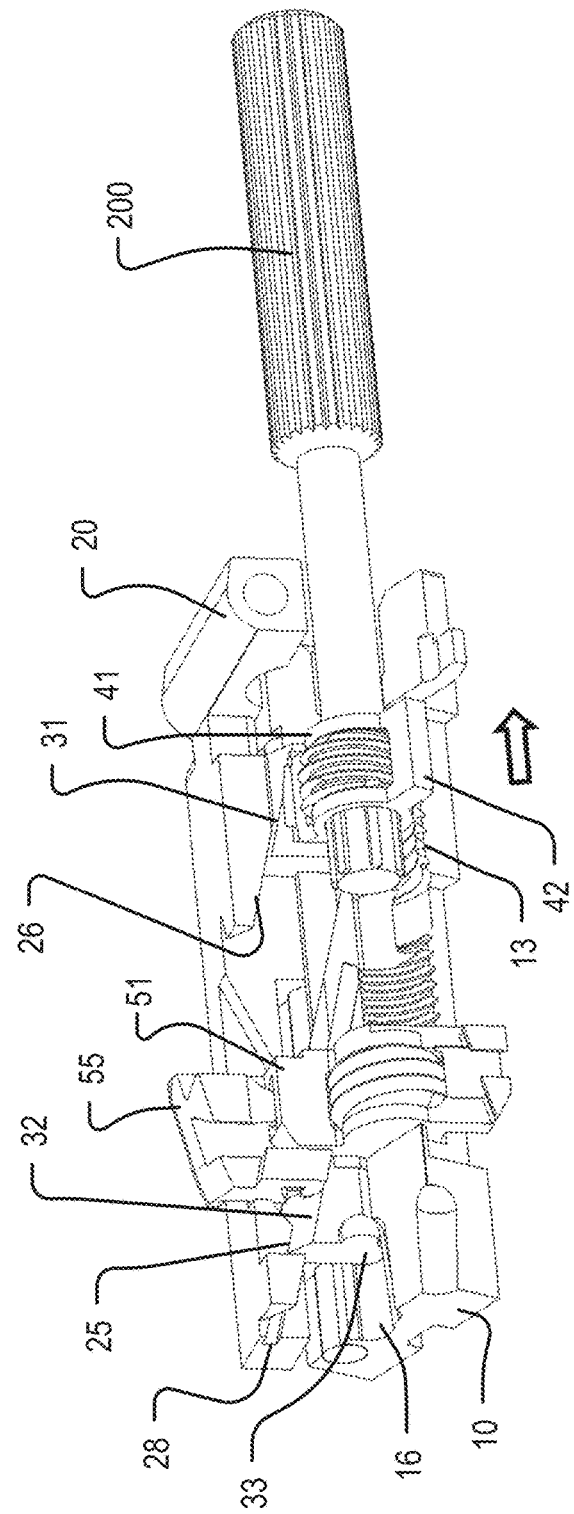
FIG. 20A
FIG. 20B

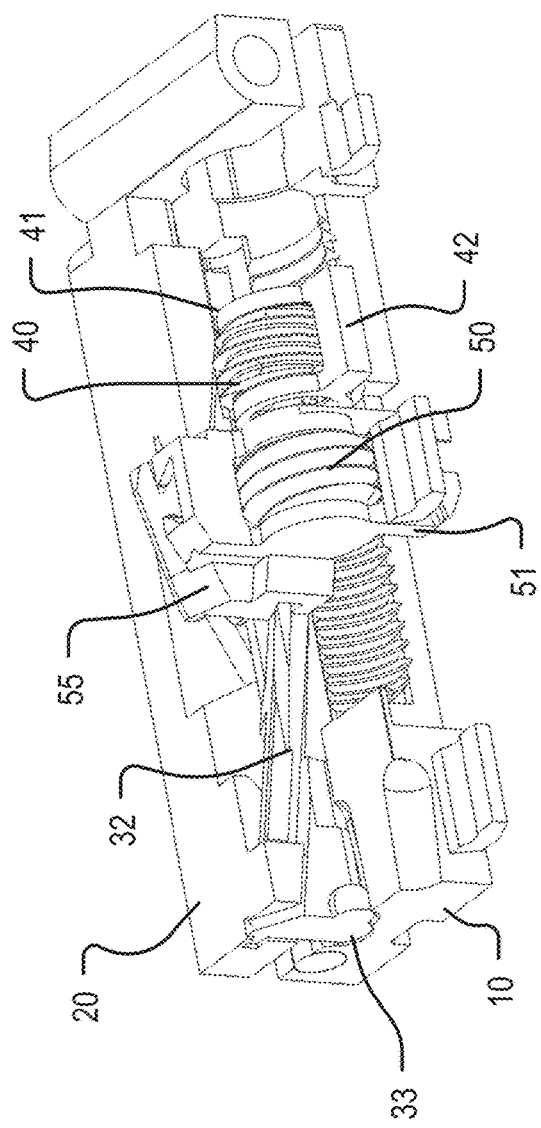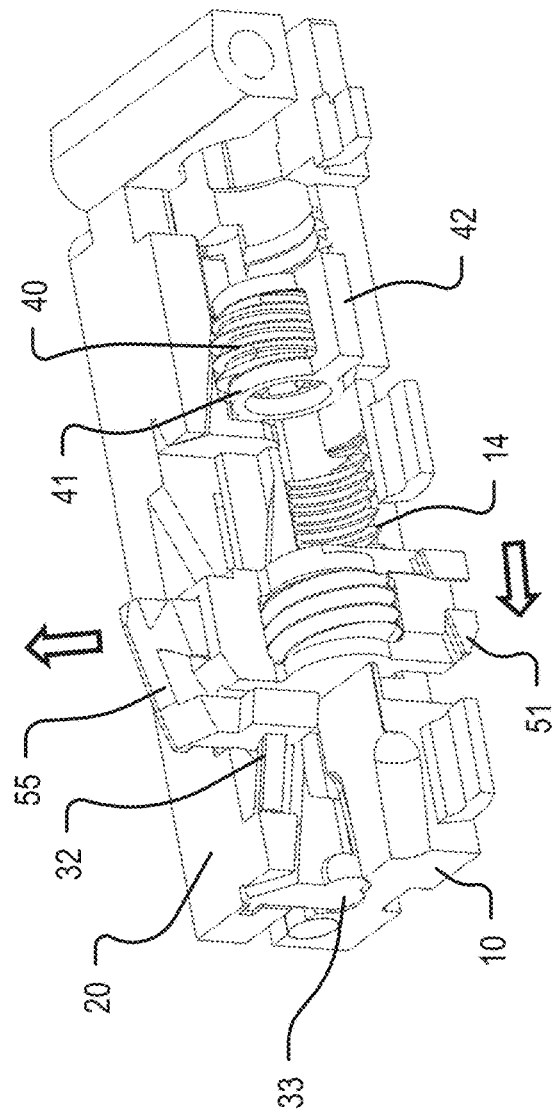
FIG. 28A
FIG. 28B

DISTRACTING AND ANGLING EXPANDABLE INTERBODY DEVICE

CROSS-REFERENCE TO RELATED APPLICATIONS

This application claims the benefit of and priority to U.S. Provisional Patent Application No. 63/502,471 filed May 16, 2023. This application also incorporates by reference: U.S. Pat. No. 11,096,796, titled Interbody spinal implant having a roughened surface topography on one or more internal surfaces, and filed on Mar. 4, 2013; and U.S. Pat. No. 10,821,000, titled Titanium implant surfaces free from alpha case and with enhanced osteoinduction, and filed Jun. 29, 2017. The entire disclosure of each of the above documents is incorporated herein by reference in its entirety.

FIELD

The present disclosure generally relates to medical devices for the treatment of musculoskeletal disorders, and more particularly to an expandable spinal implant expandable and/or pivotable along multiple different axes, systems for implanting and manipulating the expandable spinal implant, and a method for treating a human spine.

BACKGROUND

Spinal disorders such as degenerative disc disease, disc herniation, osteoporosis, spondylolisthesis, stenosis, scoliosis and other curvature abnormalities, kyphosis, tumor, and fracture may result from factors including trauma, disease and degenerative conditions caused by injury and aging. Spinal disorders typically result in symptoms including pain, nerve damage, and partial or complete loss of mobility.

Non-surgical treatments, such as medication, rehabilitation and exercise can be effective, however, they may fail to relieve the symptoms associated with these disorders. Surgical treatment of these spinal disorders includes fusion, fixation, correction, discectomy, laminectomy and implantable prosthetics. As part of these surgical treatments, spinal constructs, such as, for example, bone fasteners, spinal rods and interbody devices can be used to provide stability to a treated region. For example, during surgical treatment, interbody devices may be introduced to a space between adjacent vertebral bodies (the interbody space) to properly space the vertebral bodies and provide a receptacle for bone growth promoting materials, e.g., grafting.

More recently, interbody devices have been introduced that provide additional capability beyond static spacing of the vertebral bodies. For example, some devices have expansion capability such that the implant may be introduced to the interbody space in a collapsed state and then expanded to produce additional spacing and, in some cases, introduce or restore curvature to the spine by expanding selectively. However, many existing expandable interbody designs have limited ranges of expansion, limited types of expansion, and limited ranges of inclination.

The present disclosure seeks to address these and other shortcomings in the existing relevant arts.

SUMMARY

The techniques of this disclosure generally relate to [brief summary of highlights or advantages without tying advantages to a particular example or embodiment].

In one aspect, the present disclosure provides [recitation of claims using ordinary syntax].

In another aspect, the disclosure provides [recitation of additional claimed embodiments as needed]

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 2 is a side perspective view of the implant in a collapsed configuration.

FIGS. 6A-6B are perspective views of an arm component of the implant.

FIG. 9 is an exploded parts view of the implant.

FIG. 13A is a partial parts exploded view of a first screw component and second screw component.

FIG. 20A is a partial parts section view of the implant and a driver for distracting the implant.

FIG. 20B is a partial parts section view of the implant of FIG. 20A after the driver has distracted the implant.

FIG. 28A is a partial parts section view of the implant in the collapsed position of FIG. 27A.

FIG. 28B is a partial parts section view of the implant in the lordosed position of FIG. 27B.

DETAILED DESCRIPTION

Figure 1A:
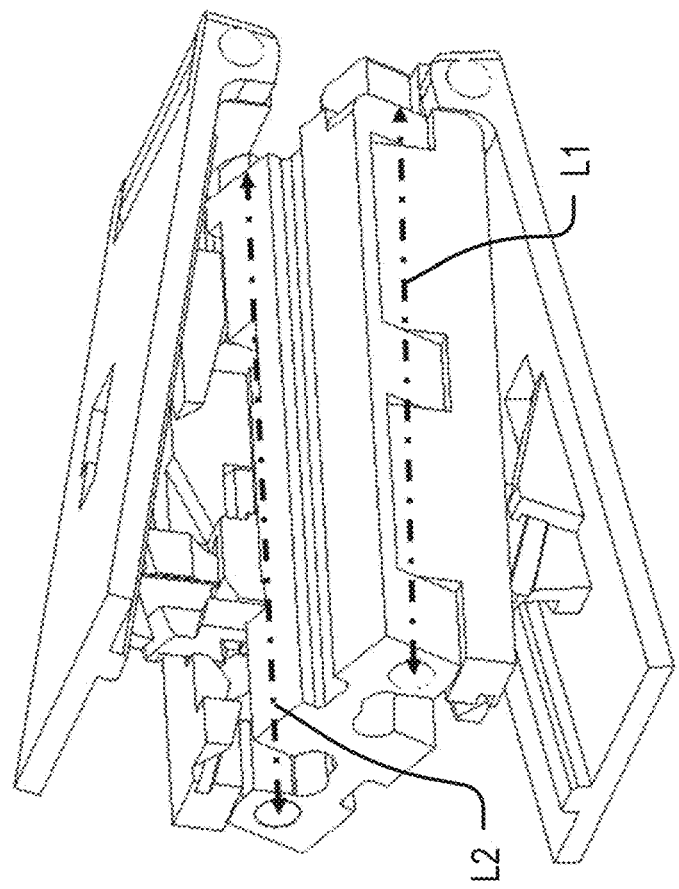
FIGS. 1A-1B are perspective views of various pivoting axes of an implant in an expanded and lordosed configuration.

Embodiments of the present disclosure relate generally, for example, to spinal stabilization systems, and more particularly, to surgical instruments for use with spinal stabilization systems. Embodiments of the devices and methods are described below with reference to the Figures.

The following discussion omits or only briefly describes certain components, features and functionality related to medical implants, installation tools, and associated surgical techniques, which are apparent to those of ordinary skill in the art. It is noted that various embodiments are described in detail with reference to the drawings, in which like reference numerals represent like parts and assemblies throughout the several views, where possible. Reference to various embodiments does not limit the scope of the claims appended hereto because the embodiments are examples of the inventive concepts described herein. Additionally, any example(s) set forth in this specification are intended to be non-limiting and set forth some of the many possible embodiments applicable to the appended claims. Further, particular features described herein can be used in combination with other described features in each of the various possible combinations and permutations unless the context or other statements clearly indicate otherwise.

Terms such as "same," "equal," "planar," "coplanar," "parallel," "perpendicular," etc. as used herein are intended to encompass a meaning of exactly the same while also including variations that may occur, for example, due to manufacturing processes. The term "substantially" may be used herein to emphasize this meaning, particularly when the described embodiment has the same or nearly the same functionality or characteristic, unless the context or other statements clearly indicate otherwise.

Various embodiments and components may be coated with a ceramic, titanium, and/or other biocompatible material to provide surface texturing at (a) the macro scale, (b) the micro scale, and/or (c) the nano scale, for example. Similarly, components may undergo a subtractive manufacturing process providing for surface texturing configured to facilitate osseointegration and cellular attachment and osteoblast maturation. Example surface texturing of additive and subtractive manufacturing processes may comprise (a) macro-scale structural features having a maximum peak-to-valley height of about 40 microns to about 500 microns, (b) micro-scale structural features having a maximum peak-to-valley height of about 2 microns to about 40 microns, and/or (c) nano-scale structural features having a maximum peak-to-valley height of about 0.05 microns to about 5 microns. In various embodiments, the three types of structural features may be overlapping with one another, for example. Additionally, such surface texturing may be applied to any surface, e.g., both external exposed facing surfaces of components and internal non exposed surfaces of components. Further discussion regarding relevant surface texturing and coatings is described in, for example, U.S. Pat. No. 11,096,796, titled Interbody spinal implant having a roughened surface topography on one or more internal surfaces, and filed on Mar. 4, 2013—the entire disclosure of which is incorporated herein by reference in its entirety. Accordingly, it shall be understood that any of the described coating and texturing processes of U.S. Pat. No. 11,096,796, may be applied to any component of the various embodiments disclosed herein, e.g., the exposed surfaces and internal surfaces of endplates. Another example technique for manufacturing an orthopedic implant having surfaces with osteoinducting roughness features including micro-scale structures and nano-scale structures is disclosed in U.S. Pat. No. 10,821,000, the entire contents of which are incorporated herein by reference. Additionally, an example of a commercially available product may be the Adaptix™ Interbody System sold by Medtronic Spine and comprising a titanium cage made with Titan nanoLOCK™.

Various embodiments and components of this disclosure may be fabricated from biologically acceptable materials suitable for medical applications, including metals, synthetic polymers, ceramics and bone material and/or their composites. For example, the components, individually or collectively, can be fabricated from materials such as stainless steel alloys, commercially pure titanium, titanium alloys, Grade 5 titanium, super-elastic titanium alloys, cobalt-chrome alloys, superelastic metallic alloys (e.g., Nitinol, super elasto-plastic metals, such as GUM METAL®), ceramics and composites thereof such as calcium phosphate (e.g., SKELITE™), thermoplastics such as polyaryletherketone (PAEK) including polyetheretherketone (PEEK), polyetherketoneketone (PEKK) and polyetherketone (PEK), carbon-PEEK composites, PEEK-BaSO4 polymeric rubbers, polyethylene terephthalate (PET), fabric, silicone, polyurethane, silicone-polyurethane copolymers, polymeric rubbers, polyolefin rubbers, hydrogels, semi-rigid and rigid materials, elastomers, rubbers, thermoplastic elastomers, thermoset elastomers, elastomeric composites, rigid polymers including polyphenylene, polyamide, polyimide, polyetherimide, polyethylene, epoxy, bone material including autograft, allograft, xenograft or transgenic cortical and/or corticocancellous bone, and tissue growth or differentiation factors, partially resorbable materials, such as, for example, composites of metals and calcium-based ceramics, composites of PEEK and calcium based ceramics, composites of PEEK with resorbable polymers, totally resorbable materials, such as, for example, calcium based ceramics such as calcium phosphate, tri-calcium phosphate (TCP), hydroxyapatite (HA)-TCP, calcium sulfate, or other resorbable polymers such as polyaetide, polyglycolide, polytyrosine carbonate, polycaroplaetohe, polylactic acid or polylactide and their combinations.

Figure 1B:
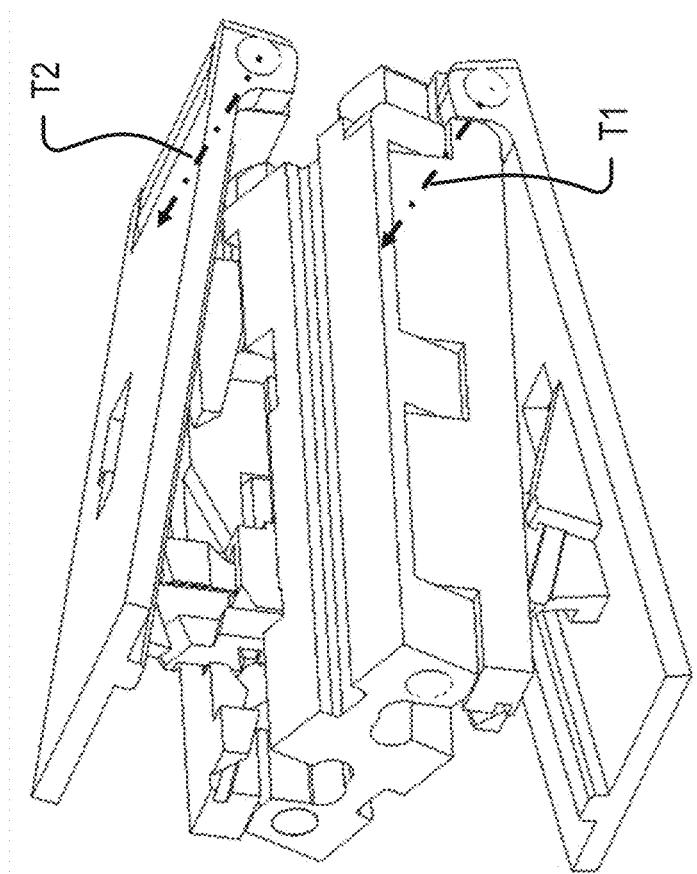

Referring generally to FIGS. 1A-30B an expandable spinal implant 100 and a driver 200 for actuating the implant 100 are shown. Implant 100 may be expanded into a distracted configuration by pivoting about a longitudinal pivoting axis and implant 100 may also be lordosed by pivoting about a transverse pivoting axis. In the example embodiment shown in FIGS. 1A-1B, implant 100 may be distracted by pivoting various internal components about a first longitudinal pivoting axis L1 and a second longitudinal pivoting axis L2 as will be explained in further detail below. Similarly, implant 100 may be lordosed by pivoting various internal components about a first transverse pivoting axis T1 and a second transverse pivoting axis T2 as will be explained in further detail below. In various embodiments, the transverse pivoting axes T1, T2 may be oriented at about 90 degrees (i.e., perpendicularly) with respect to the longitudinal pivoting axes L1, L2. Other relative orientations are contemplated, e.g., +/-about 15 degrees (i.e., about 75 degrees to about 105 degrees).

FIG. 2 is a side perspective view of implant 100 in a collapsed configuration. Implant 100 may extend in a lengthwise direction from a proximal end 100P to a distal end 100D. In various embodiments, the lengthwise direction may be parallel with an extension direction of the longitudinal pivoting axes L1 and L2 (at least in the collapsed configuration). Implant 100 may extend in a widthwise direction from a first lateral end 100L to a second lateral end 100L opposite the first lateral end 100L. The widthwise direction may be parallel with an extension direction of the transverse pivoting axes T1 and T2 (at least in the collapsed configuration). A vertical height, or thickness of implant 100, may refer to a distance between an outside surface of the superior endplate 1 to a corresponding outside surface of the inferior endplate 2. As used herein, a "distracted configuration" shall have a meaning consistent with the relevant art field and shall refer to a configuration in which a distance between the superior endplate 1 and the inferior endplate 2 is greater than the same corresponding distance in the collapsed configuration (unless the context clearly indicates otherwise). Similarly, as used herein, an "angled configuration" or "lordosed configuration" shall have a meaning consistent with the relevant art field and shall refer to a configuration in which, from a side perspective view, an interior angle measured between an outside surface of the superior endplate 1 and an outside surface the inferior endplate 2 is greater than the same corresponding interior angle in the collapsed configuration (unless the context clearly indicates otherwise).

As illustrated, implant 100 may include a superior endplate 1 and an inferior endplate 2 that are each pivotally coupled to frame 10 about a respective longitudinal pivoting axis L1, L2. In turn, a first arm 20 and a second arm 20 may each be pivotally coupled to the frame 10 about respective longitudinal pivoting axis L1, L2. Additionally, a first arm 20 may be pivotally coupled to the inferior endplate 2 about transverse pivoting axis T1 and the second arm 20 may be pivotally coupled to the superior endplate 1 about transverse pivoting axis T2 (see FIGS. 1A-1B). Longitudinal pivoting axes L1, L2 may be relied upon for distracting implant 100 and the transverse pivoting axes T1, T2 may be relied upon for angulating the implant 100.

Figure 3:
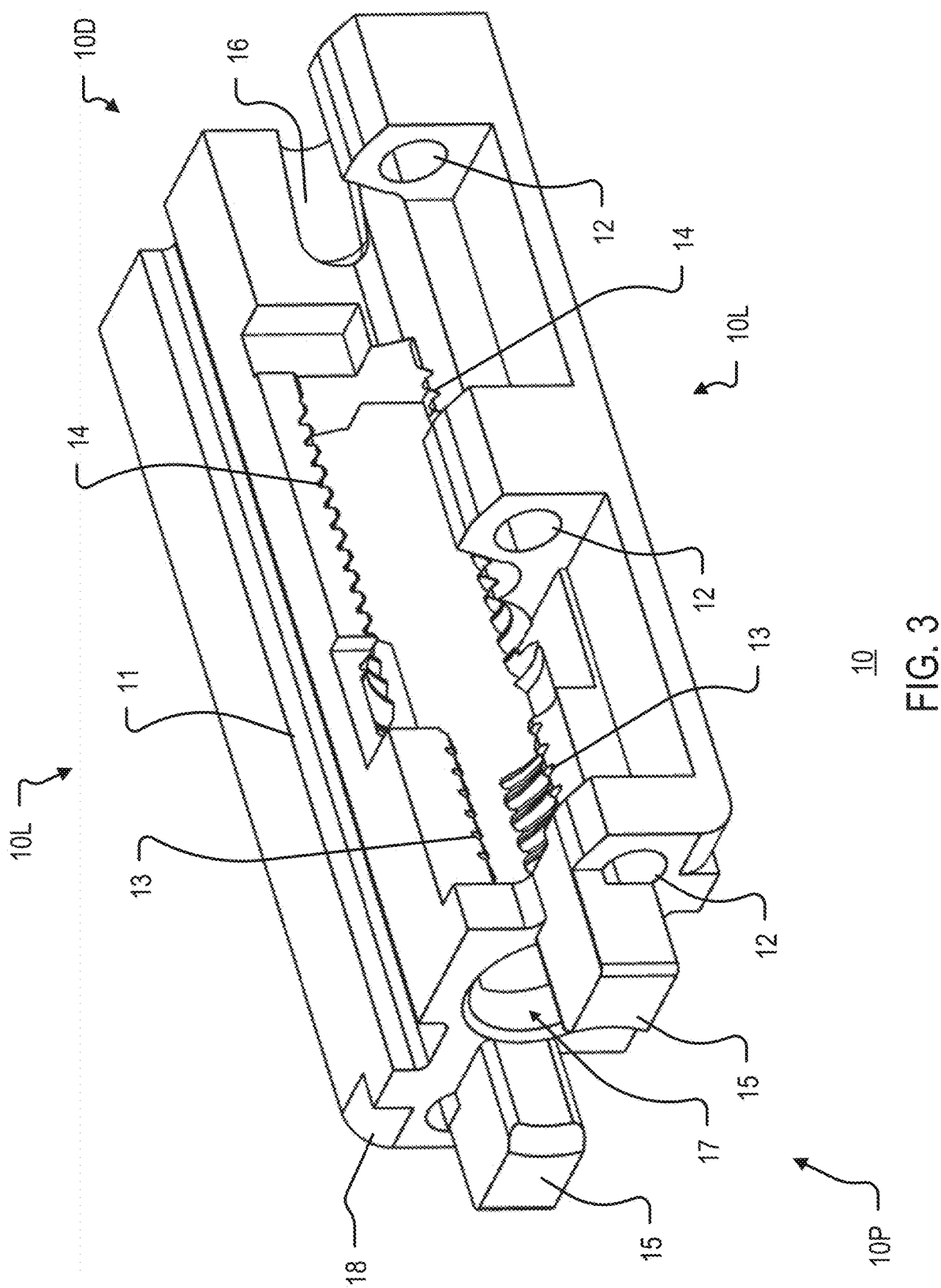
FIG. 3 is a first perspective view of a frame component of the implant.
Figure 4:
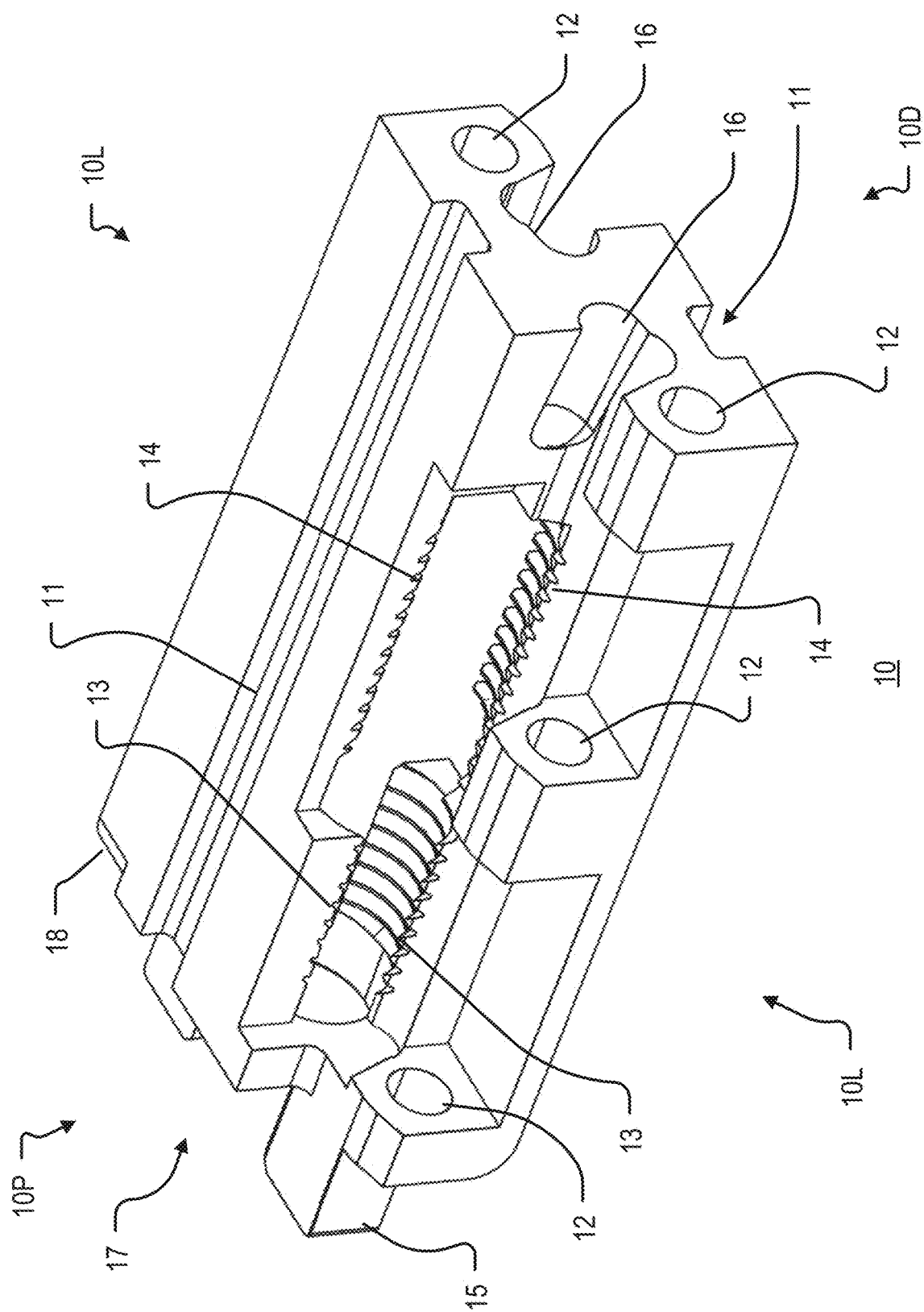
FIG. 4 is a second perspective view of a frame component of the implant.
Figure 5:
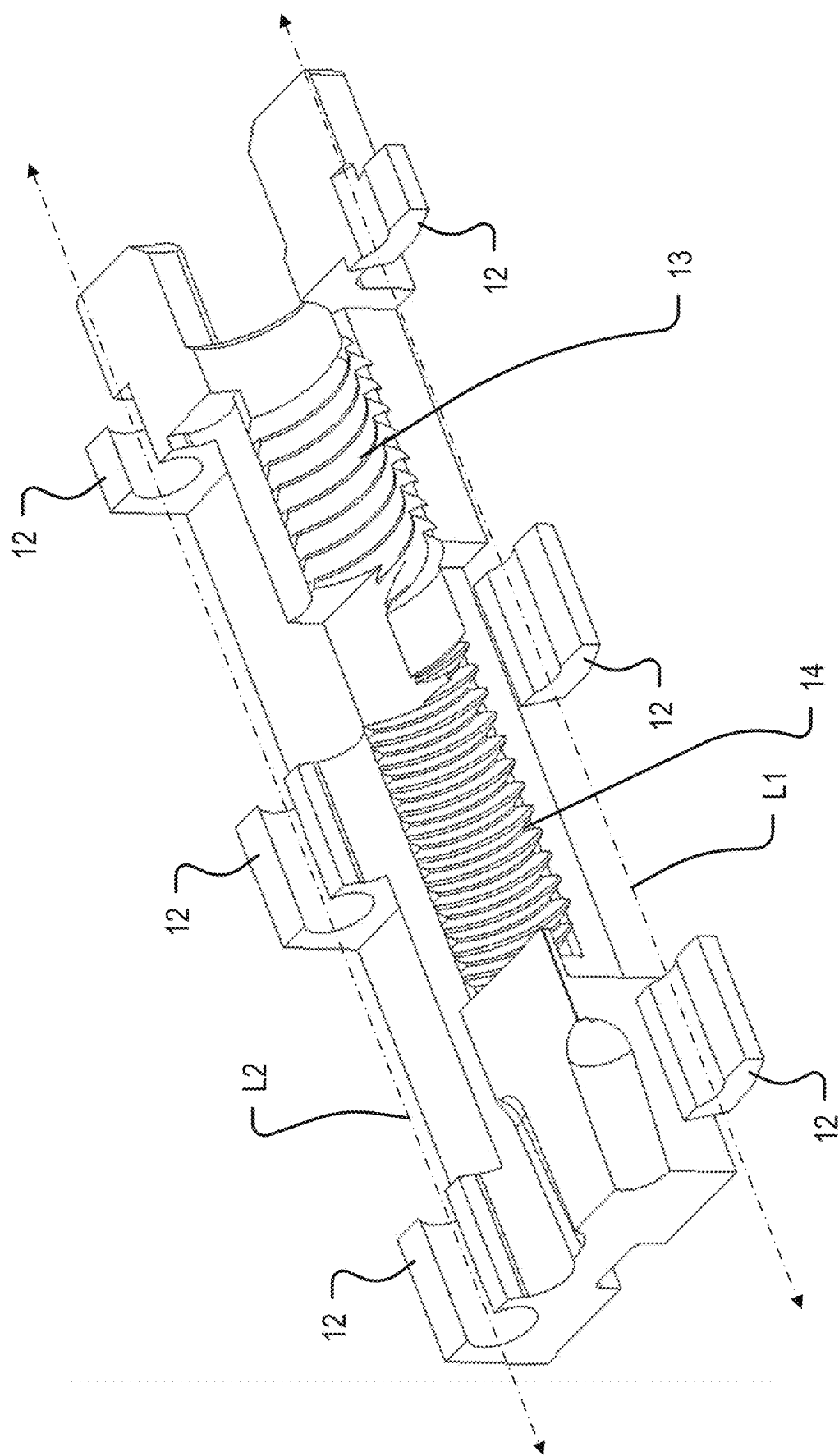
FIG. 5 is a section view of the frame component of FIGS. 3-4.

Referring generally to FIGS. 3-5 various views of a frame 10 of an implant 100 are illustrated. FIGS. 3-4 are alternate perspective views of the frame and FIG. 5 is a section view of the frame 10. In various embodiments, frame 10 may be a central support structure which supports or carries various components and allows components to be pivotally coupled thereto. Frame 10 may include a first plurality of frame barrels 12 adjacent a first lateral edge for supporting a first pin 70 (see FIG. 15) extending therethrough to allow pivoting in a functional way similar to a hinge along longitudinal pivoting axis L1. Likewise, frame 10 may include a second plurality of frame barrels 12 adjacent a second lateral edge for supporting a second pin 71 (see FIG. 15) extending therethrough to allow pivoting in a functional way similar to a hinge along longitudinal pivoting axis L2. Frame 10 may include a chamfered edge 18 that functions as a pivoting fulcrum against a corresponding chamfered pocket 4 of the superior and inferior endplates 1, 2 (see FIGS. 7-8). In various embodiments, edge 18 and chamfered pocket 4 do not necessarily touch one another (although they may).

Frame 10 may include a superior channel 11 extending lengthwise down the top surface of frame 10 and an inferior channel 11 extending lengthwise down the bottom surface of frame 10. A corresponding rail 7 of the superior endplate 1 and a corresponding rail of the inferior endplate 2 may be disposable within the corresponding channel 11 (see FIG. 7). Rail 7 may be useful for increasing the structural rigidity of a corresponding endplate 1, 2. Frame 10 may include a first threaded track 13 and a second threaded track 14 that are configured to rotatably support a first set screw 40 and a second set screw 50 (see FIG. 14). In various embodiments, each of the tracks 13, 14 may be coaxially aligned and centered with respect to the lateral side edges 10L of frame 10 and/or the outside surfaces of the superior endplate 1 and inferior endplate 2. Access aperture 17 may be a circular aperture in a proximal side 10P of frame 10 allowing a surgical tool to extend therethrough and rotate either one or both of the first set screw 40 and second set screw 50. Frame 10 may optionally include any type of gripping protrusion 15 on a proximal end 100P thereof for gripping and holding implant 100 during insertion of the implant 100 into a disc space. Frame 10 may also include a superior rotation channel 16 and an inferior rotation channel 16 disposed adjacent a distal side 10D of the frame. Each rotation channel 16 may rotatably support a corresponding ball 33 (or circular outdent) of a corresponding distraction wedge 30 (see FIG. 13) and a bottom cylindrical surface of distraction wedge 30. Generally, geometrical features of the superior side of frame 10 are oriented in a mirror image as to the geometrical features of the inferior side of frame 10. Accordingly, features shown with respect to the superior side of frame 10 shall be understood to be similar, but oppositely oriented with respect to a central axis extending through access aperture, to those of the inferior side of frame 10. This "mirror image" configuration facilitates the distraction and lordosing of implant 100 and is represented in many components of this disclosure.

FIG. 5 is a section view lengthwise through frame 10. In the example illustration, it is shown that three barrels on a first side of frame 10 are configured to rotatably support a first pin (not illustrated) extending therethrough along longitudinal pivoting axis L1 and three barrels on a second side of frame 10 are configured to rotatably support a second pin (not illustrated) extending therethrough along longitudinal pivoting axis L2. Additionally, it is shown how first threaded track 13 and second threaded track 14 are centered with respect to one another.

FIGS. 6A-6B are perspective views of an arm 20 of implant 100. Implant 100 may include first and second arms 20. In various embodiments, each arm 20 may extend in a longitudinal direction from a proximal end 20P to a distal end 20D. Additionally, each arm 20 may include an inside side surface 20B that faces inward towards a center of implant 100 and an outside side surface 20A that faces away from a center of implant 100. A first arm 20 may be pivotally coupled to frame 10 on one side thereof and a second arm 20 may be pivotally coupled to frame 10 on an opposite side thereof. For example, first arm 20 may include first and second barrels 22 that are configured to rotatably support a pin 70 (see FIG. 15) extending therethrough along longitudinal pivoting axis L1. Likewise, second arm 20 may include first and second barrels 22 that are configured to rotatably support a pin 70 (see FIG. 15) extending therethrough along longitudinal pivoting axis L2. In this way, the barrels 22 of first arm 20 may be aligned with the frame barrels 12 of frame 10 such that pin 70 extends through barrels 22 and frame barrels 12 thereby defining longitudinal pivoting axis L1 and allowing the first arm 20 to pivot relative to the frame 10. Similarly, the barrels 22 of second arm 20 may be aligned with the frame barrels 12 of frame 10 such that pin 70 extends through barrels 22 and frame barrels 12 thereby defining longitudinal pivoting axis L2 and allowing the second arm 20 to pivot relative to the frame 10. In various embodiments, one arm 20 may pivot in a direction that urges superior endplate 1 away from frame while the other arm 20 may pivot in an opposite direction that urges inferior endplate 2 away from frame 10. Each arm may also include a barrel 23 that comprises an aperture extending therethrough in a direction transverse to the apertures of barrels 22. The barrel 23 of first arm 20 may pivotally support a pin 71 (see FIG. 15) extending therethrough along the transverse pivoting axis T2 that also extends into and/or rotatably couples with a corresponding endplate barrel 3 of the superior endplate 1 (see FIG. 15). Likewise, the barrel 23 of second arm 20 may pivotally support a pin (not illustrated) extending therethrough along the transverse pivoting axis T1 that also extends into and/or rotatably couples with a corresponding endplate barrel 3 of the superior endplate 1 (see FIG. 15).

Figure 15:
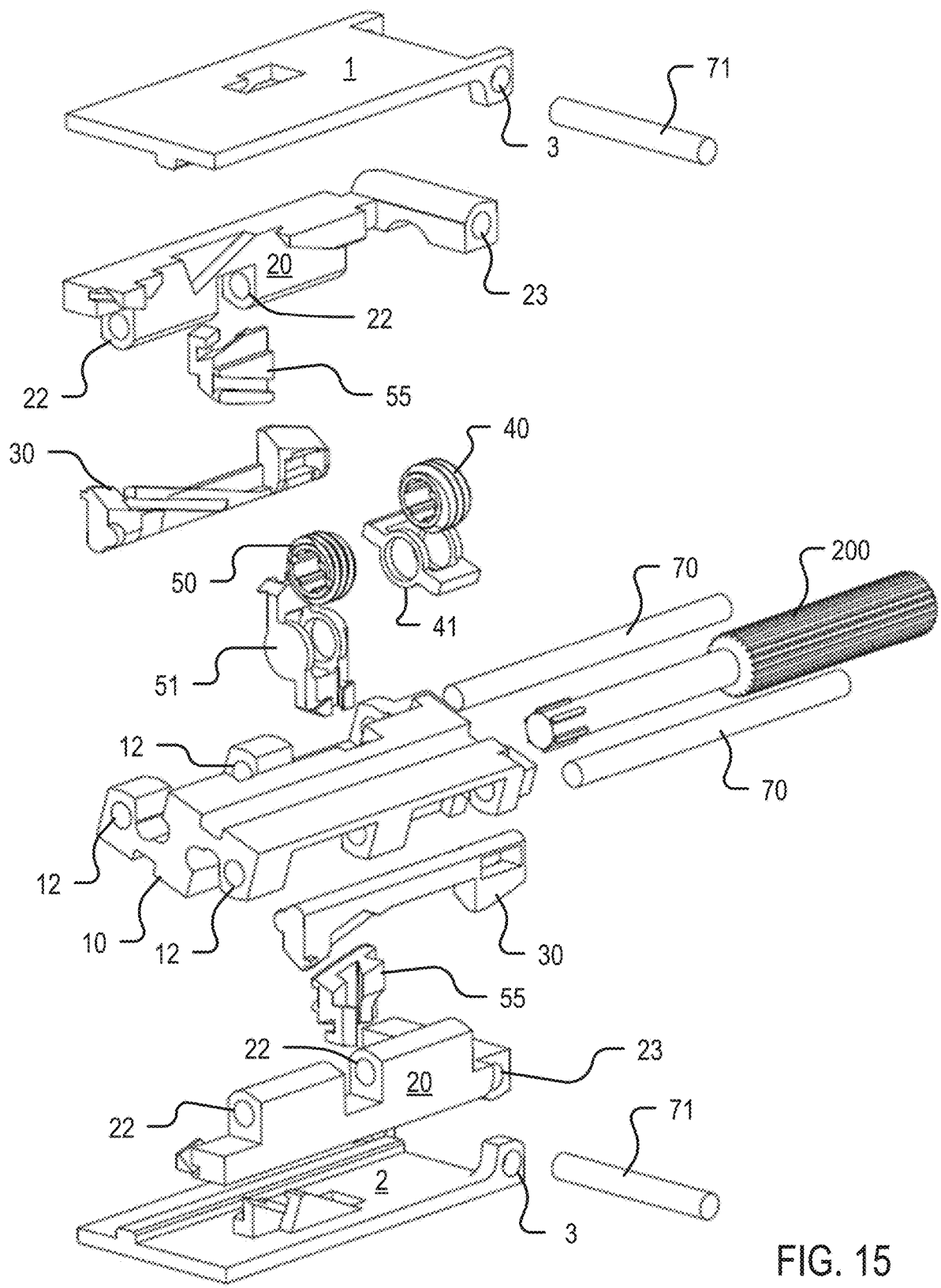
FIG. 15 is a comprehensive exploded parts view of the implant.

Each arm 20 may include various pockets, inclined surfaces, ramps, protrusions, indents, and channel like features that allow it to interact with a corresponding arm 20, distraction wedge 30, and angulation wedge 55 (see FIG. 15). For example, the inside side surface 20B of each arm 20 may include a plurality of ramps 26, 24, 25. As used herein, the term ramp shall have a broad meaning describing any surface that is inclined with respect to an adjacent surface and with which another component, e.g., a wedge or rail, may slide over and/or be in sliding contact with. In some cases, a ramp may also have additional geometrical features such as coordinating protrusions, bosses, and/or indentations that may be useful for slidably mating with other components. In this way, a "ramp" may also have channel like attributes and shall not be limited solely to an inclined surface. For example, inside ramps 24 and 26 may take the form of an inclined surface without any coordinating protrusions, indentations, etc. while second ramp 25 may include a sliding surface 29 and a coordinating rail 27 that form a channel 28 therebetween (see lower right hand corner of FIG. 6B). Accordingly, it shall be understood that a "ramp" may comprise any combination of inclined surfaces, rails, and/or channels unless the context clearly indicates otherwise.

Figure 7:
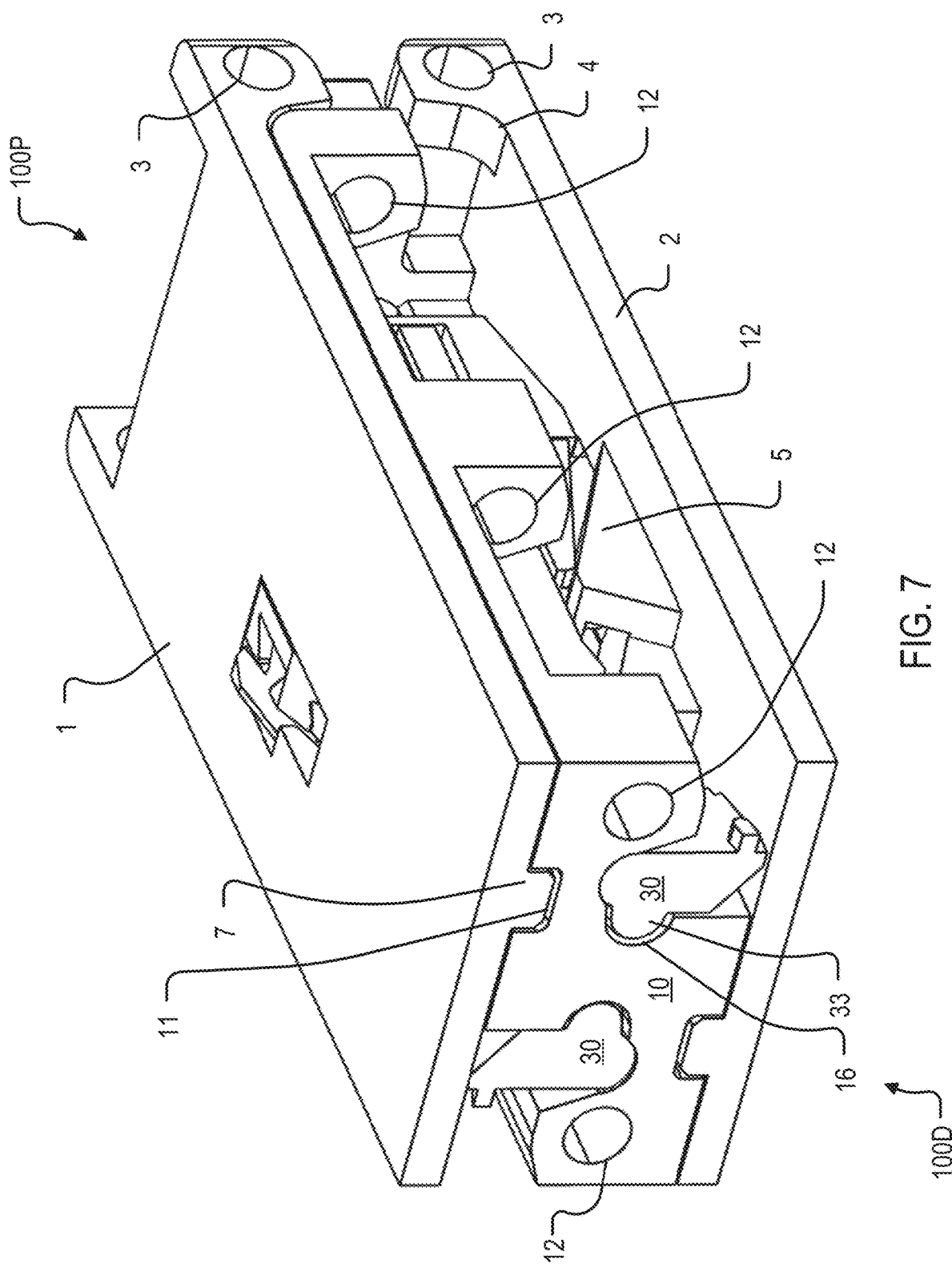
FIG. 7 is a first partial parts perspective view of the implant with the arm component of FIGS. 6A-6B removed for ease of understanding.
Figure 8:
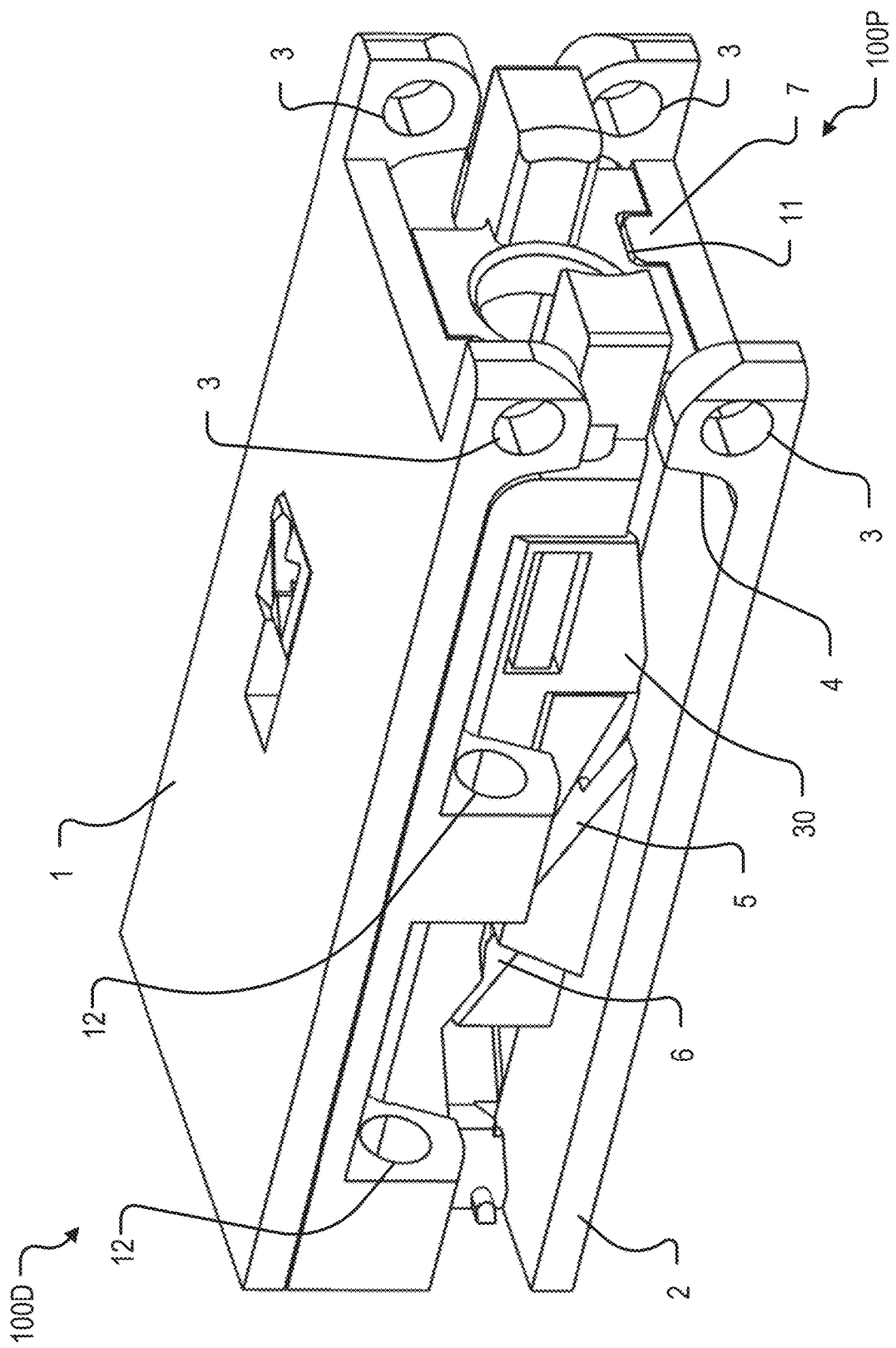
FIG. 8 is a first partial parts perspective view of the implant with the arm component of FIGS. 6A-6B removed for ease of understanding.

FIG. 7 is a partial parts distal perspective view of implant 100 with the arm component 20 removed and FIG. 8 is a partial parts proximal perspective view of implant 100 with the arm component 20 removed for ease of understanding. In FIG. 7, it is shown how the distraction wedges 30 are in contact with the frame 10. For example, the balls 33 of each respective arm are disposed within the corresponding channel 16. FIG. 8 illustrates the orientation of distraction wedge 30 from the proximal end 100P. Additionally, FIGS. 7 and 8 illustrate the ramps 5, 6 along the inside surface of the superior endplate 1 and inferior endplate 2.

Referring generally to FIGS. 9-15, various exploded parts and partial parts views of implant 100 are illustrated. In each of these views the arms 20 are removed for ease of understanding. In FIG. 9, the superior endplate 1 and inferior endplate 2 are separated away from the frame 10 to expose a moving mechanism 60. Moving mechanism 60 may comprise various distraction wedges 30 and angulation wedges 55 which are each selectively operable by rotating one or both of the first set screw 40 and second set screw 50 as will be explained in more detail below.

Figure 10:
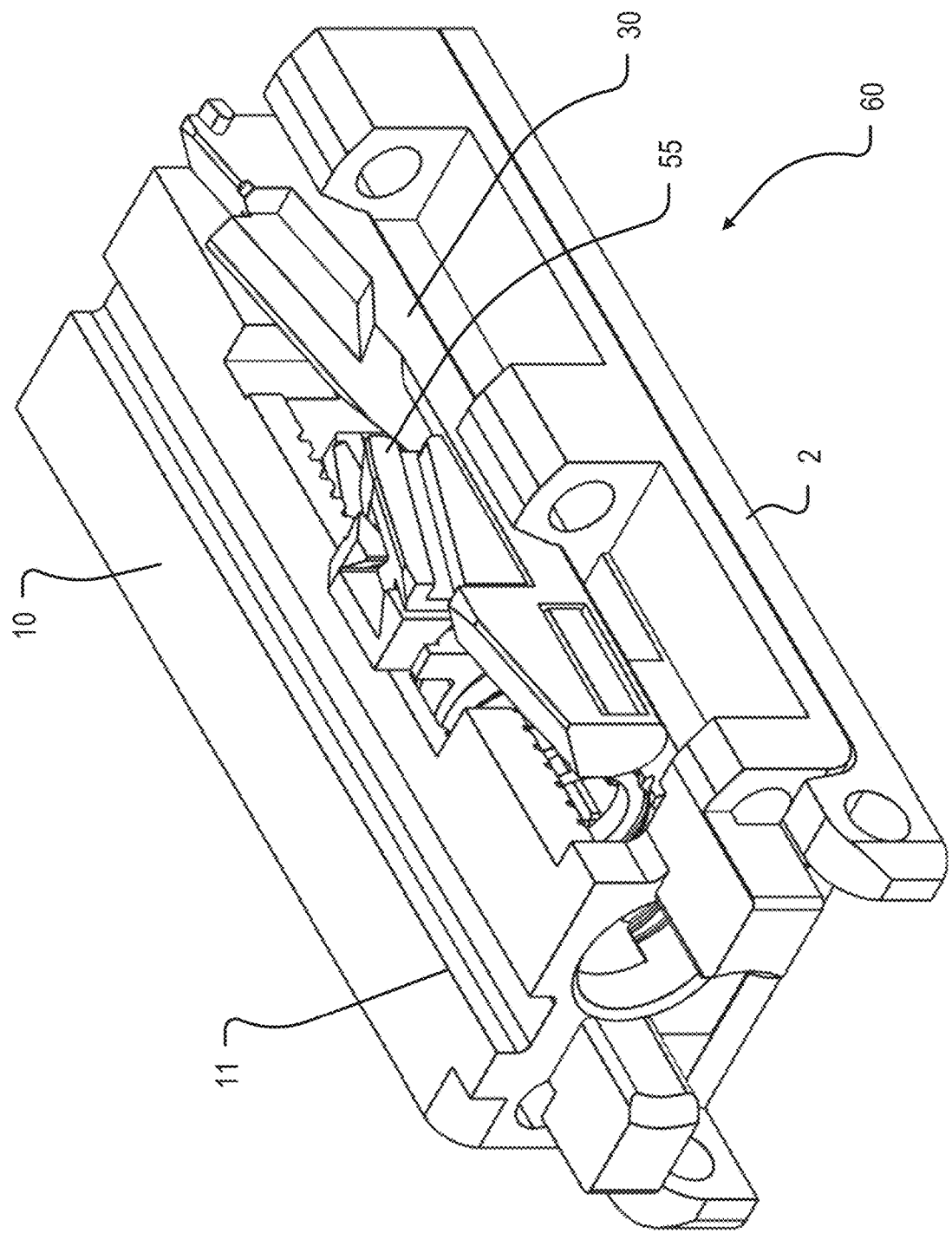
FIG. 10 is a partial parts perspective view of the implant with a superior endplate and the arm component of FIGS. 6A-6B removed for ease of understanding.
Figure 11:
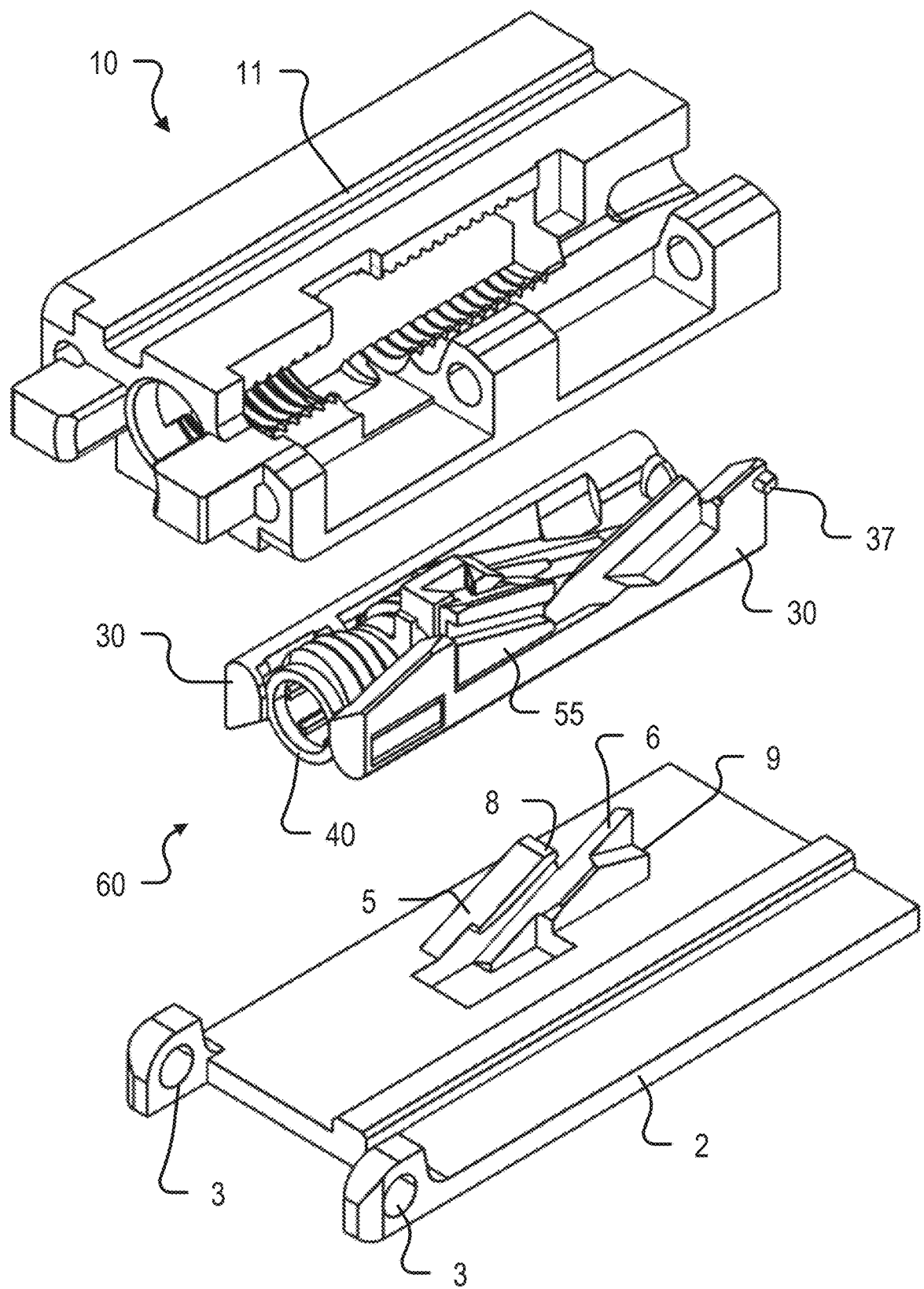
FIG. 11 is another exploded parts view of the implant.

FIG. 10 illustrates implant 100 with the superior endplate 1 and the arm 20 removed for ease of understanding of moving mechanism 60. In the example illustration, it is shown how a first side of moving mechanism 60 includes a first distraction wedge 30 and an angulation wedge 55. FIG. 11 shows the moving mechanism 60 removed from frame 10 and adjacent to inferior endplate 2. In this illustration, it is shown that inferior endplate 2 may include a first ramp 5 and a second ramp 6 that are inclined at the same angle relative to the interior surface of inferior endplate 2. First ramp 5 may include an overhang portion 8 that forms a channel between ramp 5 and ramp 6. Additionally, a third ramp 9 may be inclined on the interior surface of inferior endplate 2. In various embodiments, third ramp 9 may be inclined in an opposite direction compared to ramps 5 and 6 for reasons that will be made apparent below.

Figure 12:
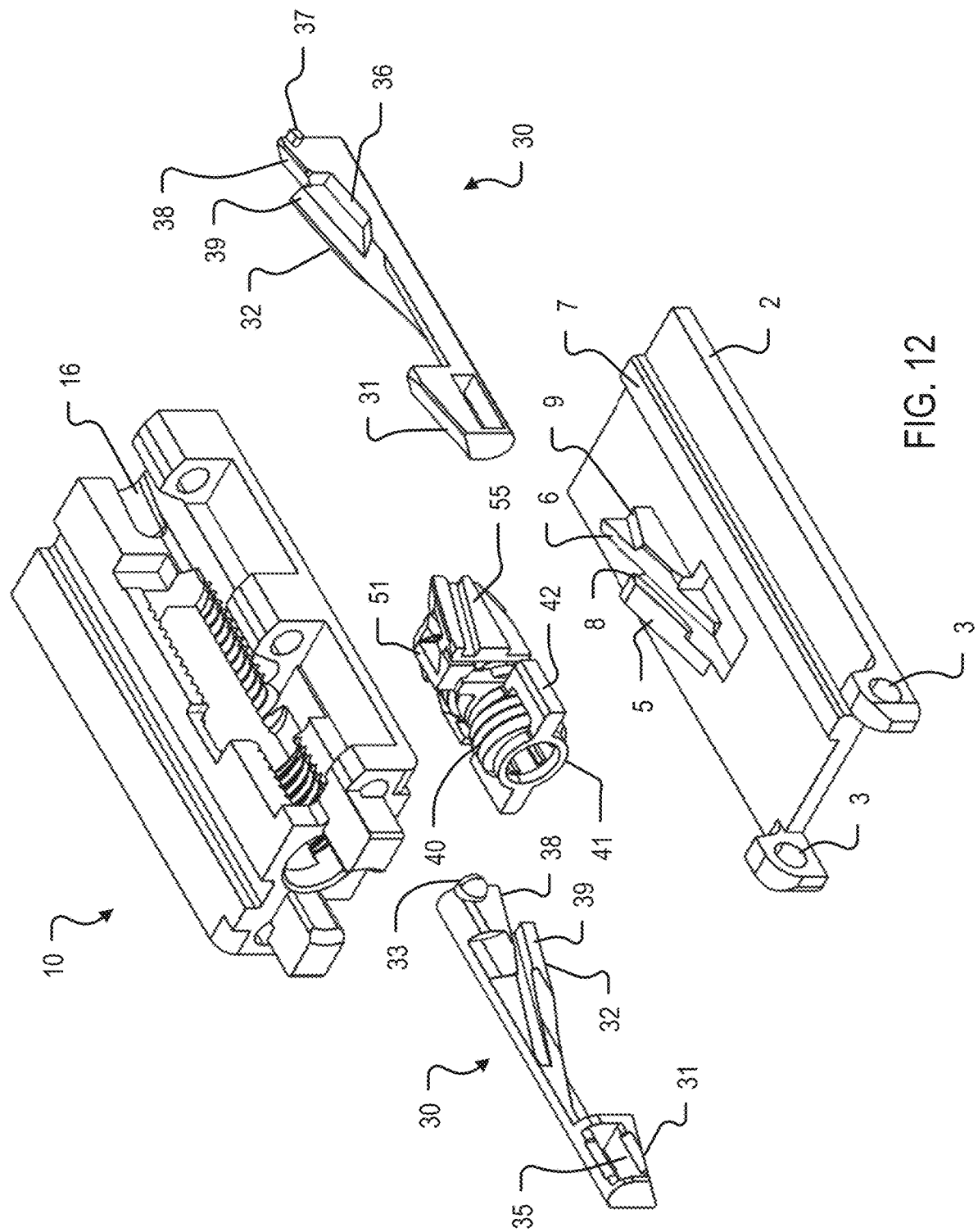
FIG. 12 is another exploded parts view of the implant.

FIG. 12 is another exploded parts view of implant 100 in which the arms 20 have been separated to show the various features of distraction wedge 30 and the other components of moving mechanism 60. For example, in between the distraction wedges 30 a first set screw 40 and a second set screw 50 are operably coupled to various components to cause the distracting and angulating of the implant 100. In FIG. 12, second set screw 50 is not labeled and only partially visible (see FIGS. 13, 14). Distraction wedge 30 may include a plurality of inclined surfaces or ramps 31, 32, 38. Ramp 32 may also protrude from a side of distraction wedge 30 to form rail portion 39 for connecting with a corresponding channel of angulation wedge 55 as will be explained below. Additionally, the outside surface of each distraction wedge 30 that faces the adjacent arm 20 may include at least one inclined protrusion 37 having top and bottom sliding surfaces. The inclined protrusion 37 may be configured for sliding disposal inside a corresponding channel 28 of an arm 20 such that the top and bottom surfaces of protrusion 37 slide along the corresponding surfaces of ramp 25 thereby slidably mating the distraction wedge 30 and arm 20.

Figure 13B:
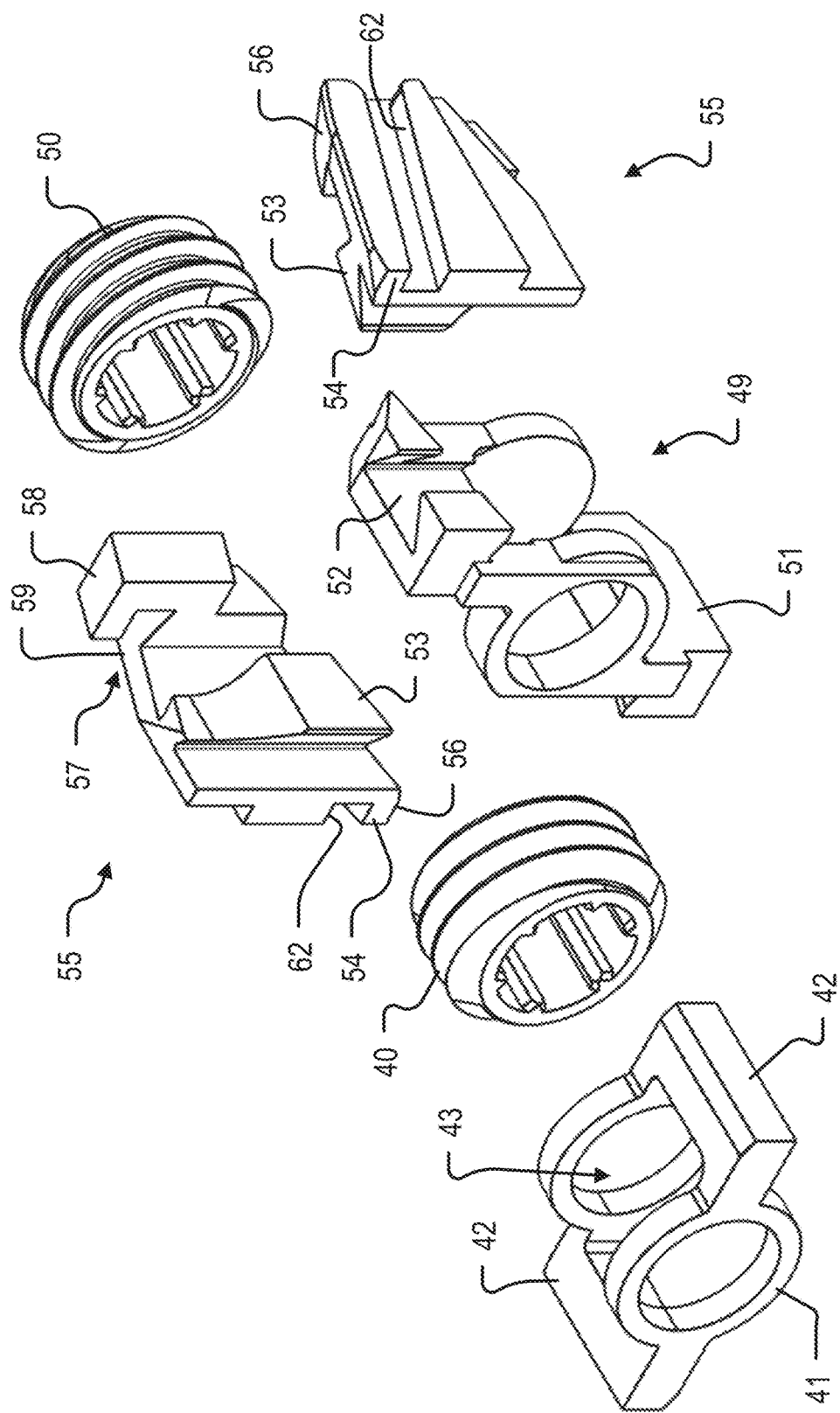
FIG. 13B is an exploded parts view of the components in FIG. 13A.

FIGS. 13A-13B illustrate a first set screw 40 and a second set screw 50 operably coupled with various components. First set screw 40 may be operably coupled to a first set screw frame 41 having first and second protrusions 42 (also referred to as bosses). In various embodiments, first set screw 40 may be disposed inside of a pocket 43 of first set screw frame 41 such that first set screw 40 may be rotated within track 13 and be linearly translated along a length of track 13. This loose type of coupling arrangement allows frame 41 to rotate as needed as the distraction wedges 30 move forward and backward in the longitudinal direction and up and down in the vertical direction. Additionally, second set screw 50 is operably coupled to a second set screw frame 51. For example, second set screw 50 may be disposed inside of a pocket 49 of frame 51 such that second set screw 50 may be rotated within track 14 and be linearly translated along a length of track 14. This loose type of coupling arrangement also allows frame 51 to rotate as needed as the angulation wedges 55 move forward and backward in the longitudinal direction and up and down in the vertical direction. Second set screw frame 51 is operably coupled to a pair of angulation wedges 55 (see FIG. 13A). Each angulation wedge 55 may include a rail 53 having a size and shape corresponding to a respective channel 52 of the second set screw frame 51. In the example embodiment, channels 52 of frame 51 extend in a vertical direction and therefore allow the angulation wedges 55 to move up and down relative to frame 51 by sliding against corresponding ramps 5, 6 of the superior and inferior endplates 1, 2. Each angulation wedge 55 may include a sliding ramp surface 56 that is configured to slide across the inclined surface of ramp 6 and a sliding surface or ramp 62 that is configured to slide across the inclined surface of ramp 5. Additionally, rail portion 54 of angulation wedge 55 may be disposed in the channel formed between ramps 5 and 6 and overhang portion 8. In this way, each angulation wedge 55 may be operably coupled to and mated with a corresponding endplate 1, 2. Each distraction wedge may also include a C-shaped overhang 58 that hangs over sliding ramp surface 59 and thereby forms a channel 57 therebetween. The rail 39 of distraction wedge 30 may be disposed in the channel 57 and thereby slidably coupled to and mated with the distraction wedge 30 and angulation wedge 55. Stated another way, this arrangement allows components to slide forward and backward with respect to one another without becoming disconnected during operation.

Figure 14:
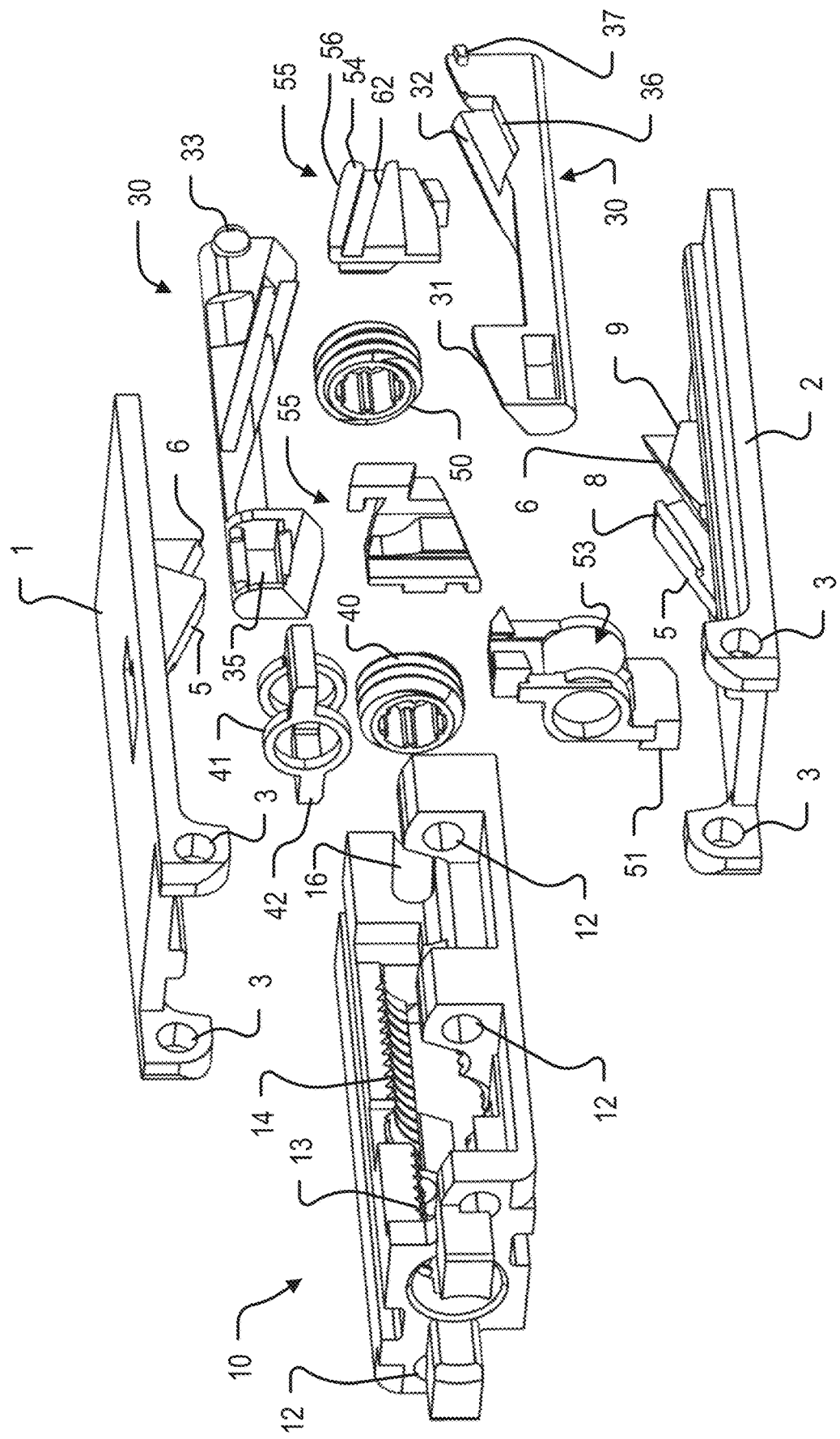
FIG. 14 is another partial parts exploded view of the implant.

FIG. 14 is another exploded parts view of implant 100 without the arms 20 illustrated for ease of understanding. FIG. 15 is an exploded parts view of implant 100 with all of the components illustrated. In FIG. 15, generally only the primary components and most important features necessary to explain the order of assembly of the implant 100 are labeled because the various sub-features are more easily visible in the other larger exploded parts views (see, e.g., FIGS. 9, and 11-14). FIG. 15 illustrates the arms 20 and longitudinal pins 70 that extend along longitudinal axes L1 and L2 (see FIGS. 1A and 5), respectively, as well as the transverse pins 71 that extend along transverse axes T1 and T2 (see FIGS. 1B and 6B), respectively. In the example embodiment it is shown that each of the superior and inferior endplates 1, 2 are operably coupled to a corresponding arm 20 by way of a corresponding transverse pin 71. For example, each transverse pin 71 may extend through the apertures defined by the two corresponding endplate barrels 3 and the aperture defined by the arm barrel 23. Each arm 20 may be operably coupled to the frame 10 by the longitudinal pin 70. For example, each longitudinal pin 70 may extend through the apertures defined by the two arm barrels 22 and the apertures defined by the three frame barrels 12. When assembled, the two arm barrels 22 may be disposed between the three frame barrels 12 in alternating sequence. It shall be understood that the number, size, orientation, and shape, of frame barrels 12 and arm barrels 22, 23 may vary from embodiment to embodiment. As explained previously, the frame 10 may operably support the first set screw 40 and second set screw 50 within the tracks 13, 14 (see FIG. 14).

The first set screw 40 may be operably coupled to first set screw frame 41 and the second set screw 50 may be operably coupled to second set screw frame 51. Thus, the first set screw 40 may be operably coupled to the distraction wedges 30 via first set screw frame 41. The second set screw 50 may be operably coupled to the angulation wedges 55 via the second set screw frame 51. Additionally, the distraction wedges 30 may be operably coupled to the angulation wedges 55 as explained previously. Each of the set screws 40, 50 may be rotated by a corresponding surgical tool 200 (e.g., a torx or hexalobe driver) as will be explained in further detail below.

Figure 16:
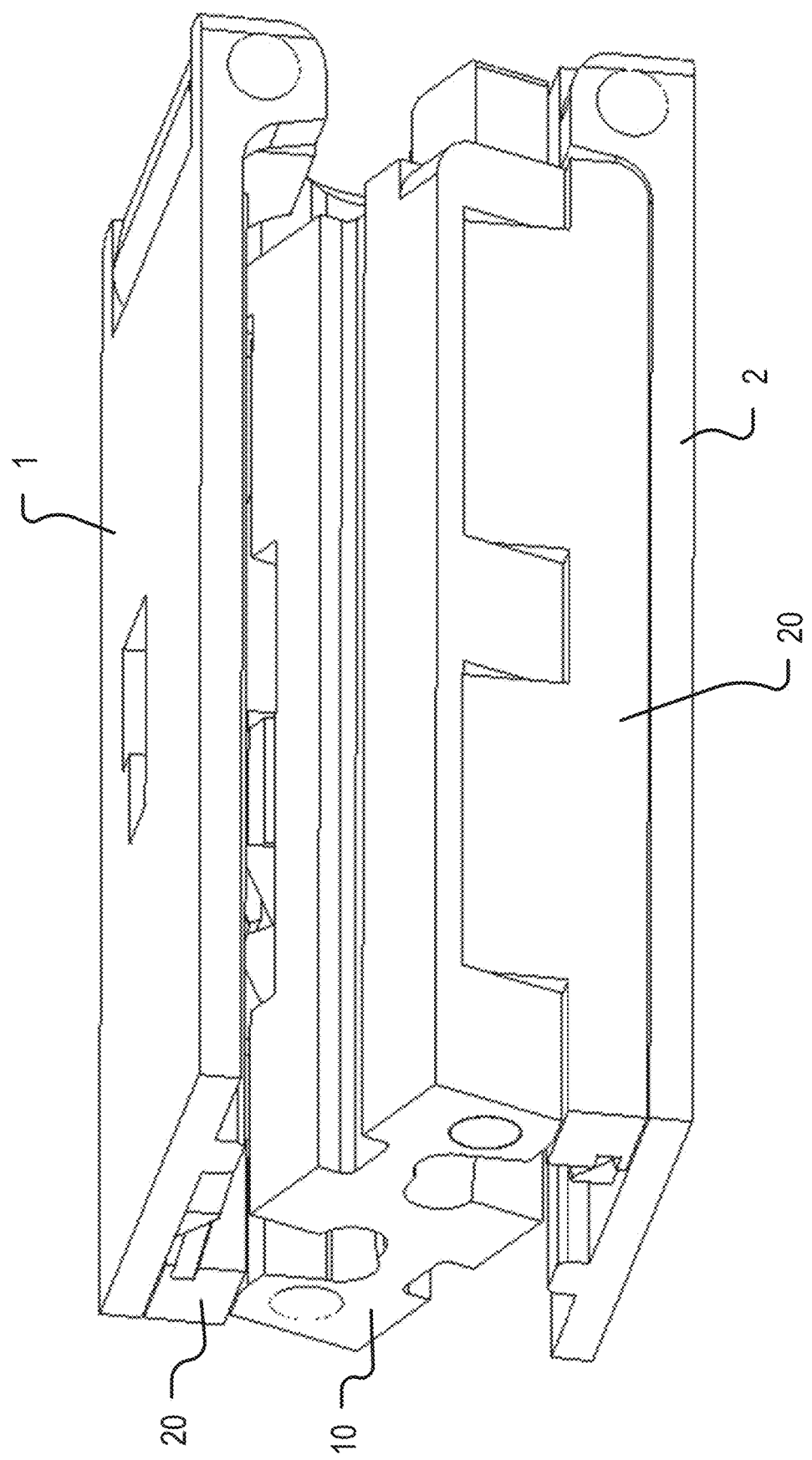
FIG. 16 is a first perspective view of the implant in a distracted configuration.
Figure 17:
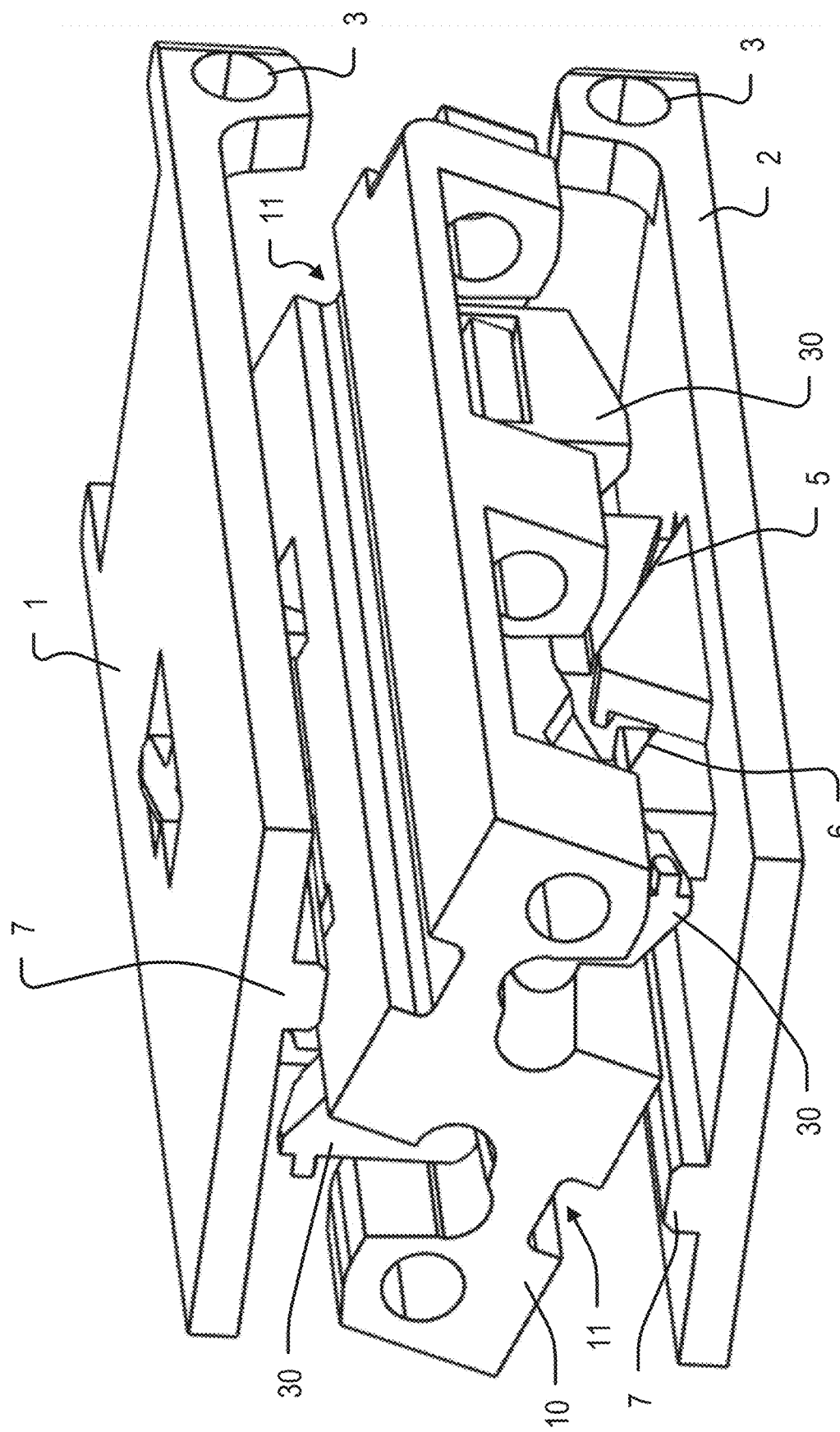
FIG. 17 is a partial parts perspective view of the configuration shown in FIG. 16 with the arm component removed for ease of understanding.
Figure 18:
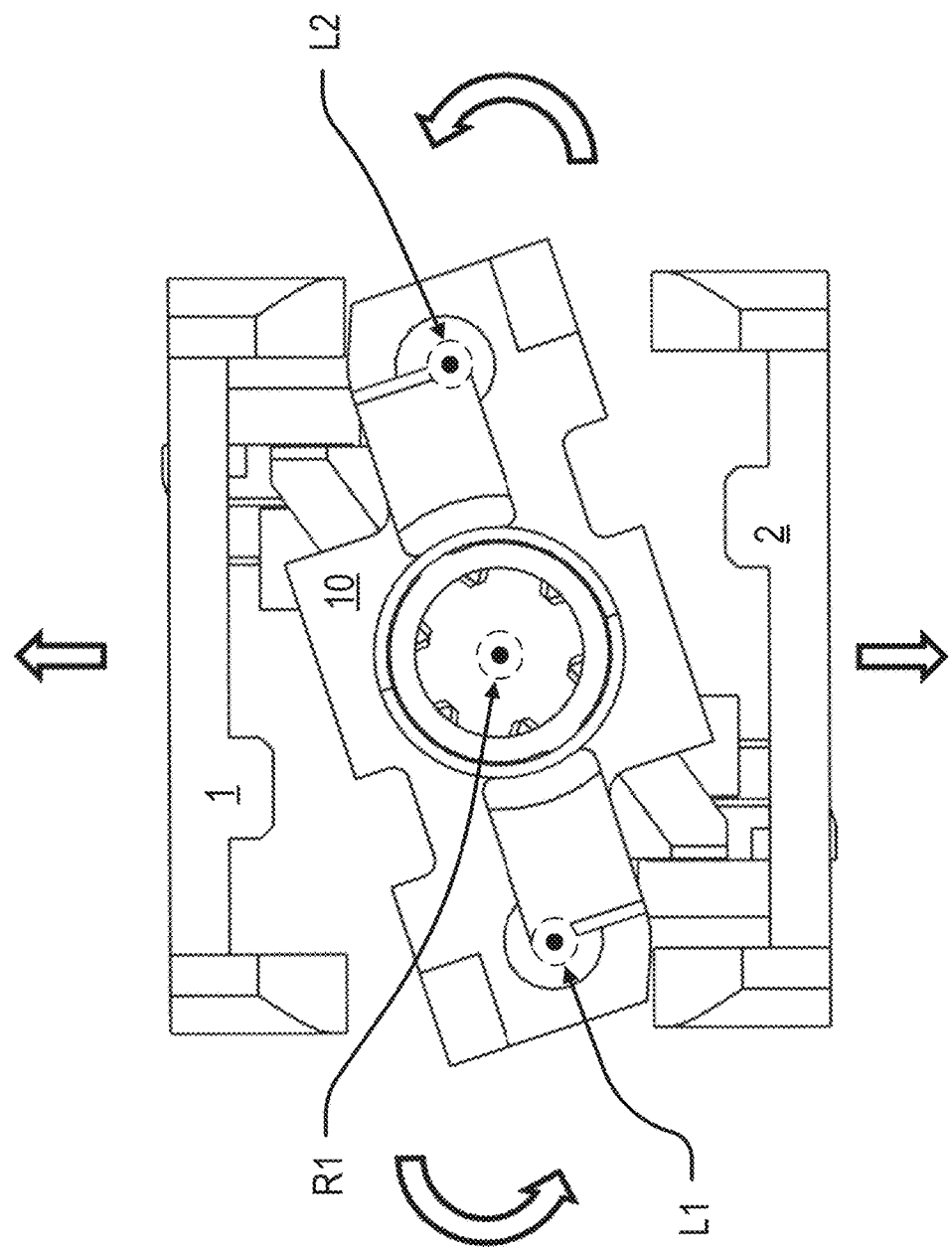
FIG. 18 is a front view of the implant in a distracted configuration.
Figure 19:
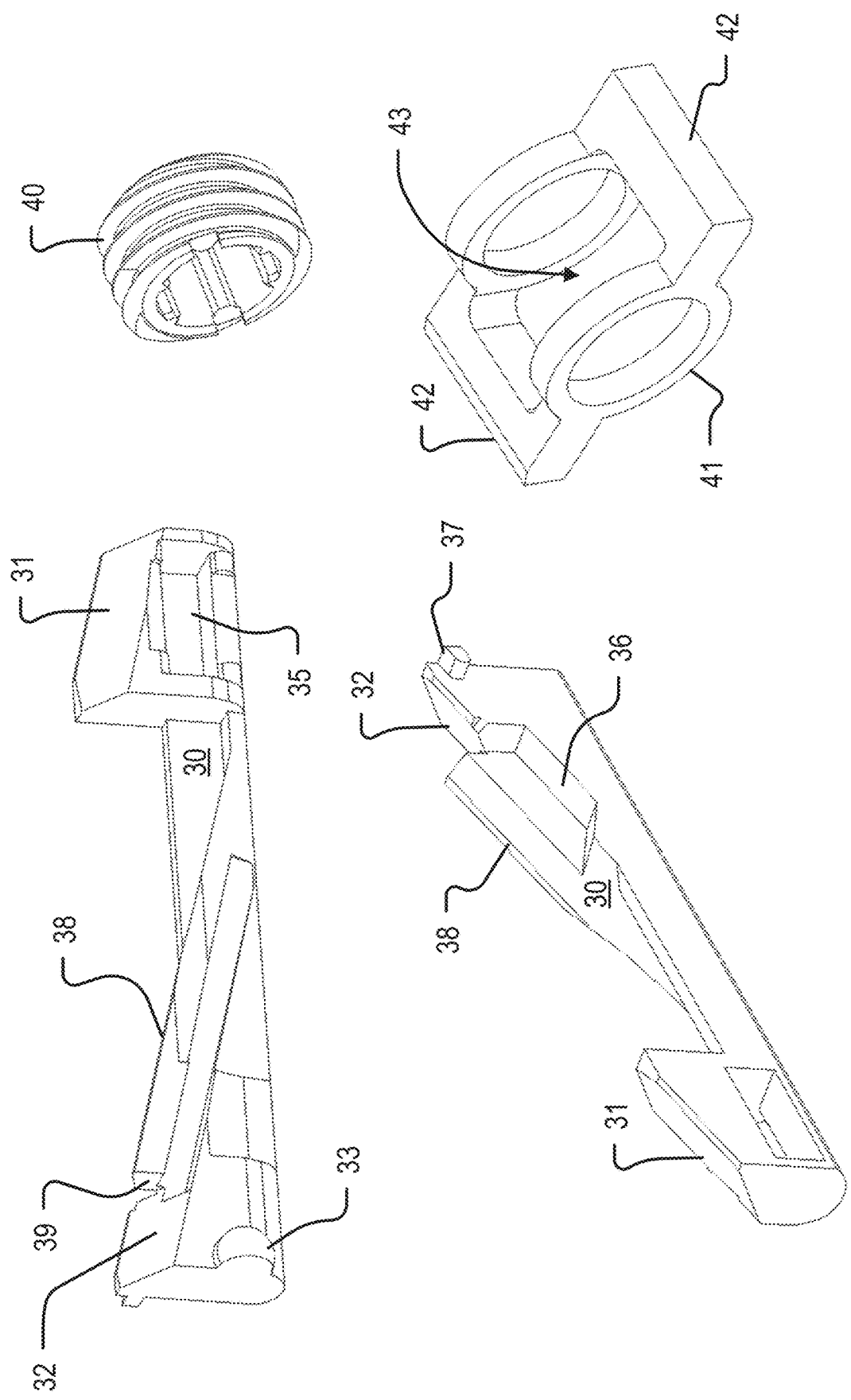
FIG. 19 is a partial parts exploded view of select components of the moving mechanism.

Referring generally to FIGS. 16-18, various views of implant 100 positioned in a distracted position are shown. In the particular configuration of FIG. 16, implant 100 may be considered to be parallel distracted on account of there being no relative change in the angle of inclination between the superior endplate 1 and inferior endplate 2. For example, a distance between the outside surfaces of superior endplate 1 and inferior endplate 2 is greater than in the collapsed configuration and the implant 100 is not lordosed. Distraction of implant 100 may be achieved by action of the first set screw 40 moving the distraction wedges 30 from the distal end 100D of implant 100 towards the proximal end 100P of implant 100. With reference to FIG. 17, the arms 20 are removed to show how the distraction wedges 30 have linearly moved in the longitudinal direction of implant 100 and how the frame 10 may rotate while the cylindrical portion of distraction wedges 30 remain within the circular channel 16 of frame 10. This configuration allows the distraction wedges 30 to move forward and backward while the frame 10 rotates (pivots about L1 and L2). With reference to FIG. 18, first set screw frame 41 may be rotated around rotation axis R1 thereby linearly moving distraction wedges 30 and causing frame 10 to rotate about the rotation axis R1. Rotation axis R1 may extend in a longitudinal direction of implant 100 and be defined by the tracks 13, 14. In the illustrated embodiment, rotation axis R1 may extend through the center of frame 10 and implant 100 in the longitudinal direction. In other embodiments, R1 may be offset from center of frame 10 and implant 100. As illustrated, due to the way that superior endplate 1 is coupled to frame 10 by longitudinal pin 70 the superior endplate 1 is urged upward in the vertical direction by pivoting along longitudinal pivoting axis L2. Similarly, due to the way that inferior endplate 2 is coupled to frame 10 by longitudinal pin 70 the inferior endplate 2 is urged downward in the vertical direction by pivoting along longitudinal pivoting axis L1.

Referring generally to FIG. 19 and FIGS. 20A-23 various views showing the components responsible for distraction of implant 100 are illustrated. Briefly recall, first set screw 40 may be disposed in the pocket 43 of first set screw frame 41. Each wing like protrusion 42 may be disposed within a corresponding cavity 35 (also referred to as an eyelet) of one of the distraction wedges 30. For example, the protrusions 42 are nested within cavity 35 but are not directly coupled by a rigid connection. Ramps 31 and 32 may act against corresponding ramps 25, 26 of arm 20 to thereby wedge apart arm 20 (i.e., drive it apart). Additionally, protrusion 37 may be mated with arm 20 via channel 28 (see FIG. 6B). Furthermore, rail 39 may be mated with the angulation wedge 55. In the collapsed position, angulation wedge 55 may be nested within relief area 36 (see FIG. 12). In this embodiment, movement of solely the distraction wedge 30 by only actuating first set screw 40 will not cause the angulation wedges 55 to adjust the angulation of the superior and inferior endplates 1, 2. However, the angulation wedges 55 may move upward and downward, respectively, on account of being mated to the corresponding endplate 1, 2 and the distraction wedge 30 (see FIG. 20). Stated another way, each angulation wedge 55 may move up or down in the vertical direction with respect to the second set screw frame 51 as distraction wedge 30 is linearly translated (see FIG. 20B) and the angulation wedge 55 maintains its same relative position with respect to arm 20. In at least some embodiments, second set screw frame 51 may rotate or tilt about its rotation axis to accommodate this functionality.

Referring now to FIGS. 20A-23 a method of distracting implant 100 will be disclosed. FIGS. 20A, 20B, 21A, and 21B are partial parts section views of implant 100 from a distal perspective. FIGS. 20A, 21A, and 22A show implant 100 in a collapsed position before actuation of first set screw 40 and FIGS. 20B, 21B, and 22B show implant 100 in a distracted position after actuation of first set screw 40. The angulation wedges 55, second set screw 50, and surgical tool 200 are removed in FIGS. 21A, 21B, 22A, and 22B. FIGS. 22A and 22B are corresponding partial parts section views of FIGS. 21A and 21B, respectively, from a proximal perspective.

Figures 21A, 21B:
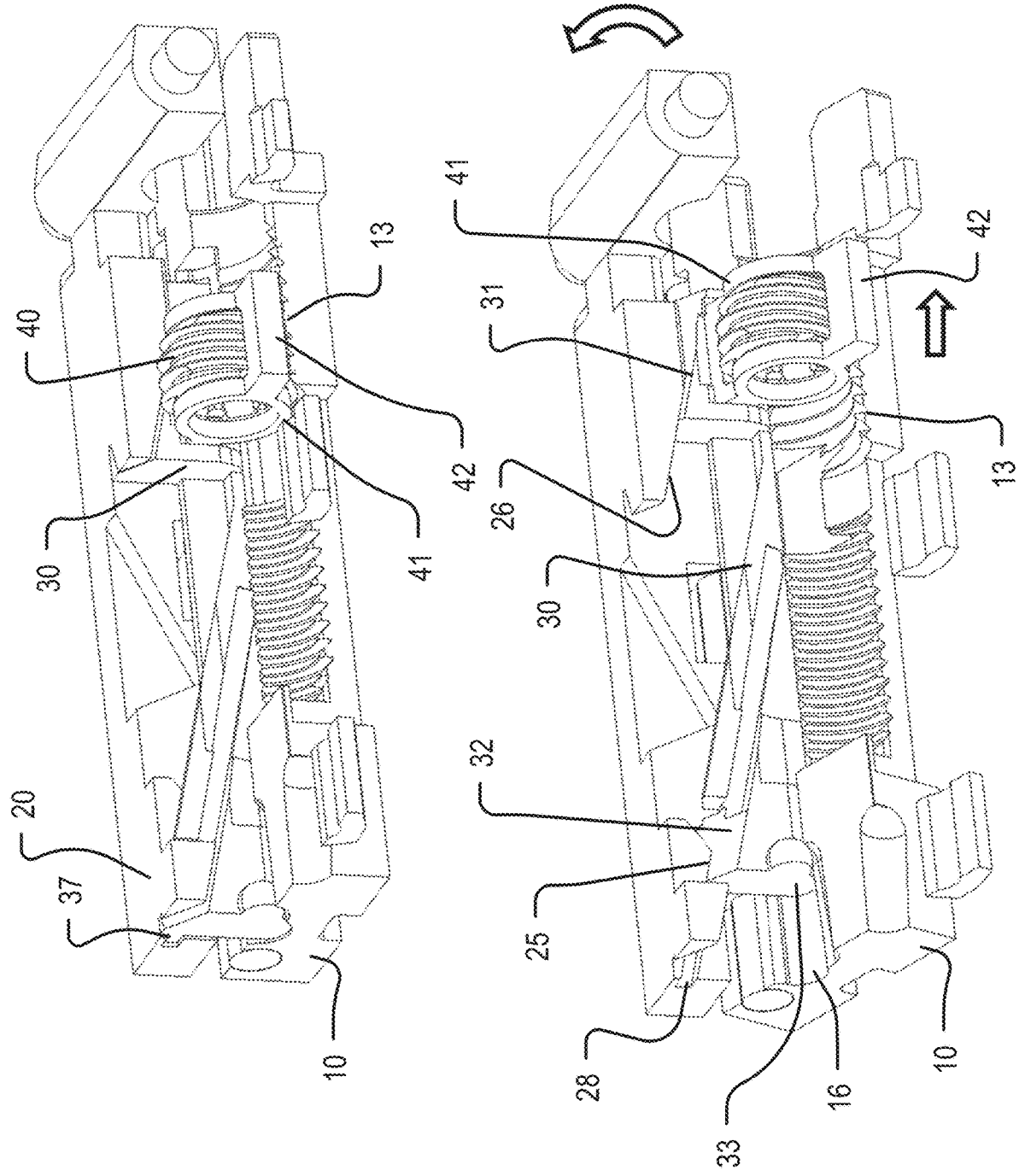
FIG. 21A is a partial parts section view of the implant in the collapsed position shown in FIG. 20A.
FIG. 21B is a partial parts section view of the implant in the distracted position shown in FIG. 20B.
Figures 22A, 22B:
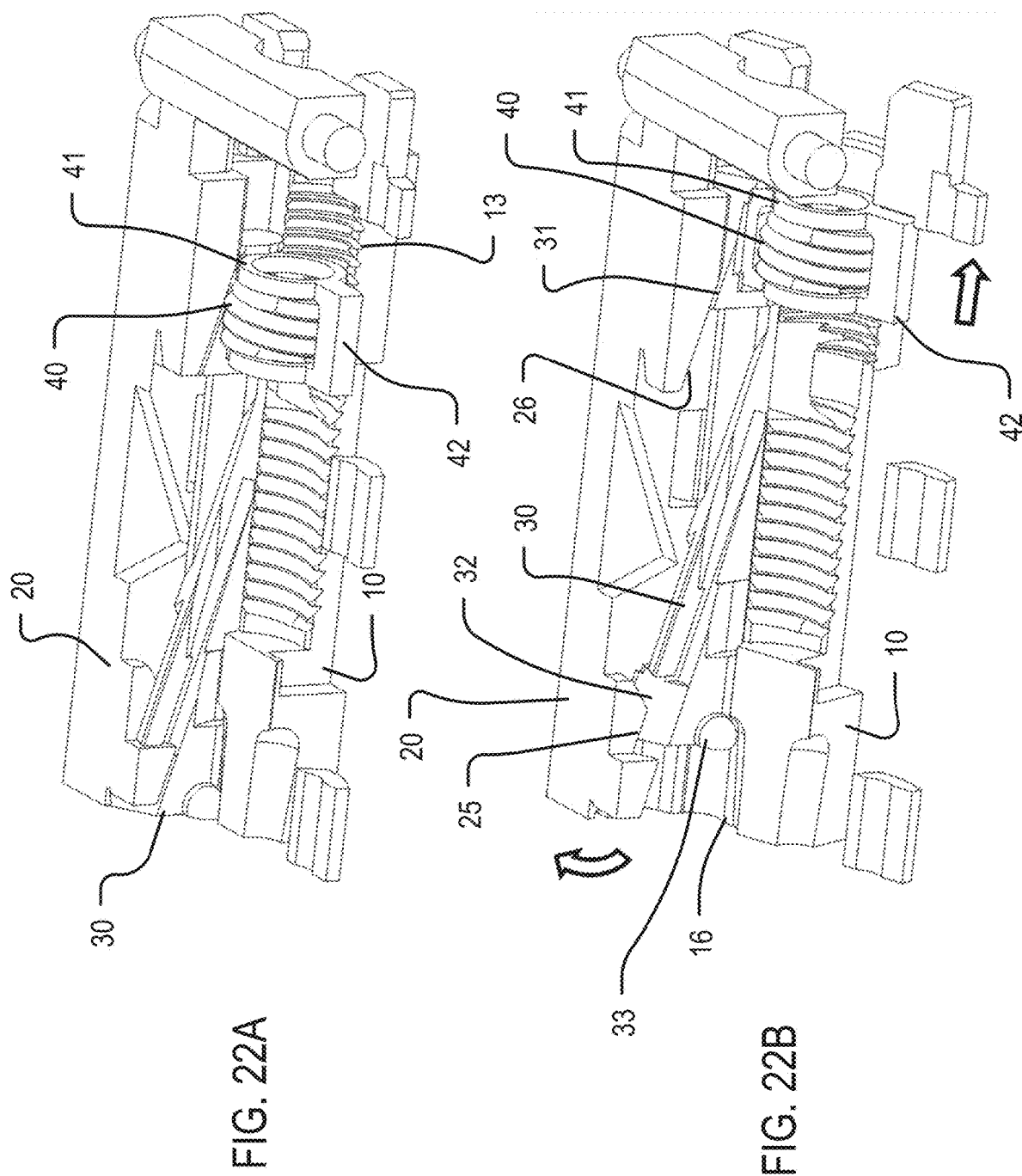
FIG. 22A is an alternate partial parts section view of the implant in the collapsed position shown in FIGS. 20A and 21A.
FIG. 22B is an alternate partial parts section view of the implant in the distracted position shown in FIGS. 20B and 21B.

A surgeon may insert surgical tool 200 within the access aperture 17 of the proximal end 100P of implant 100 such that the drive end of tool 200 may rotate the first set screw 40. In doing so, first set screw 40 is translated linearly within track 13 thereby pulling first set screw frame 41 in the longitudinal direction. Because first set screw frame 41 is coupled to distraction wedges 30 via wing like protrusions 42 being nested within cavity 35 the distraction wedges 30 also move in the longitudinal direction towards the proximal end 100P of implant 100. As shown in FIGS. 20B, 21B, and 22B, each distraction wedge 30 pushes the adjacent arm 20 away. For example, the ramps 31, 32 of distraction wedge 30 act against the ramps 25, 26 of arm 20. In this way, the distraction wedge 30 causes the adjacent arm 20 to pivot away from the frame 10. Stated another way, the pair of distraction wedges 30 cause the frame 10 to rotate about the central rotation axis R1 (see FIG. 18) thereby distracting the superior and inferior endplates 1, 2.

Figure 23:
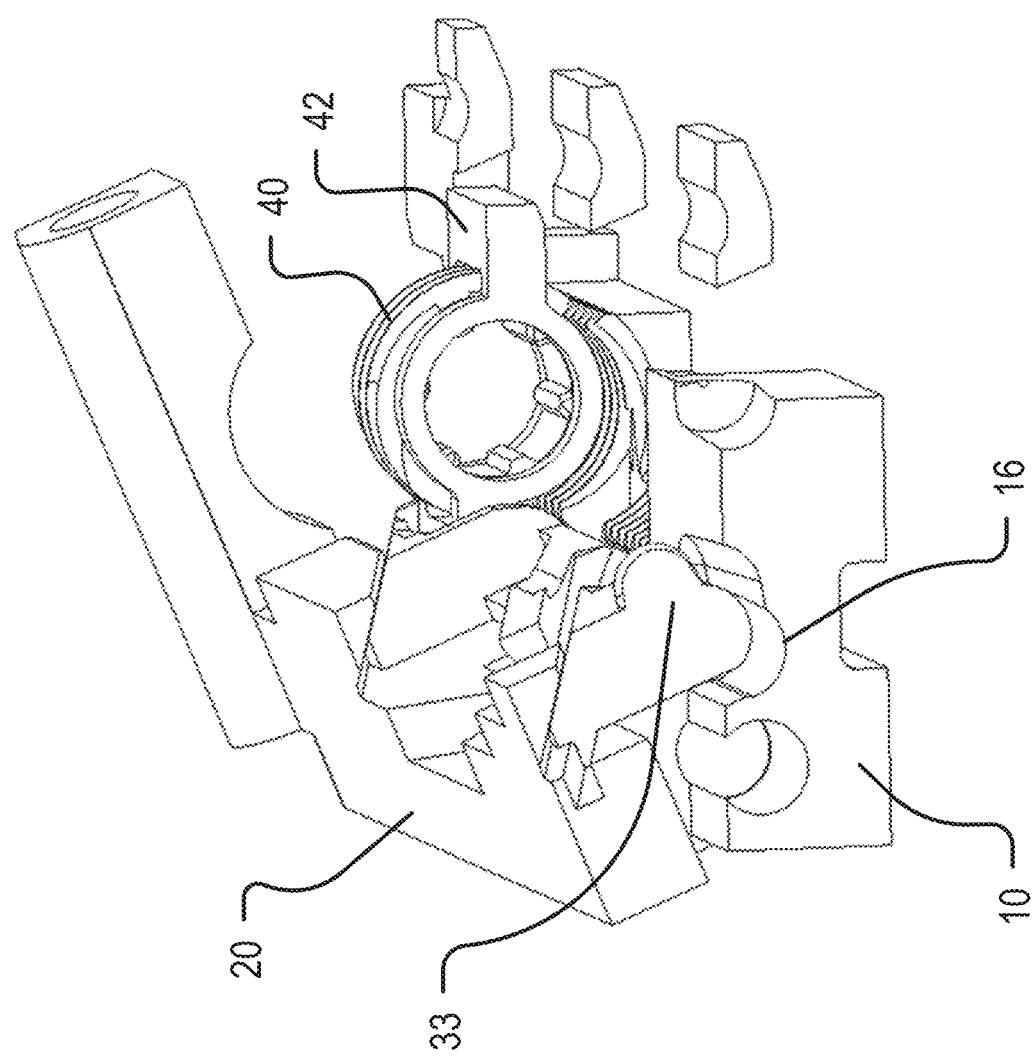
FIG. 23 is a head on partial parts section view of the implant in the distracted position shown in FIGS. 20B, 21B, and 22B.

As seen best in FIG. 23, it is shown that as the frame 10 rotates relative to the arm 20, the distraction wedge 30 pivots in the circular channel 16. In this way, the distraction wedges 30 move forward and backward in the longitudinal direction while also rotating, at least partially, within the cylindrical channel 16 about a corresponding axis defined by the channel 16. The first set screw frame 41 may also rotate to accommodate this functionality.

Figure 24:
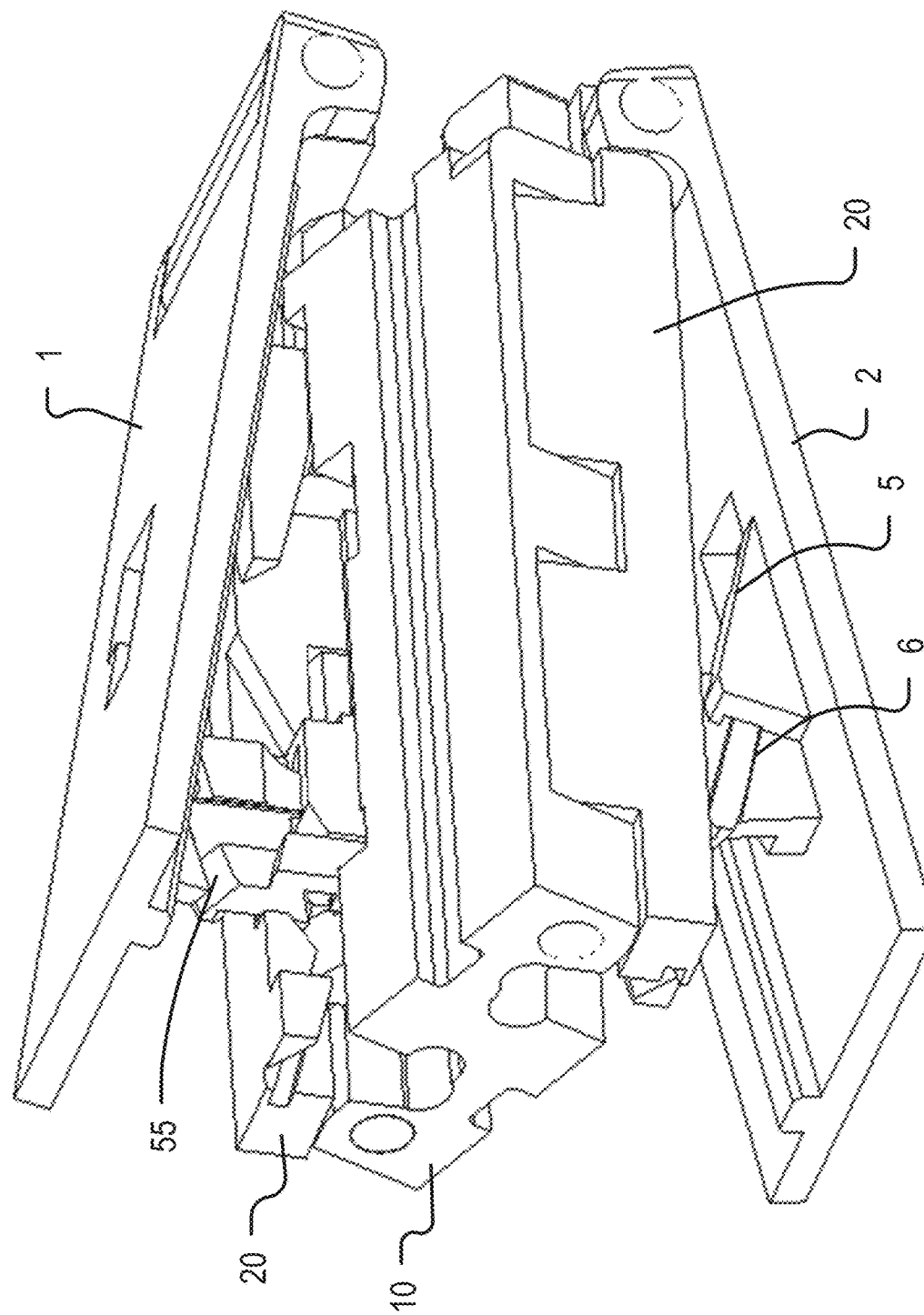
FIG. 24 is a perspective view of the implant in a lordosed configuration.
Figure 25:
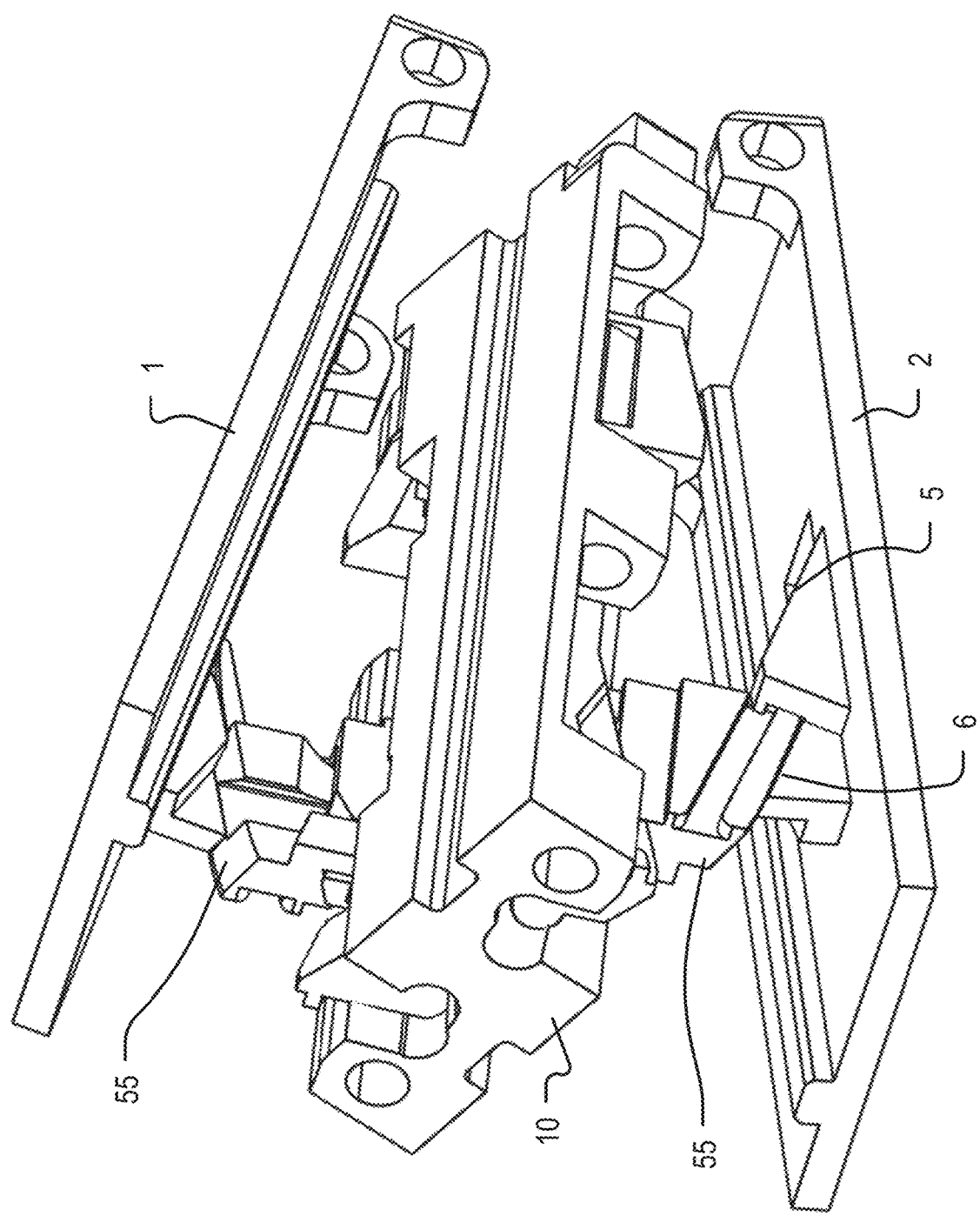
FIG. 25 is a partial parts view of the implant in a lordosed configuration with the arm component removed for ease of understanding.
Figure 26:
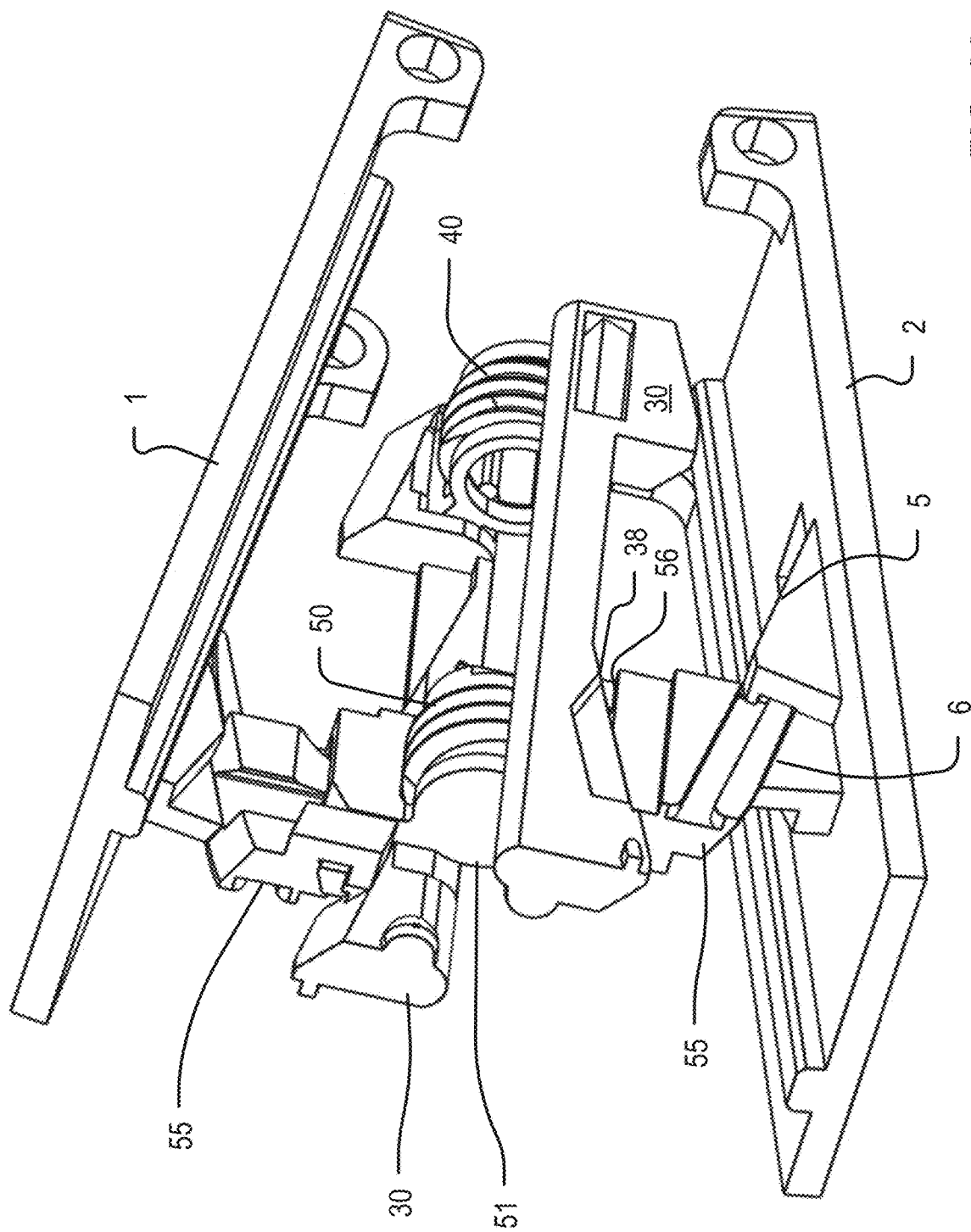
FIG. 26 is a partial partis view of the implant in the lordosed configuration of FIG. 25 with the arm component and frame component removed for ease of understanding.

Referring generally to FIGS. 24-26, various views of implant 100 being positioned in a lordosed and distracted configuration are shown. In this particular configuration, implant 100 may be considered to be lordosed because an interior angle measured between an outside surface of superior endplate 1 and inferior endplate 2 is greater than a corresponding interior angle of implant 100 in the collapsed position. Additionally, implant 100 is distracted because a spacing distance between the superior endplate 1 and inferior endplate 2 is increased relative to the collapsed position. However, the distraction is not "parallel" on account of the lordotic angle between the superior endplate 1 and inferior endplate 2. As seen in FIG. 24, arms 20 are angulated outward by pivoting along the longitudinal pivoting axes L1, L2 (see FIG. 1A) which urges the superior and inferior endplates 1, 2 apart in the vertical direction. Additionally, the angulation wedges 55 are shown fully extended away from the arms 20 in the vertical direction thereby pivoting the superior and inferior endplates 1, 2 away from one another along the transverse pivoting axes T1, T2 (see FIG. 1B). As seen in FIG. 25, the arms 20 have been removed to shown how each of the angulation wedges 55 have moved along the ramps 5, 6 of endplates 1, 2 to thereby incline implant 100.

As seen in FIG. 26, the frame 10 has been removed to show how the angulation wedges 55 are also operably coupled with the distraction wedges 30. In this embodiment, the angulation wedges 55 also act against the ramped surfaces of the distraction wedges 30. For example, sliding surface 56 acts against ramped surface 38 of the distraction wedge 30. In this way, angulation wedge 55 pulls double duty in that it acts against two different inclined ramp surfaces which increases the relative lordotic angle adjustment vs. acting against a single inclined ramp surface.

Referring generally to FIGS. 27A-30B a method of adjusting the lordosis of implant 100 will be discussed. FIGS. 27A-30B illustrate various partial parts section views showing how implant 100 may be moved from the collapsed configuration to a lordosed configuration by actuating a second set screw 50 via surgical tool 200 are illustrated.

Figure 27A:
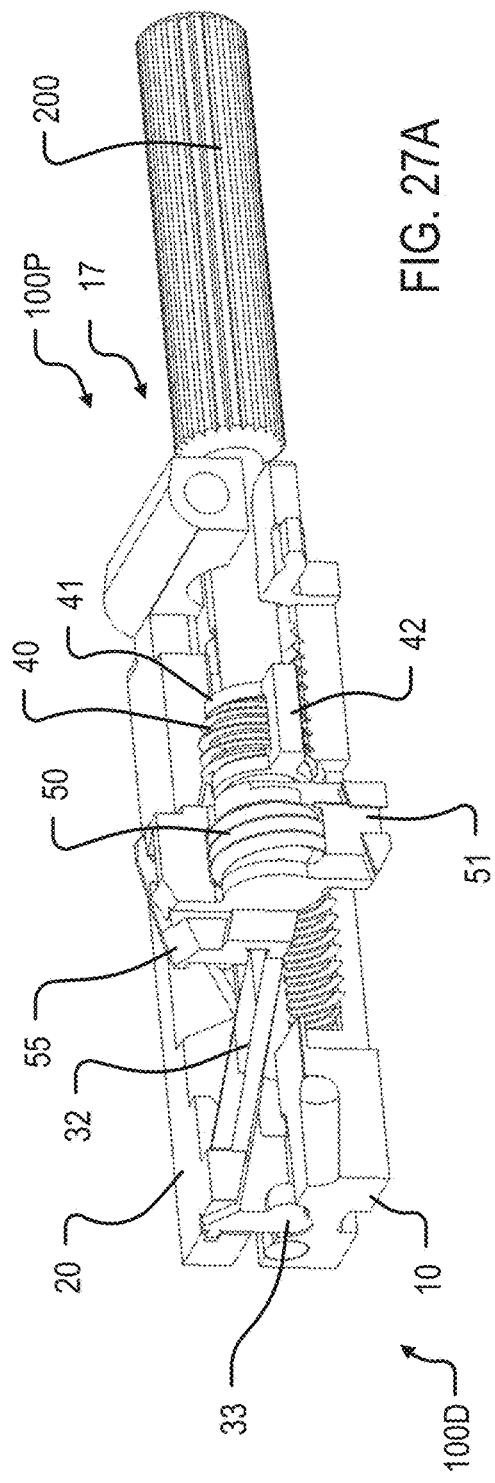
FIG. 27A is a partial parts section view of the implant in a collapsed position and a driver configured to interact with a second set screw of the moving mechanism.
Figure 27B:
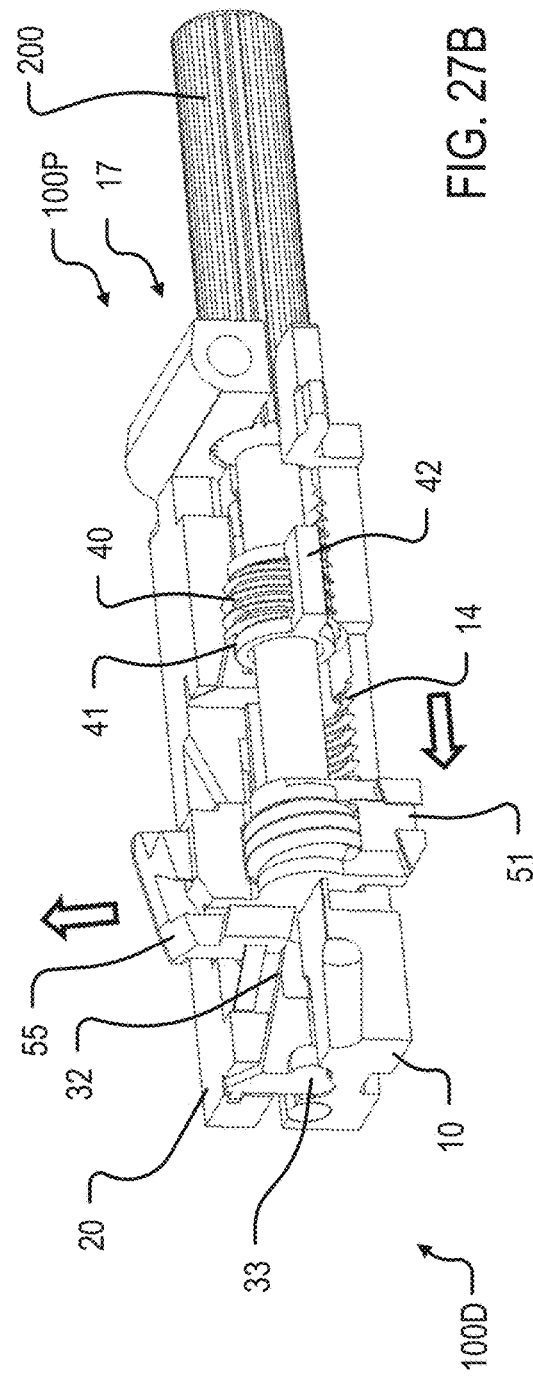
FIG. 27B is a partial parts section view of the implant of FIG. 20A in an expanded position after the driver has lordosed the implant.
Figure 29A:
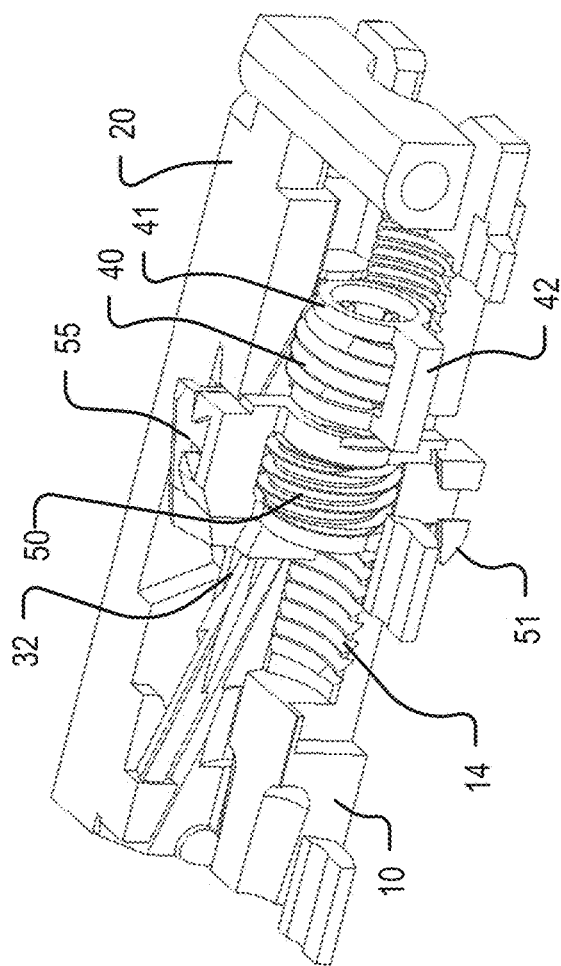
FIG. 29A is an alternate partial parts section view of the implant in the collapsed position of FIGS. 27A and 28A.
Figure 29B:
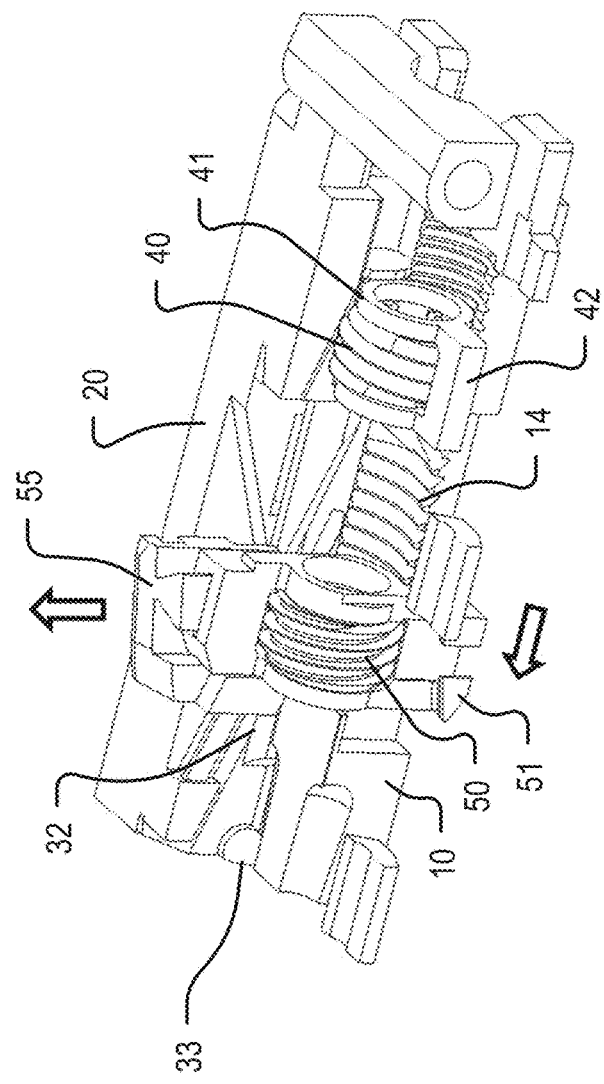
FIG. 29B is an alternate partial parts section view of the implant in the lordosed position of FIGS. 27B and 28B.
Figure 30A:
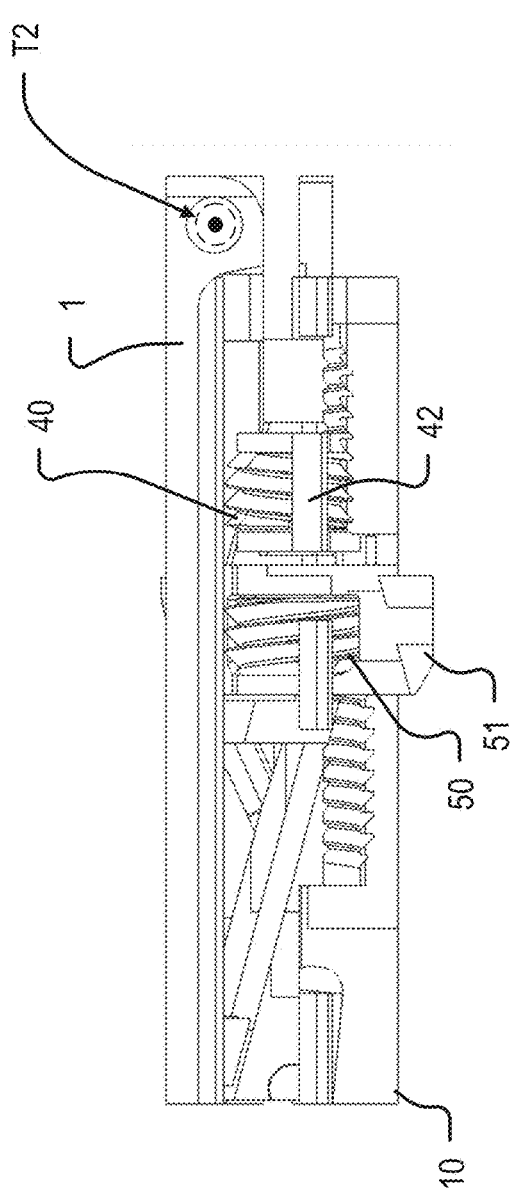
FIG. 30A is a side section view showing the implant in a collapsed configuration.
Figure 30B:
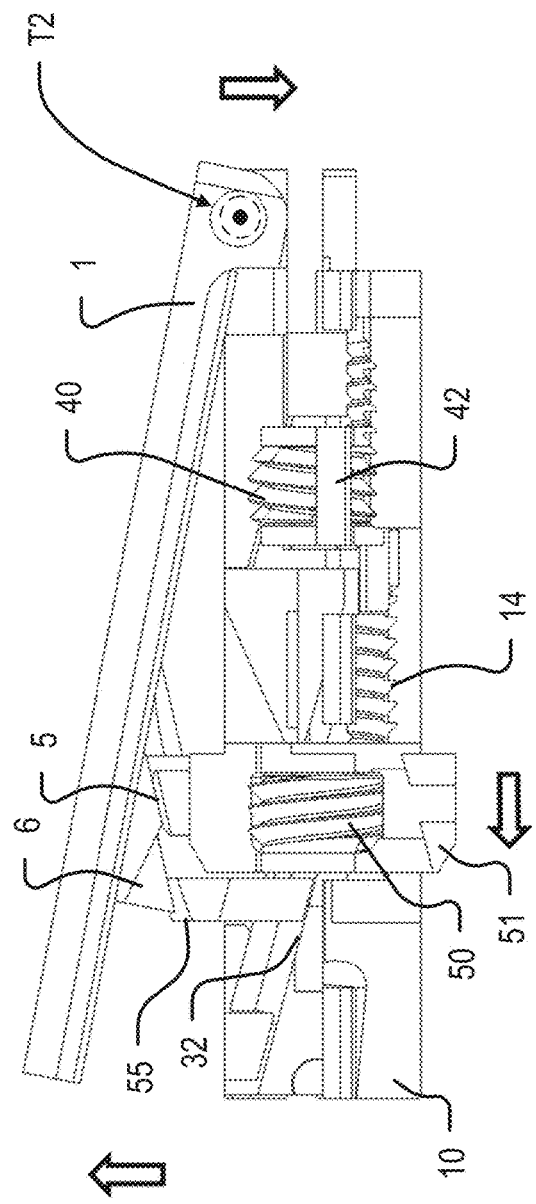
FIG. 30B is a side section view showing the implant in a lordosed configuration.

FIGS. 27A, 28A, 29A, and 30A illustrate implant 100 in a collapsed configuration. FIGS. 27B, 28B, 29B, and 30B illustrate implant 100 in a lordosed configuration. FIGS. 27A and 27B illustrate the surgical tool 200 interacting with second set screw 50 from a distal perspective. FIGS. 28A-30B illustrate the operation of angulation wedges 55 from a distal perspective and with the surgical tool 200 removed for ease of understanding. FIGS. 29A-29B illustrate the operation of angulation wedges 55 from a proximal perspective and with the surgical tool 200 removed for ease of understanding. FIGS. 30A and 30B are side section views showing the operation of distraction wedges.

As shown in FIGS. 27A-27B, a surgeon may insert surgical tool 200 within the access aperture 17 of the proximal end 100P of implant 100 and through the center of set screw 40 such that the drive end of tool 200 may rotate the second set screw 50. In doing so, only the second set screw 50 is translated linearly within track 14 thereby moving second set screw frame 51 in the longitudinal direction towards the distal end 100D. Because second set screw frame 51 is coupled to angulation wedges 55 via rail 53 and channel 52 (see FIG. 14) the angulation wedges 55 also move in the longitudinal direction towards the distal end 100D of implant 100. As explained in further detail below, and because of the particular mating arrangement between each corresponding angulation wedge 55, distraction wedge 30, and endplates 1, 2, the angulation wedge 55 may move away from second set screw frame 51 to cause the superior and inferior endplates 1, 2 to angulate.

As shown in FIGS. 27B, 28B, 29B and 30B, the angulation wedge 55 moves in the vertical direction away from second set screw frame 51. For example, angulation wedge 55 may ride along the ramp 32 of arm 20 on account of rail portion of ramp 32 being operably mated with channel 57. At the same time, angulation wedge 55 may ride along the ramps 5, 6 of the corresponding endplate 1, 2 thereby causing the superior and inferior endplates to become angled with respect to one another. With reference, to FIG. 30B, the pivoting of superior endplate 1 about transverse pivoting axis T2 is illustrated. As shown, angulation wedge 55 is linearly translated in the longitudinal direction and acts against ramp 32 of distraction wedge 30 and ramps 5 and 6 of superior endplate 1. In doing so, angulation wedge 55 urges superior endplate 1 upwards in the vertical direction thereby causing superior endplate 1 to pivot about the transverse pivoting axis T2. For example, the proximal side of superior endplate 1 may move downward in the vertical direction and the distal side of superior endplate 1 may move upward in the vertical direction. Although not illustrated in FIGS. 30A and 30B, it shall be appreciated that the angulation wedge 55 associated with the inferior endplate 2 may cause the same type of pivoting by the inferior endplate 2.

It should be understood that various aspects disclosed herein may be combined in different combinations than the combinations specifically presented in the description and accompanying drawings. For example, features, functionality, and components from one embodiment may be combined with another embodiment and vice versa unless the context clearly indicates otherwise. Similarly, features, functionality, and components may be omitted unless the context clearly indicates otherwise. It should also be understood that, depending on the example, certain acts or events of any of the processes or methods described herein may be performed in a different sequence, may be added, merged, or left out altogether (e.g., all described acts or events may not be necessary to carry out the techniques).

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, elements, and/or components, but do not preclude the presence or addition of one or more other features, steps, operations, elements, components, and/or groups thereof.

What is claimed is:

1. An expandable implant pivotally movable between a collapsed position, an expanded position, and an angled position, comprising:
    a first pivoting axis extending in a longitudinal direction of the expandable implant and a second pivoting axis extending in a transverse direction of the expandable implant;
    a frame pivotally coupled to at least one arm, a superior endplate, and an inferior endplate, the frame having: at least one first channel for supporting a first pin extending in a longitudinal direction of the frame, a first threaded track for rotatably supporting a first set screw, and a second threaded track for rotatably supporting a second set screw;
    the at least one arm being pivotally coupled to one of the superior endplate or the inferior endplate and having: a second channel for supporting the first pin in a longitudinal direction of the at least one arm and a third channel for supporting a second pin extending in a transverse direction of the at least one arm;
    at least one distraction wedge engaged with the at least one arm and the first set screw, wherein rotation of the first set screw is configured to cause the at least one distraction wedge to move in the longitudinal direction thereby rotating the frame about the first pivoting axis and urging the superior endplate and inferior endplate into a distracted configuration; and
    at least one angulation wedge engaged with the at least one distraction wedge and the second set screw, wherein rotation of the second set screw is configured to cause the at least one angulation wedge to move in the longitudinal direction thereby urging the superior endplate and the inferior endplate into an angled configuration.

2. The expandable implant of claim 1, wherein an end of the frame comprises a chamfered edge disposed for pivotally rotating along a correspondingly curved socket of one of the superior endplate or inferior endplate.

3. The expandable implant of claim 1, further comprising a first screw case configured to surround the first set screw and move with the first set screw in the longitudinal direction of the frame,
    wherein the first screw case includes at least one boss configured for disposal in a corresponding eyelet of the at least one distraction wedge, and
    wherein the first screw case is rotatable with respect to the longitudinal direction of the frame.

4. The expandable implant of claim 1, wherein the at least one distraction wedge further comprises a ramp including at least one rail or channel configured to slidably mate with a corresponding ramp of the at least angulation wedge.

5. The expandable implant of claim 1, wherein the at least one angulation wedge further comprises at least one ramp including at least one rail or channel configured to slidably mate with a corresponding ramp of one of the superior endplate or inferior endplate.

6. The expandable implant of claim 1, further comprising a second screw case configured to surround the second set screw and move with the second set screw in the longitudinal direction of the frame,
    wherein the second screw case includes at least one groove configured to mate with a corresponding ramp of the at least one distraction wedge.

7. The expandable implant of claim 6, wherein the at least one groove of the second screw case is a dovetail groove.

8. The expandable implant of claim 1, wherein the at least one distraction wedge is engaged with at least one ramp of the at least one arm.

9. The expandable implant of claim 8, wherein the at least one arm includes at least one rail or channel configured to mate with the at least one distraction wedge.

10. The expandable implant of claim 1, wherein rotation of the first set screw is configured to urge the superior endplate and inferior endplate into the distracted configuration be moving each of the superior endplate and inferior endplate away from the longitudinal axis of the frame an equal amount.

11. The expandable implant of claim 1, wherein the first set screw and second set screw are coaxially aligned and oppositely threaded.

12. An expandable implant pivotally movable between a collapsed position, an expanded position, and an angled position, comprising:
    a frame operatively coupled to a first arm and a second arm on opposite sides of the frame, the first arm being operatively coupled to a superior endplate and the second arm being operatively coupled to an inferior endplate;
    the frame having: a first channel for supporting a first pin extending in the longitudinal direction of the frame, a second channel for supporting a second pin extending in the longitudinal direction of the frame, a first threaded track for rotatably supporting a first set screw, and a second threaded track for rotatably supporting a second set screw;
    the first arm having: a third channel for supporting the first pin and a fourth channel for supporting a third pin extending in a transverse direction of the first arm, the superior endplate being pivotally coupled to the first arm via the third pin;

the second arm having: a fifth channel for supporting the second pin and a sixth channel for supporting a fourth pin extending in a transverse direction of the second arm, the superior endplate being pivotally coupled to the second arm via the fourth pin;

a first distraction wedge and a second distraction wedge operatively coupled to the first set screw, wherein rotation of the first set screw is configured to cause the first distraction wedge and the second distraction wedge to move in the longitudinal direction of the frame thereby rotating the frame about the first and second pins and urging the superior endplate and inferior endplate into a distracted configuration; and a first angulation wedge engaged with the first distraction wedge and a second angulation wedge engaged with the second distraction wedge, the first angulation wedge and second angulation wedge each being operatively coupled to the second set screw, wherein rotation of the second set screw is configured to cause the first angulation wedge and second angulation wedge to move in the longitudinal direction thereby rotating the superior endplate and the inferior endplate about the third and fourth pins and into an angled configuration.

13. The expandable implant of claim 12, wherein:
an end of the first arm comprises a chamfered edge disposed for pivotally rotating within a correspondingly curved socket of the superior endplate, and
an end of the second arm comprises a chamfered edge disposed for pivotally rotating within a correspondingly curved socket of the inferior endplate.

14. The expandable implant of claim 12, further comprising a first screw case configured to surround the first set screw and move with the first set screw in the longitudinal direction of the frame,
wherein the first screw case includes a first boss configured for disposal in a corresponding eyelet of the first distraction wedge and a second boss configured for disposal in a corresponding eyelet of the second distraction wedge, and
wherein the first screw case is rotatable with respect to the longitudinal direction of the frame.

15. The expandable implant of claim 12, wherein:
the first distraction wedge further comprises a ramp including at least one rail or channel configured to slidably mate with a corresponding ramp of the first angulation wedge, and
the second distraction wedge further comprises a ramp including at least one rail or channel configured to slidably mate with a corresponding ramp of the second angulation wedge.

16. The expandable implant of claim 12, wherein:
the first angulation wedge further comprises at least one ramp including at least one rail or channel configured to slidably mate with a corresponding ramp of the superior endplate, and
the second angulation wedge further comprises at least one ramp including at least one rail or channel configured to slidably mate with a corresponding ramp of the inferior endplate.

17. The expandable implant of claim 12, further comprising a second screw case configured to surround the second set screw and move with the second set screw in the longitudinal direction of the frame,
wherein the second screw case includes a first groove configured to mate with a corresponding ramp of the first distraction wedge and a second groove configured to mate with a corresponding ramp of the second distraction wedge.

18. The expandable implant of claim 12, wherein the first distraction wedge is engaged with at least one ramp of the first arm and the second distraction wedge is engaged with at least one ramp of the second arm.

19. The expandable implant of claim 18, wherein the first arm includes at least one rail or channel configured to mate with the first distraction wedge and the second arm includes at least one rail or channel configured to mate with the second distraction wedge.

20. The expandable implant of claim 12, wherein rotation of the first set screw is configured to urge the superior endplate and inferior endplate into the distracted configuration be moving each of the superior endplate and inferior endplate away from the frame an equal amount.

* * * * *